United States Patent [19]

Butt et al.

[11] Patent Number: 4,620,283
[45] Date of Patent: Oct. 28, 1986

[54] PROGRAMMABLE LOAD CONTROLLER

[75] Inventors: James A. Butt; Kalyan Mondal; Preston L. Roberts, all of Allentown, Pa.

[73] Assignee: Lehigh University, Bethlehem, Pa.

[21] Appl. No.: 555,960

[22] Filed: Nov. 29, 1983

[51] Int. Cl.⁴ .................. G06F 15/56; H04B 3/54; H02J 13/00
[52] U.S. Cl. ...................... 364/493; 307/35
[58] Field of Search .............. 364/493, 492; 307/35, 307/38, 39, 62

[56] References Cited

U.S. PATENT DOCUMENTS

| | | | |
|---|---|---|---|
| 4,125,782 | 11/1978 | Pollnow, Jr. | 364/493 X |
| 4,130,874 | 12/1978 | Pai | 364/492 X |
| 4,153,936 | 5/1979 | Schmitz et al. | 364/493 |
| 4,167,679 | 9/1979 | Leyde et al. | 364/492 X |
| 4,181,950 | 1/1980 | Carter, II | 364/492 |
| 4,204,127 | 5/1980 | Carter, II | 307/39 |
| 4,247,786 | 1/1981 | Hedges | 307/35 |
| 4,283,635 | 8/1981 | Balmer | 307/35 |
| 4,321,477 | 3/1982 | Bartlett | 364/493 |
| 4,324,987 | 4/1982 | Sullivan, II et al. | 364/492 X |
| 4,349,879 | 9/1982 | Peddie et al. | 364/492 |
| 4,382,284 | 5/1983 | Dressel et al. | 364/492 |
| 4,419,665 | 12/1983 | Gurr et al. | 364/493 X |
| 4,464,724 | 8/1984 | Gurr et al. | 307/35 X |
| 4,471,232 | 9/1984 | Peddie et al. | 307/35 |
| 4,477,733 | 10/1984 | Herdeman | 364/493 X |
| 4,489,386 | 12/1984 | Breddan | 364/493 |

Primary Examiner—Edward J. Wise
Attorney, Agent, or Firm—Ratner & Prestia

[57] ABSTRACT

A control method and system for minimizing the on-peak power demand of a residential electric utility user having a plurality of loads is implemented by determining the average energy demand over predetermined sliding time windows and comparing them with a control point. Non-priority loads are shed in an attempt to decrease the demand below the control point. If the energy demand is still above the control point after all non-priority loads are shed, the control point is dynamically adjusted upward and no priority loads are shed. Loads are shed by transmitting bits of information to the loads when the average energy demand over the predetermined time windows increases beyond the control point. Upon receiving bits of information indicating a load should be shed, the receiver deenergizes its load. The bits of information are synchronized to the zero crossing of the AC line. The bits are transmitted simultaneously and periodically. Central load control may decrease the power demand of the user in one or more predetermined steps. A method is provided for controlling multi-phase demand where the angles between phases are not necessarily equal.

27 Claims, 24 Drawing Figures

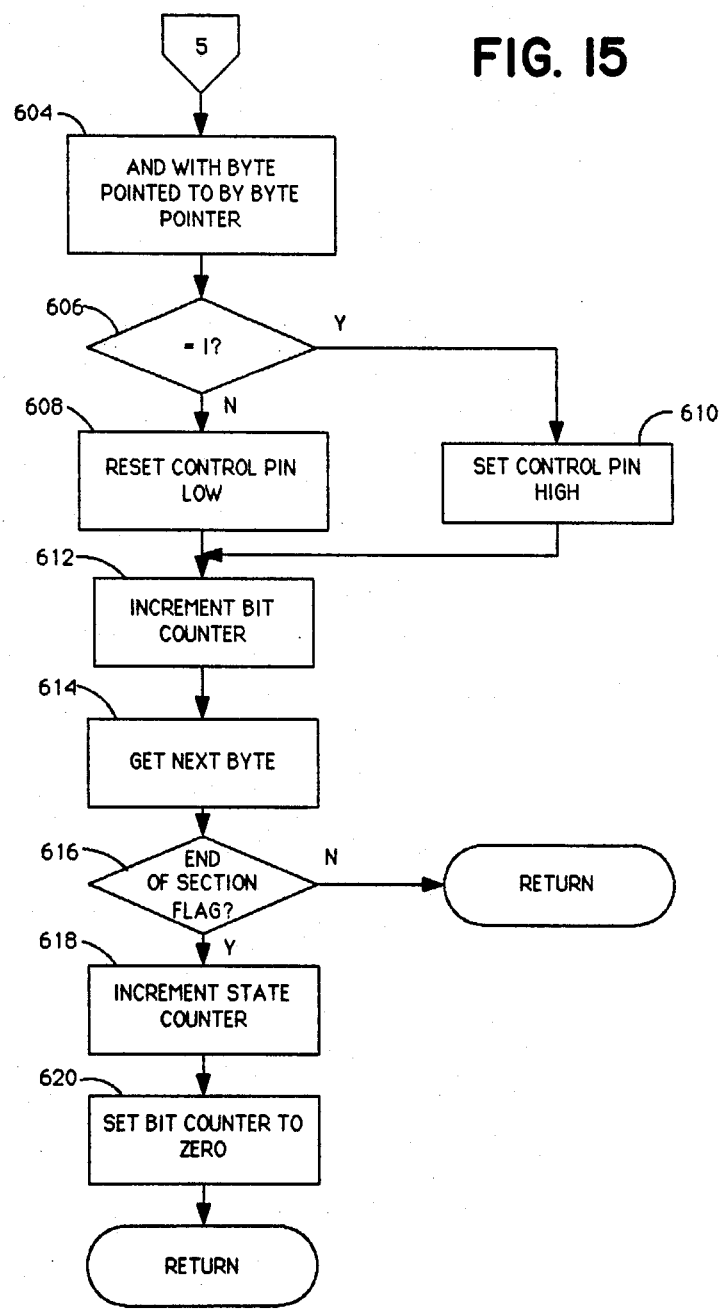

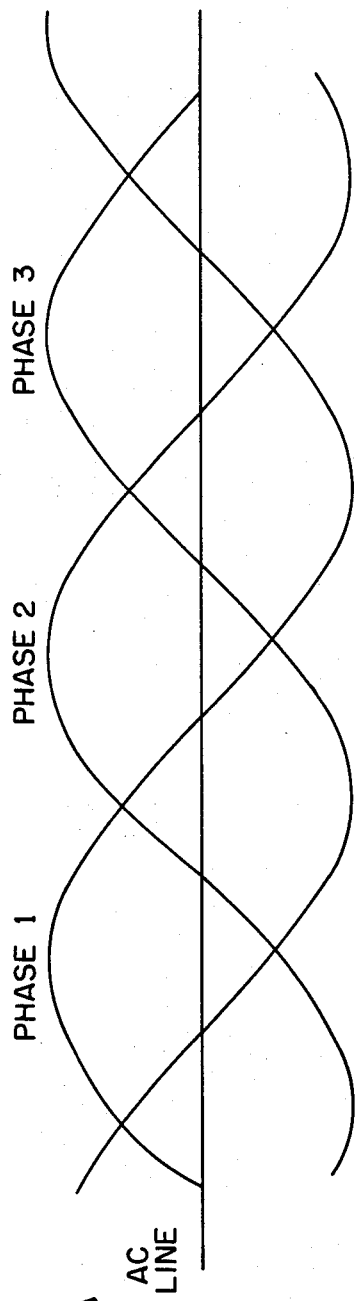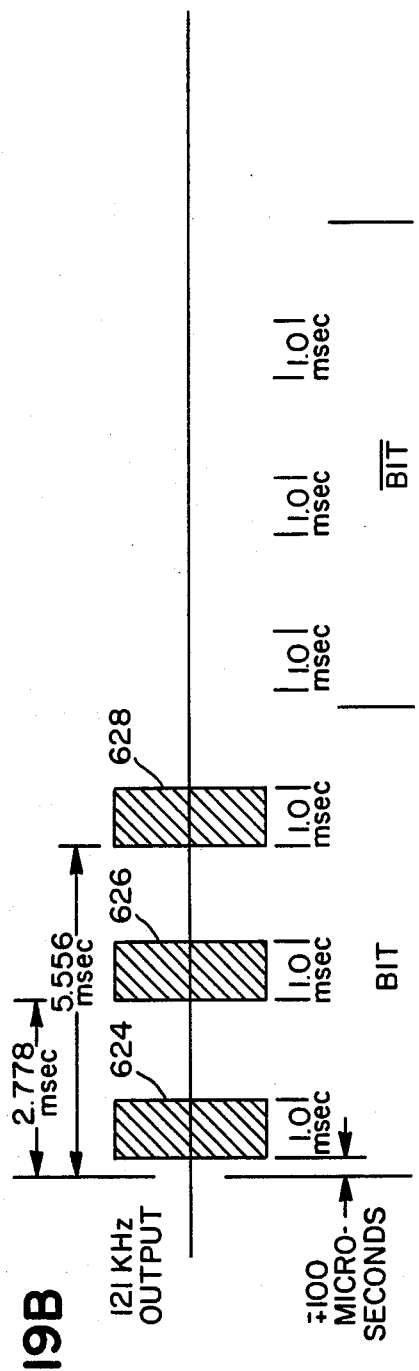

PROGRAMMABLE LOAD CONTROLLER

BACKGROUND OF THE INVENTION

A. Field of the Invention

This invention relates to the field of programmable load controllers for residential electric utility customers.

B. Background Art

One of the most serious problems confronting electric utility companies today is the great variance in total electrical demand on a network between peak and off peak times of the day. The so-called peak demand periods or load shedding intervals are periods of very high demand on the power generating equipment where load shedding may be necessary to maintain proper service to the network. These occur for example during hot summer days occasioned by the widespread simultaneous usage of electric air conditioning devices. Typically the load shedding interval may last many hours and normally occurs during the hottest part of the day. Peaks may also occur during the coldest winter months in areas where the usage of electrical heating equipment is prevalent. The increasing use of electrical space heaters contributes to this problem. In the past, in order to accomodate the very high peak demands, electric utility companies have been forced to spend tremendous amounts of money either in investing in additional power-generating capacity and equipment, or in buying so-called peak power from other utilities which have made such investments.

Typically the utilities have met this fluctuating electricity demand by using three types of generation. Base load plants (usually nuclear or coal fired) provide nearly constant output. These units are the most efficient, and the most economical to operate. Intermediate plants follow the slow variations in the daily electricity demand, and are consequently more expensive to run. Peaking plants are the least efficient and the most costly of all. Peaking plants are usually gas- or oil-fired turbines that can be started quickly to meet high demands for short periods. Times when a utility must resort to using more of the inefficient and uneconomical generation are termed "on-peak" or "peak times".

The power a customer uses is actually what causes the utility problems, since the utility must have enough "capacity" to meet the customer's electricity demand at all times. In order to encourage customers to reduce demand and avoid building new plants, most utilities include a demand or capacity charge in the rate. If the consumer does not reduce its demand this charge helps pay for new generation. The highest electricity demand in a billing period is compared to a demand norm and the credit or penalty is calculated. Once a penalty has been imposed for a billing period it cannot be removed by controlling demand below the norm during the remainder of the billing period. Thus there is no additional economic advantage to controlling below the demand level which invoke the penalty. This type of demand charge has been common in industrial rates for many years, but has recently been introduced for residential purposes. It is based upon energy use over a predetermined period of time (conceptualized as a sliding window), rather than upon instantaneous use. There is thus no additional economic advantage to controlling spikes in demand, no matter how high they are, if their duration is short enough that they do not raise the demand over the fifteen minute sliding window enough to cause an additional penalty.

In the prior art several basic strategies and devices have been utilized for load shedding in order to limit the peak power demands on the power generating capacity of electric utility companies. One such mode involves sending signals from the utility to disconnect selected electric loads. While this direct control of power consumption by the utility achieves usage cutbacks, the lack of flexibility may inconvenience the user.

An alternative is installing load shedding devices at the point of consumption. This provides greater flexibility and control. Several such devices have been available but none has the ability to adjust the control point upward as the billing period progresses. This presents difficulties for users that have priority loads which must be energized on an as needed basis. An overrideable, fixed control point allows all priority loads to be energized. However, the minimum level necessary to accomodate these loads may unavoidably result in a penalty charge. Subsequently, there is no economic advantage to shedding non-priority loads to stay below this minimum level. However, a situation may arise in which the control point has been overridden in order to allow all priority loads to be energized but, currently, not all priority loads are in use and non-priority loads are deenergized to stay below the control point which has already been exceeded. Thus, the non-priority loads would be shed unnecessarily.

SUMMARY OF THE INVENTION

A control method and system for minimizing the on peak power demand of a residential electric utility customer having a plurality of loads is implemented by determining the average energy demand over a predetermined sliding time window and comparing it with a control point. Non-priority loads are shed in an attempt to decrease the demand below the control point. If the energy demand is still above the control point after all non-priority loads are shed, the control point is dynamically adjusted upward to a new value based upon the energy demand and no priority loads are shed. This is compatible with the utility protocol in which a penalty is calculated by the utility based upon the highest electricity demand in the billing period. Once this penalty is imposed for a billing period, it cannot be removed by controlling below that level during the remainder of the billing period. Loads are shed by transmitting bits of information to the loads when the average energy demand over the predetermined time windows increases beyond the control point.

BRIEF DESCRIPTION OF THE FIGURES

FIGS. 14 and 15 show the routine used by the programmable load controller to transmit bits of information to the loads.

FIGS. 19A and 19B show the relationship between the bits of information and the various phases of a multiphase system as implemented by conventional load controllers.

DETAILED DESCRIPTION OF THE INVENTION

Figure 1:
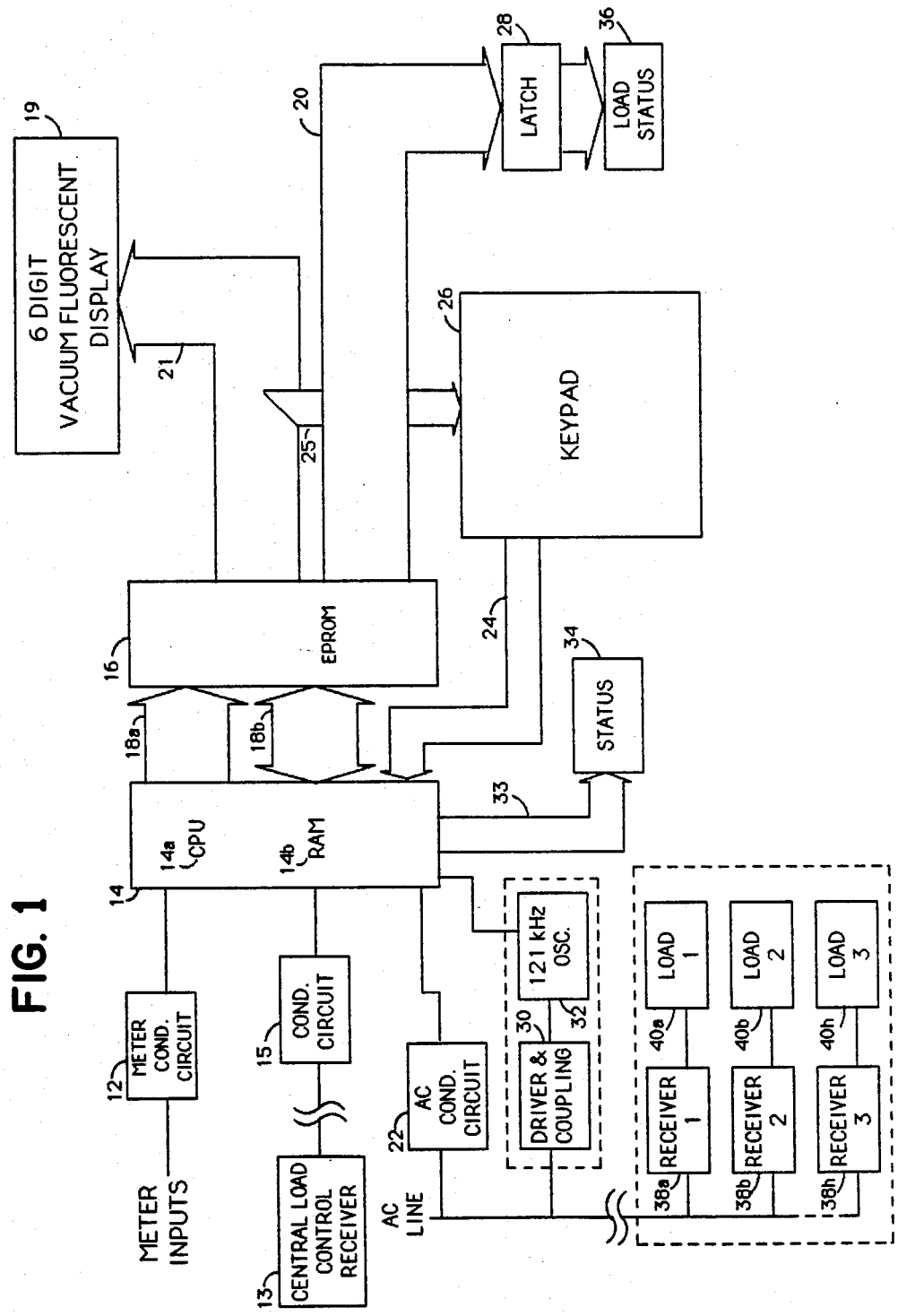
FIG. 1 shows a block diagram of the programmable load contoller of the present invention.

A block diagram of a preferred embodiment of a programmable energy load controller 10 for controlling eight loads 40a–h is shown in FIG. 1. Controller 10 includes a microprocessor 14 having a central processing unit 14a and a 128 by 8 RAM 14b. Data buses 18a and 18b allow microprocessor 14 to communicate with an EPROM 16 comprised of a 2K by 8 memory and two 8-bit IO ports. EPROM 16 contains a program which appears at the end of the specification as an appendix and is written in a structured format understandable to those of ordinary skill in the art. For executing the program, microprocessor 14 may be an Intel 8039. The program allows the user to shed loads 40a–h on a priority basis in order to maintain total energy use for up to eight loads below a given control point. The control point may be progressively adjusted higher if necessary in order to energize all priority loads while achieving optimum control.

Microprocessor 14 is connected through a transmitter defined generally by dotted line 31 to an AC line 33 which controls the energizing of eight loads 40a–h. Transmitter 31 includes oscillator 32 and a driver and coupling 30. Microprocessor 14 gates on and off a 121 KHz carrier generated by oscillator 32. This amplitude modulated carrier is injected onto power line 33 allowing microprocessor 14 to transmit a digital signal to loads 40a–h. A 1 bit is represented by the presence of a carrier and a 0 bit is represented by the absence of a carrier. AC line 33 is coupled to the eight loads 40a–h by means of receivers 38a–h respectively as shown within dotted line 37. Receivers 38a–h, which detect this carrier and decode the digital control word, may be conventional receivers such as BSR X-10 or LEVITON. These receivers gate on and off loads 40a–h depending on the control words sent from processor 14. These control words are transmitted to all eight loads simultaneously whenever the status of one of the loads is to be changed. Additionally, control words are transmitted to all eight loads automatically on a periodic basis. For example, the period may be sixteen minutes.

Central load control receiver 13 receives a central control signal from the utility by FM transmission, telephone, or through AC line 33. This binary signal is conditioned by conditioning circuit 15 and applied to microprocessor 14. The binary signal is read by microprocessor 14 as a normally closed switch input signal and is effective to alter the control point of load controller 10. When the switch input signal is opened by the utility, controller 10 reduces demand by 3.0 kW, or to a 4.0 kW minimum. These values may not be altered in the field. The control point may not be adjusted higher when this switch is open.

Keypad 26 is coupled to microprocessor 14 by bus 24 and is used to select a target control point. The algorithm within EPROM 16 may shed non-priority loads as necessary to attempt to maintain energy use below this target. If energy demand remains above the target when only priority loads are energized, the algorithm adjusts the control point up to the demand level. This new level becomes the control point for the remainder of the billing period or until it must be adjusted upward again, or to assure that all priority loads are energized. By selecting a low starting target, a user can assure selection of a control point which is the minimum compatible with the energizing of all priority loads. This also prevents unnecessary shedding of non-priority loads when demand is higher than the target but lower than the previous peak demand of the billing period.

A user may also use keypad 26 to program the peak periods. This allows the user to program system 10 to be compatible with any changes the utility initiates. Additionally, the user may use keypad 26 to establish priority loads which remain energized at all times. This information is stored in a load priority table byte in RAM 14b.

AC conditioning circuit 22 provides a strobe to the interrupt of microprocessor 14 on each negative going zero crossing of AC line 33. EPROM 16 includes a software phase-lock loop which uses this interrupt to synchronize the control word with a zero crossing of the AC line 33. This allows the beginning of each bit of a control word to coincide with the zero crossing of the AC line. Such synchronization is critical, since generally available receivers use the zero crossing of the AC line to sample the line for the presence of a transmitter carrier signal.

Additionally, keypad 26 may be used to request the display items of information on a time multiplexed vacuum florescent display 19. The items of information which may be selected include a user selected target control point, peak periods and priorities; energy consumption including the daily and month to date consumption; and energy demand including current demand and the highest on-peak demand in the current billing period.

Bus 25 connects keypad 26 to EPROM 16 and allows EPROM 16 to energize as appropriate, certain lines in the matrix of keypad 26 to allow microprocessor 14 to scan keypad 26. Bus 24 allows microprocessor 14 to determine which key has been depressed on keypad 26.

Meter conditioning circuit 12 connects the user's power meter to microprocessor 14. It provides logic level conversion upon the output of a conventional induction kilowatt hour meter having a pulse initiator. Each time the wheel on the meter makes a revolution it generates a pulse. The pulse is conditioned and applied to microprocessor 14 by meter conditioning circuit 12 thus providing microprocessor 14 with information on energy use.

Load status display 36 displays the load status byte. This byte is communicated to load status 36 through bus 20 and is latched by a set of eight latches 28. In this byte there is one bit for each of the eight loads 40a–h. A 0 in a given bit position indicates that the corresponding load is energized and this will result in the corresponding LED being turned on. Conversely, a 1 in a given bit position indicates that the corresponding load is not energized and its corresponding LED will be off.

Status block 34 has LED's which indicate whether the system is currently in a control period, whether the current time is within a peak period, and whether the target control point has been exceeded. This information is communicated from microprocessor 14 to status block 34 by way of bus 33.

Control Routine

Figure 2:
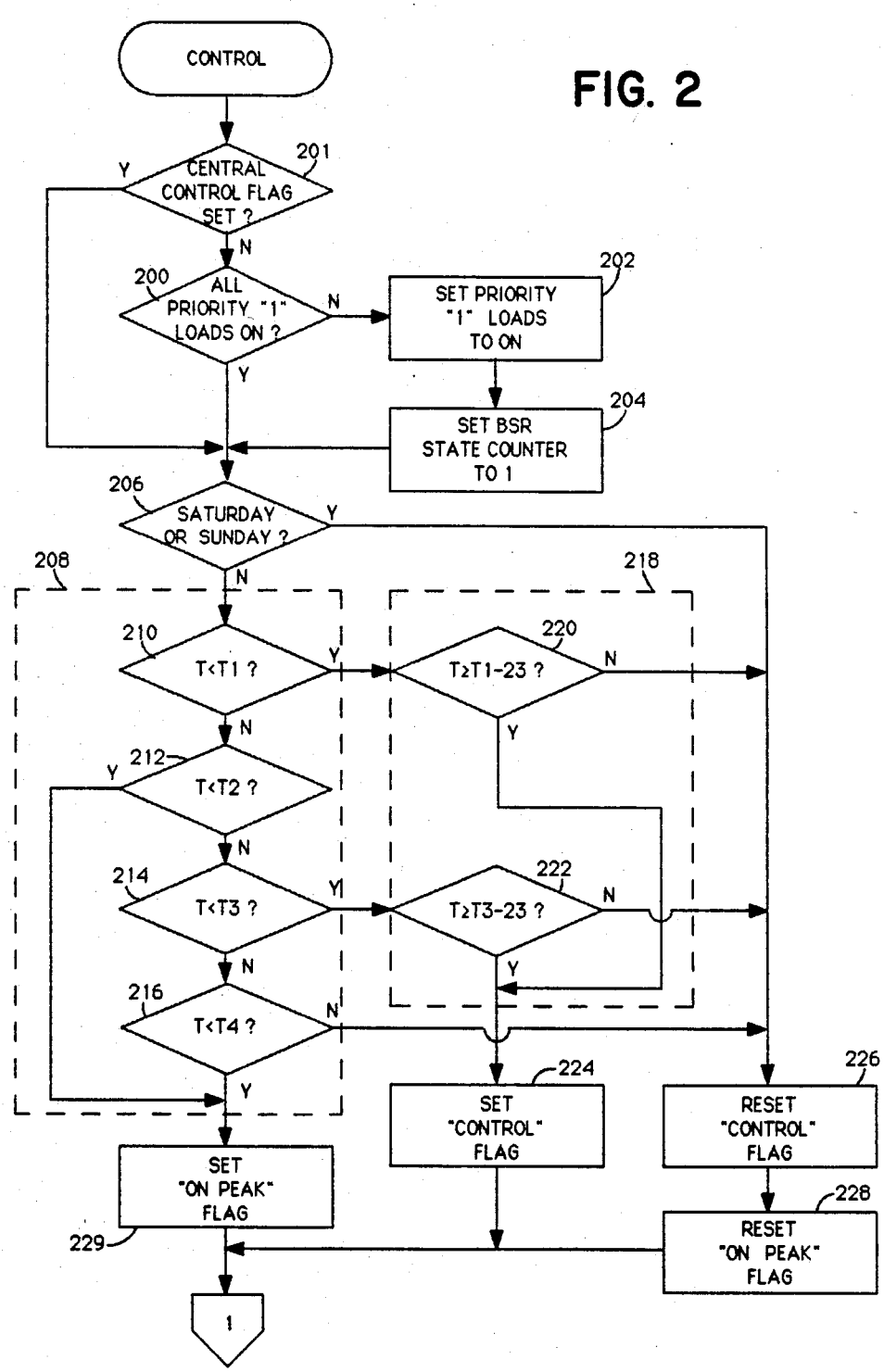
FIGS. 2, 3 and 4 show the control routine for the programmable load controller of the present invention.
Figure 3:
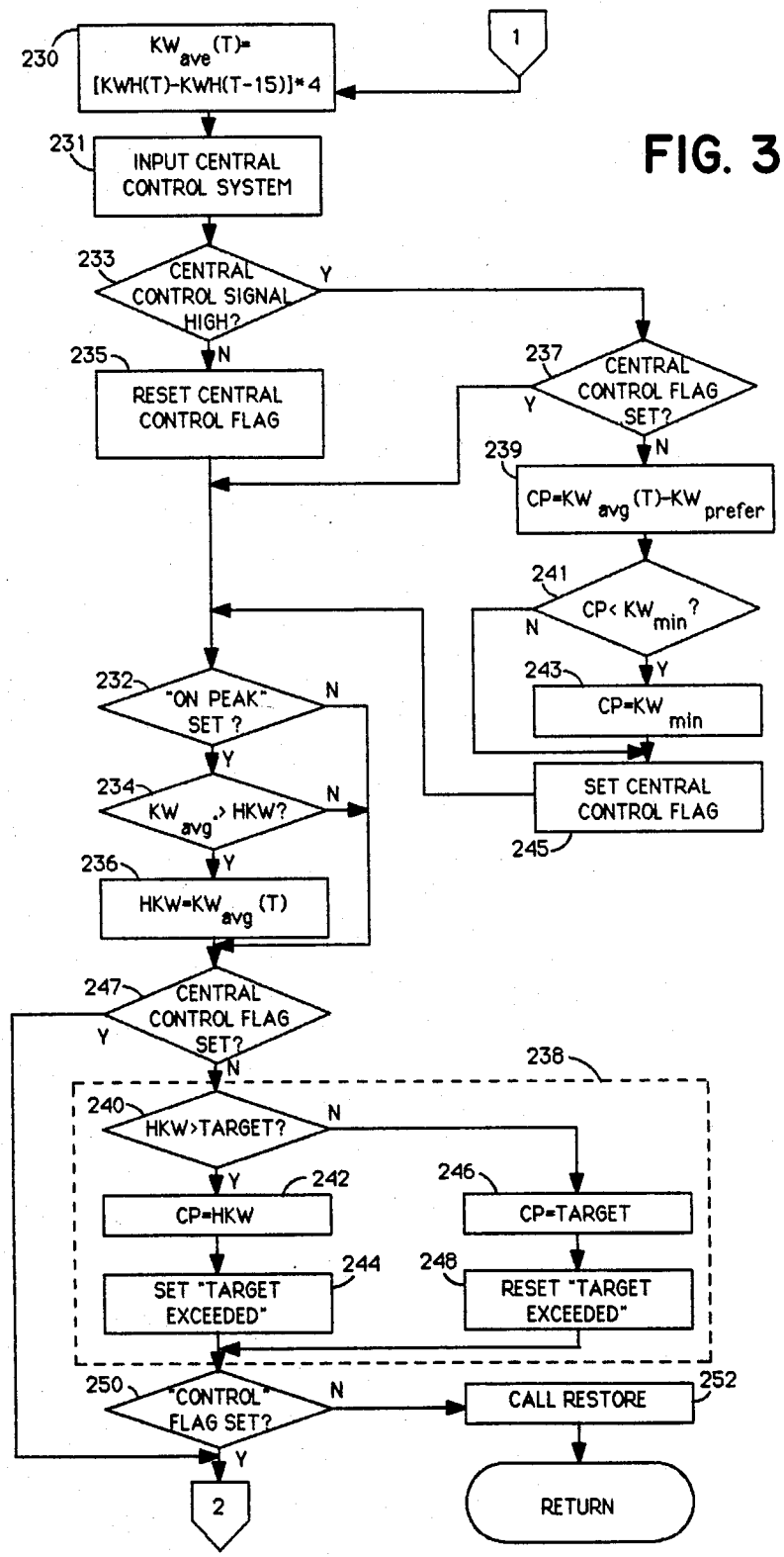
Figure 4:
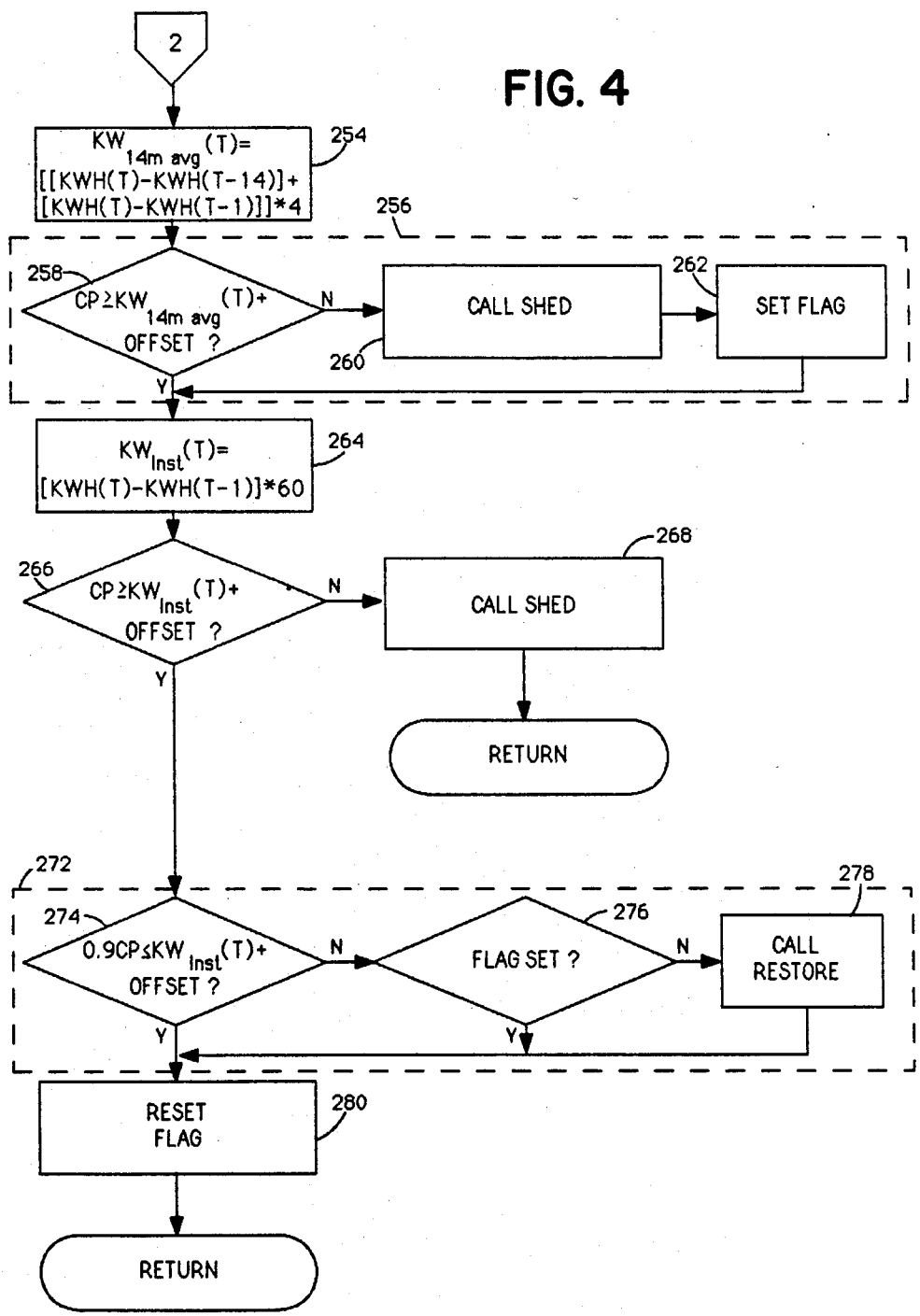

FIGS. 2-4 show the flow chart of the control routine or procedure which controller 10 uses to determine whether to adjust the control point, to shed loads, or to restore loads. Each time AC conditioning circuit 22 provides microprocessor 14 with a strobe an interrupt service routine is executed at which time registers in microprocessor 14 are advanced. When the seconds register overflows one minute has elapsed and execution of this control routine or procedure is initiated.

On entering this routine a determination of whether the central control flag is set is made in diamond 201. If controller 10 is in the defer mode this flag is set making it possible to control priority loads and diamond 200 is skipped. In diamond 200 a comparison is made between the priority table and the load status table. The priority table contains a 1 or a 0 in each bit location corresponding to each load. Priority for each load is selectable by the user from keypad 26 with a priority 1 indicating no control (always on) or 0 indicating that the load is a non-priority load and is controllable. This allows the user to override controller 10 on specific loads 40$a$-$h$ with a minimum of effort. If upon making the comparison between the priority table and the current status in diamond 200 of FIG. 1, a priority load is found to be off, its corresponding bit position in the load status table is reset to 0 in block 202. This assures that all priority loads are energized.

Since peak periods are not applicable on Saturday or Sunday the determination made in diamond 206 results in the control flag being reset in block 226 and the on-peak flag being reset in block 228 on those days. On the remaining days the determination defined generally by dotted line 208 results in the on-peak flag being set if the current time is during one of the user selected peak periods. These periods are delineated by T1, T2, T3 and T4. The first peak period is from T1 to T2 and the second is from T3 to T4. These times are easily programmable by the user through keypad 26 to allow for changes in the rate structure. If only one period is desired, the user may program the second period to be of zero length. If the current time is not before T1 but is before T2 as determined by diamonds 210 and 212 or if it is not before T3 but is before T4 as determined by diamonds 214 and 216, then the set of the on-peak flag is executed in block 229. This flag is used by the algorithm to determine whether to adjust the control point and it is one of the flags displayed to the user by status block 34, FIG. 1.

The determination defined generally by dotted line 218 results in a control flag being set twenty-three minutes prior to the beginning of each period. Diamonds 220 and 222 detect current times before the first and second peak periods respectively. Both diamonds send execution to block 224 where the control flag is set. This process permits controller 10 to begin gathering sufficient information to start executing adequate control immediately upon entering a peak period. Twenty-three minutes is determined from the sum of eight minutes which is the time required to exert the maximum control and fifteen minutes. The fifteen minutes is the first set of data for the fifteen minute sliding window since the first average inside the peak period actually uses the 15 minutes of prior data. Both the control and the on-peak flags are reset at the end of either peak period by blocks 226 and 228.

The current average demand is calculated in block 230 of FIG. 3. The energy readings for the previous fifteen minutes are stored on a fifteen level stack in the data RAM 14$b$. In this step, the energy reading taken fifteen minutes prior to the current time is subtracted from the current reading (KWH). The resulting energy use over the last fifteen minutes is projected as an estimate of a one hour period by multiplying it by four.

In block 231 the central control signal is received from the utility. This signal, which is transmitted by the utility when DEFER mode is desired, is received from central load control receiver 13 of FIG. 1 and applied through conditioning circuit 15 to microprocessor 14. If the central load control signal is low indicating that the utility is not requesting load controller to enter the DEFER mode, the central control flag is reset in block 235. If the central load control signal is high, load controller 10 enters the DEFER mode, which is indicated by the word "defer" flashing on display 19. This message alternates with whatever the user is currently displaying. When controller 10 enters the DEFER mode it calculates the control point by subtracting a predetermined demand $KW_{DEFER}$ from the 15 minute average calculated in block 230 and uses this result as the new control point. However, it will not reduce the demand below a predetermined minimum level. Controller 10 is currently programmed to reduce the demand by 3.0 kW, or to a 4.0 kW minimum. These values can be altered in the software, but not in the field.

Figure 5:
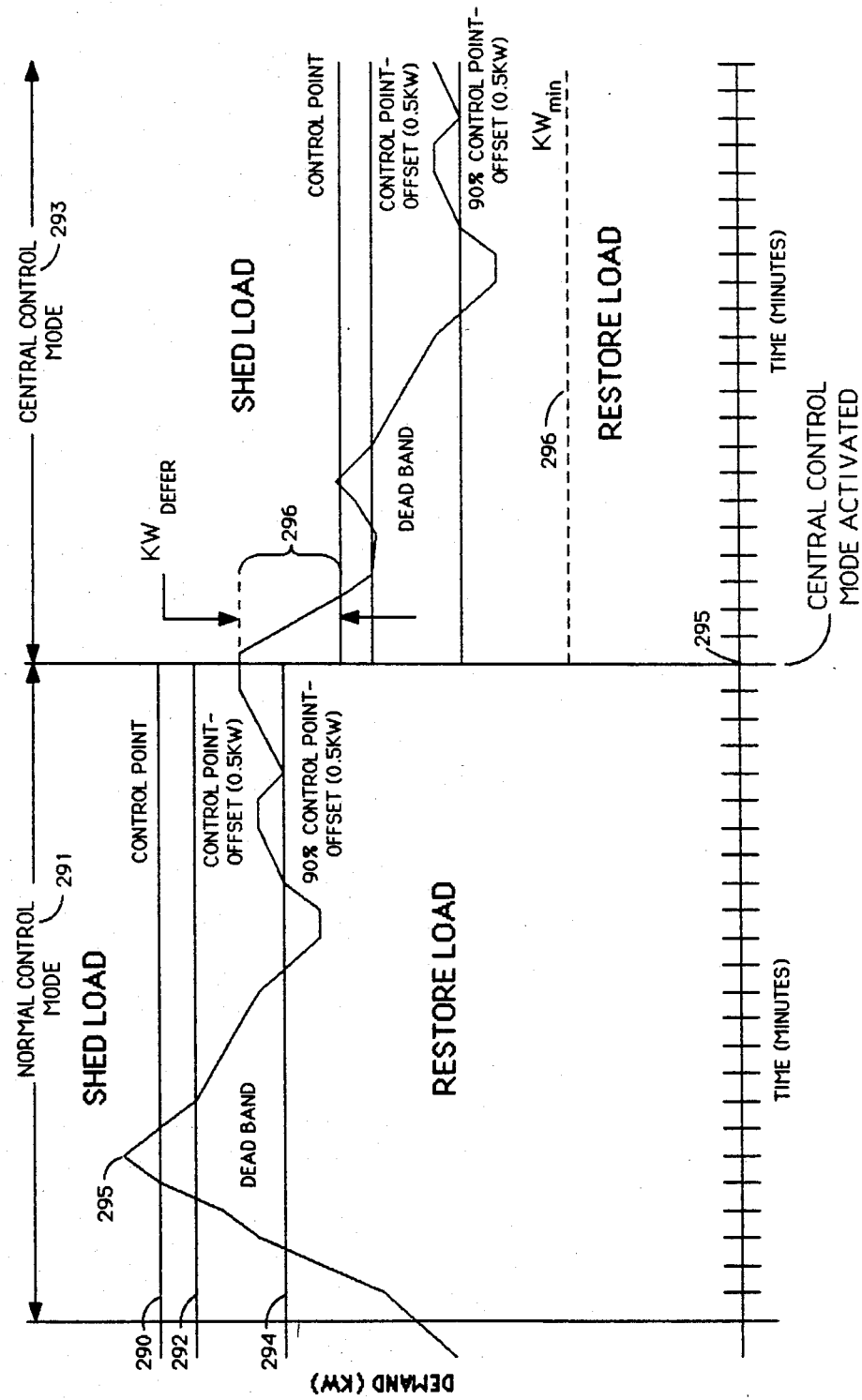
FIG. 5 shows a graph of energy demand versus time.

A graphical representation of this procedure is shown in FIG. 5. During normal control mode 291 demand is shown rising as a function of time past the control point level 290 to a peak level 295. At this point a load is shed causing the demand to drop and stay substantially within a dead band defined by control point offset level 292 and a level 294 which is ninety percent of the control point offset level 292. At time 295 the central control mode is activated and the behavior of load controller 10 is shown as central control mode 293. Demand is reduced by shedding other loads until it is below the new control point.

The foregoing operations may be seen in FIG. 3. If the central control signal is not high, as determined in diamond 233, the central control flag is reset in block 235. This takes controller 10 out of the DEFER mode. If the central load controller signal is high a determination of whether the central control flag has been set is made in diamond 237. If this flag is set, the appropriate calculations for the DEFER mode have already been made. If this flag is not set the control point is calculated as shown in block 239. In decision 241, a determination is made whether the control point has fallen below the predetermined minimum. If it has, the control point is set equal to the predetermined minimum block 243. In block 245 the central control flag is set to indicate that the central load control calculations have been performed.

By cycling the central control signal from low to high repeatedly the utility may "ratchet" the control point down to progressively lower levels. This is accomplished as follows. The first time the central control signal is high, block 239 is executed causing a new control point to be defined at a level $KW_{DEFER}$ below KW$_{ave}$. In subsequent passes through the operations shown in FIG. 3, block 230 will always be executed, causing KW$_{ave}$ to drop to a value below the value which was current when block 239 was executed.

The utility then causes the central control signal to go low causing the central control flag to be reset in block 235. Before KW$_{ave}$ can rise the utility causes the central control signal to go high a second time. When diamond 237 is thereby encountered again, the central control flag is low causing block 239 to he executed a second time. This time KW$_{DEFER}$ is subtracted from the new (lower) KW$_{ave}$ producing a control point which is incrementally lower than the control point produced the first time block 239 was executed. This procedure may be repeated as desired producing progressively lower control points.

If the current time is during a peak period as determined by the test of the on-peak flag in diamond 232 then in diamond 234 the average demand calculated in block 230 is compared with the value of the highest average on-peak demand (HKW) that has occurred in the current billing period. If the present demand is higher, then the highest demand is updated in block 236, thus recording that the present demand is the highest on-peak demand of the current billing period. This allows the dynamic readjustment of the control point throughout the billing period. It is this highest on-peak demand upon which the utility levies its demand charge.

Calculating the fifteen minute average every minute is called a sliding window averaging process. This technique eliminates the need to synchronize the fifteen minute window of controller 10 with that of the utility meter. Solid state utility meters of recent design also use a sliding window to prevent customers from loading up at the end of the demand interval.

When controller 10 is in the DEFER mode the control point is not altered even if it is exceeded. A determination is made therefore, in diamond 247, whether the central control flag is set. If this flag is set load controller 10 is in the DEFER mode and execution jumps over the operations defined by dotted line 238 in which the control point is adjusted.

The user programs by way of keypad 26 a desired target for controller 10 to maintain. Actual on-peak demand may exceed this target due to an unrealistic target level, a high level of uncontrolled loads or poor control. If the target is exceeded as determined in diamond 240, the highest on-peak demand is substituted for the target as the control point in block 242, a target exceeded flag is set in block 244 and the appropriate LED in status block 34 is turned on. It is in this step that the dynamic resetting of the control point takes place. This step is an important feature of the control algorithm which reflects the reality of the rate structure. The user is billed on the highest on-peak demand achieved during the billing period. Therefore, to control at a level below this point might cause a user unnecessary discomfort.

An optimum control point is determined if the user selects a very low target value. Controller 10 attempts to control a demand to this level, but due to the fact that the priority loads are not subject to control it may be unable to do so. When demand exceeds the control point during a peak period, the control point is progressively elevated until a minimum controllable level is found. The determination of the adjusted control point is accomplished without user intervention and in finding the minimum control point, the controller maximizes the financial benefit to the user. This allows the control point to be dynamically set to the highest on-peak demand during the billing period.

If the highest on-peak demand does not exceed the user selected target as determined by diamond 240 the control point is set equal to the target in block 246 and the target exceeded flag will be reset in block 248. This causes the controller to limit demand to the user's specifications.

The result of the steps of dotted line block 238 is to use the user selected target as the control point until it is impossible to energize all priority loads while staying below the target average during the fifteen minute window. Once the target is exceeded and a minimum billing for the month has been determined, there is no reason to attempt to maintain the old target and the algorithm dynamically sets a new one. This prevents the unnecessary shedding of loads when the demand exceeds the user selected target but is still below the highest demand of the billing period.

At the end of the billing period, which is signalled by a switch closure when the utility meter is read, the control point is reset to the target value by block 246. The highest on-peak demand (HKW) is moved to the previous month's on-peak demand (PHKW) and the present monthly high is then reset to 0. This approach is consistent with the utility rate structure.

Diamond 250 tests the control flag which is set twenty-three minutes prior to the beginning of a peak period by block 224 of FIG. 2. If this flag is not set then the current time is not in a period where control is to be executed and the RESTORE routine is called in block 252. A call to this routine turns on one load. By repeated calls of RESTORE, the loads are turned on, one each minute. This action prevents a displaced peak or restrike from forming immediately following the end of a peak period.

If a control flag has heen set, as determined in diamond 250, the current time is during a period where control is to be executed and step 254 of FIG. 4 calculates the fourteen minute average. In this calculation, the energy demand of the previous fourteen minutes is added to the demand of the previous one minute. Thus the demand of the previous minute is counted twice, allowing the shed decision to be based on a parameter which is more sensitive to recent changes in demand than the strict fifteen minute average of block 230. This new value is then multiplied by four to create an estimated projection of the energy demand for the next hour based on the information gathered during the previous fourteen minutes. If this predicted demand plus an offset is above the control point as determined in diamond 258, a call to the SHED routine is made in block 260 to turn off one load. Upon returning from the SHED routine, a flag is set in block 262 in order to record the fact that a load has been shed by this section of the control algorithm. Thus if there are any non-priority loads energized, the steps defined generally by dotted line block 256 result in a load being shed in order to attempt to prevent the demand from exceeding the control point.

At this point whether the SHED routine has been called or not, a second estimated projection of the energy demand over the next hour is made. This projection however is based entirely on the previous one minute, as distinguished from the projection made in block 254 which was based on the previous fourteen minutes with the weight of the previous minute doubled.

This second projection is calculated in block 264. The meter reading of one minute ago is subtracted from the current reading to determine the demand of the previous one minute as was done in block 254. However, in this case, the one minute reading only is used to project the demand of the next hour by multiplying it by sixty. The value thus calculated is compared with the same limit as the value calculated in block 254. In diamond 266, a determination is made whether this projection exceeds the control point minus an offset.

This value (CP minus OFFSET), with which the projections are compared in diamonds 258 and 266, is the shed limit 292 as shown in FIG. 5. It is a fixed offset below the control point 290. The offset is 0.5 kilowatts, which prevents rounding errors and slight control overshoots from pumping up the control point. If the second projection calculated in block 264 is above this shed limit, the SHED routine is called to turn off one load in block 268. This permits controller 10 to respond more quickly to increases in demand.

If the value calculated is not above the shed limit then a determination is made whether it is below the restore limit 294. This is done in diamond 274. The restore limit 294 is 0.9 times the control point minus the same 0.5 kilowatt offset. A deadband of 0.1 times the control point is thus generated between the shed and restore limits. Within this deadband no control action is taken. If the projection of block 264 is below the restore limit, a call to the RESTORE subroutine is made in block 278 to turn on one load. Diamond 276 makes this call of the RESTORE routine conditional however upon the flag of block 262 not being set. This prevents the control loop defined generally by dotted line 272 from negating the effects of the control loop defined generally by dotted line 256.

Another important aspect of this control scheme is that the SHED routine may be called two times during each pass therefore permitting two loads to be shed each minute. This allows the maximum control effort to be realized in four minutes rather than eight minutes. This is useful because the algorithm has no information on which of the controllable loads 40a-h is actually in use. Therefore, it may gate off power to a load which the user has not turned on by means of the local switch on the load itself. Since this would not decrease demand, it is preferable to shed at a higher rate because the instantaneous demand may exceed the control point during the period of time that the controller is searching for a load that is on. Then, when the demand is finally brought back under control, if the uncontrolled demand area is large enough, the average demand may also exceed the control point. Unnecessarily shed loads may be restored later.

Shedding Loads

Figure 6:
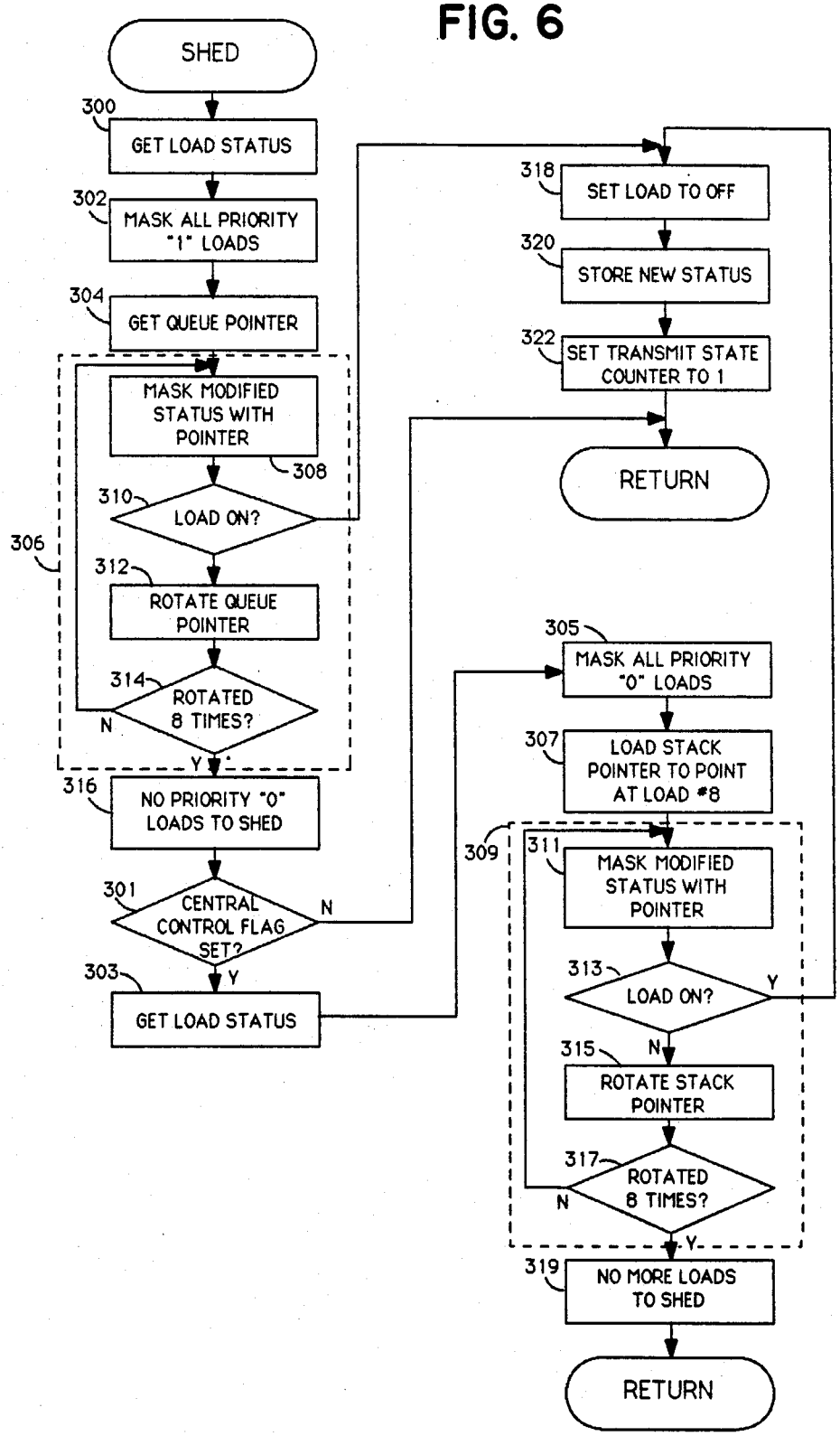
FIG. 6 shows the routine used by the programmable load controller to shed loads.

As shown in FIG. 6, SHED is the routine which turns one of loads 40a-h off each time the routine is called. The control routine diamonds 258 and 266 of FIG. 4 determine whether the SHED routine is called in diamonds 260 and 268 respectively.

Upon entering the SHED routine, the priority load byte eliminates all the priority 1 loads from possible control action. Priority 1 loads are those loads which the user has defined as not subject to control and which should therefore not be shed unless controller 10 is in the DEFER mode. These loads are masked to appear off in step 302. Since the SHED routine is looking for loads which are on, no control action will be taken with respect to them. This masked byte then contains the status of all controllable loads that are on. A queue pointer, which is a RAM byte containing a 1 in a single bit position, points to the bit position of the load which has been off the longest period of time. This queue pointer is fetched in block 304. It is from this position that the SHED routine searches for the next load to turn off.

In the steps defined generally by dotted line block 306 the pointer is rotated in a circular fashion (block 312) from its present position to the next numerically higher position (i.e. from 2 to 3, 5 to 6, 8 to 1 etc.) until a non-priority load that is on is found or until the pointer has been rotated 8 times.

This is accomplished by determining in diamond 310 whether the load pointed to is on. If it is not, block 312 will rotate the pointer and diamond 314 will send execution back to block 308 if the queue pointer has not been rotated 8 times.

If a load that is on has not been found after all eight rotations as determined by diamond 314, all the non-priority loads are off as seen in block 316. If an on load is found by diamond 310, the load status is modified in block 318 and stored back in RAM 14b in block 320. The transmit state counter is then set to 1 in block 322 to initiate the transmission of the new status to the receivers. The queue pointer is not permanently altered and it is restored to its original position before the return to the calling program.

If controller 10 is not in the defer mode, as detemined in decision 301, priority loads may not be shed. Thus if there are no non-priority loads still energized a return from the SHED routine must be executed without setting any loads to off in block 318. If the central control flag is not set execution from decision 301 passes to the return.

If the central control flag is set, as determined by diamond 301, the same procedure followed when shedding non-priority loads is performed in order to shed priority loads since priority loads may be controlled in the DEFER mode. Thus in block 303 the load status byte is fetched. However this time, as can be seen in block 305 the non-priority loads are masked, as opposed to the case in block 302 where the priority loads were masked. Priority loads are shed in a queue fashion, with a first off being the first on. The priority loads are turned on and off in numerical sequence, that is the priority load with the highest unit number is the first priority load to be turned off. This forms a stack arrangement, which provides for up to eight levels of priority within the priority group. This is implemented in block 307.

In block 307 a load stack pointer is set to point at load number 8. In block 311 this pointer is used to mask the load status byte. In diamond 313 a decision is made whether the load corresponding to the bit at which the load stack pointer points is on. If this load is on execution proceeds to block 318 where that load is turned off. However if the load pointed to is either a non-priority load or a priority load which is already off execution proceeds to block 315 at which the stack pointer is rotated. In diamond 317 a determination is made whether the stack pointer has been rotated eight times. If the answer is no it is still possible to find a priority load which is on and execution is returned to block 311. If the stack pointer has been rotated eight times there are no more loads to be shed as seen in block 319 and a return from the SHED routine is executed.

Thus the operations defined generally by the dotted line 309 perform for priority loads the same functions that the operations defined generally by dotted line 306 performed for non-priority loads. The pointer is rotated from one load to the next until a load which is on is found or until all loads have been tested.

Restoring Loads

RESTORE is the routine which turns loads back on. It is called from the control routine in blocks 252 and 278 of FIGS. 3 and 4 respectively.

Figure 7:
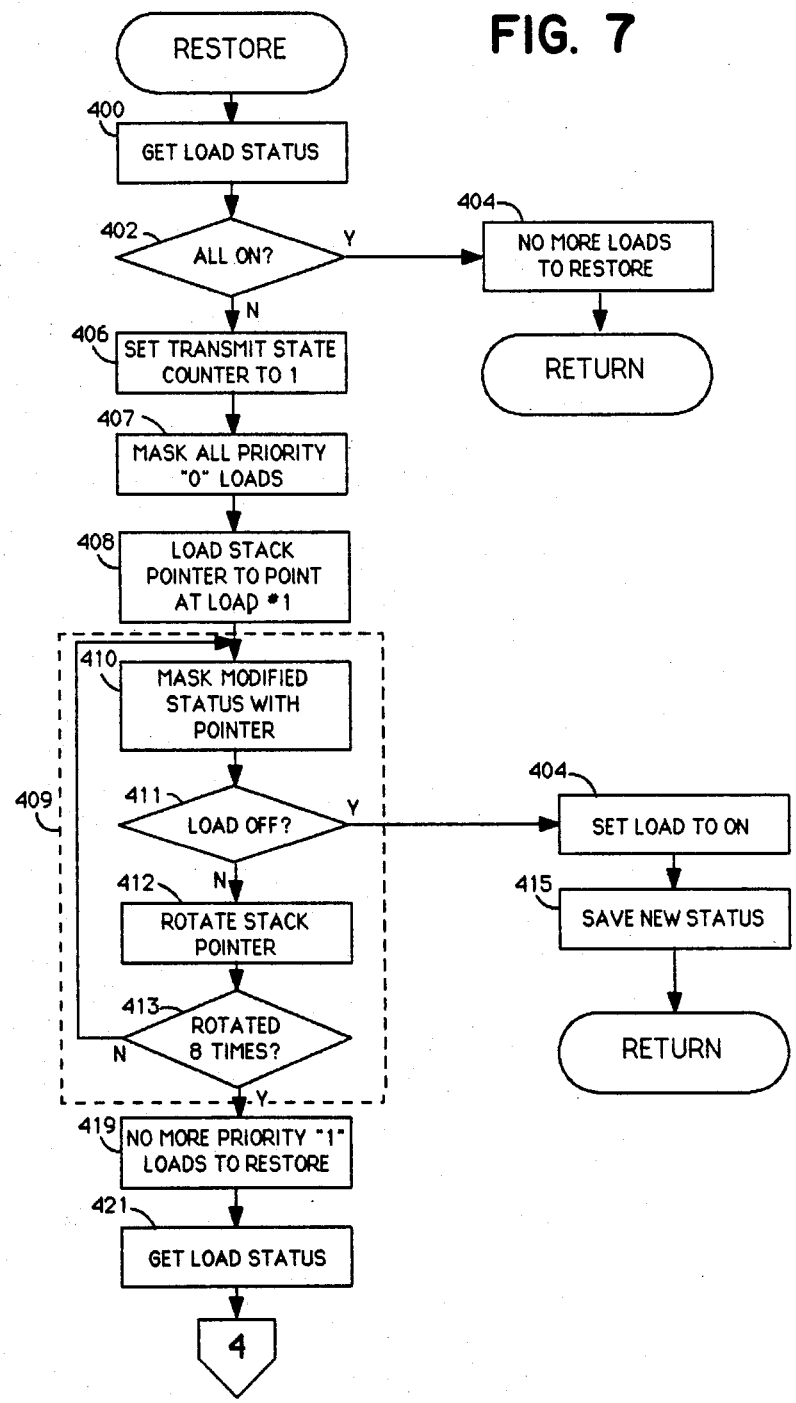
FIGS. 7 and 8 show the routine used by the programmable load controller to restore loads.
Figure 8:
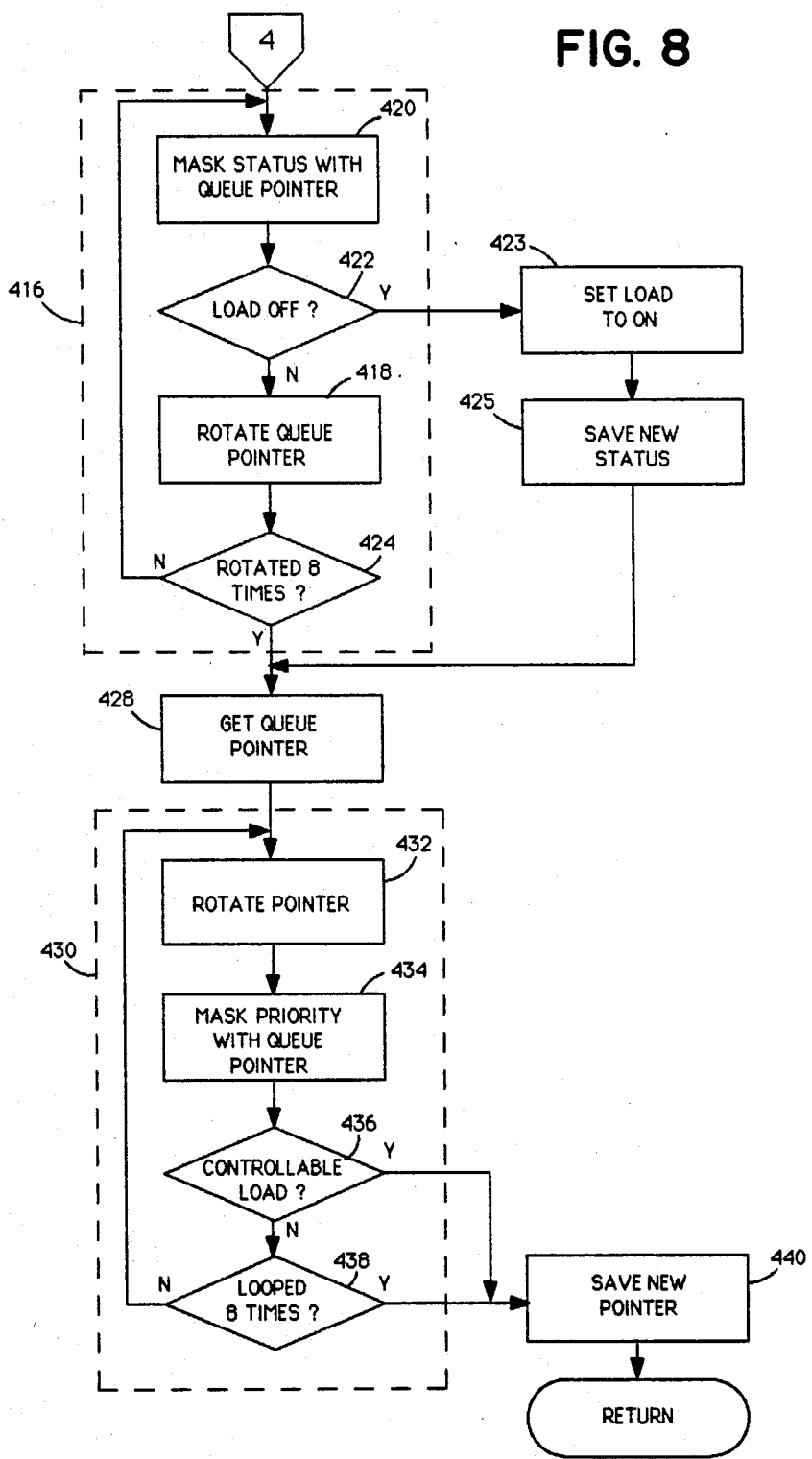

The RESTORE routine is shown in the flow chart of FIGS. 7 and 8. The load status byte is read in block 400 and in diamond 402 it is tested. If it is determined in diamond 402 that all loads are on there is nothing to restore and a return is executed. If at least one load is off the transmit state counter is set to 1 in block 406 to initiate the transmission of the revised load status to the receivers after returning to the calling routine.

The protocol for restoring loads is as follows. First priority loads are restored in numerical order starting from load one. This permits a hierarchy to be established among the priority loads. After all priority loads are restored non-priority loads may be restored. Non-priority loads are restored in a rotating queue fashion. The restoring of priority loads begins in block 407 where all non-priority loads are masked out of the load status byte. In block 408 a stack pointer pointing to load number one is loaded. In block 410 the status byte which was modified in block 407 is masked with the stack pointer loaded in block 408. On the basis of this masking a determination is made in diamond 411 whether the load pointed to is off. If the answer is yes that load is set to on in block 414 the new status is saved in block 415 and a return to the calling routine is executed.

If a determination is made in decision 411 that the load pointed to is on the stack pointer is rotated in block 412 and a determination is made in decision 413 whether the stack pointer has been rotated through all eight loads in decision 413. If all eight loads have not been tested execution returns to block 410 and the next load is tested. Thus the operations defined generally by dotted line 409 test each of the priority loads sequentially starting from load number one to determine whether any are off. If a priority load is found to be off it is turned on and a return executed. If no such load is found there are no priority loads off to restore as seen in block 419 and the load status byte is reloaded in block 421.

The operations defined generally by dotted line 416 shown in FIG. 8 perform upon the non-priority loads essentially the same operations as those performed for the priority loads by the operations defined generally by dotted line 409. In block 420 the load status byte is masked with the queue pointer. In decision 422 a determination is made whether the non-priority load pointed to is off. If the load is off it is set to on in block 423 and the new status byte is saved in block 425. If the load is not off the queue pointer is rotated in block 418 and a determination is made in decision 424 whether the queue pointer has been rotated through all eight loads. If it has not been rotated eight times execution returns to block 420 and the process is repeated.

If either the queue pointer is rotated through all eight loads and no loads are found which can be restored or, alternatively, if an off load is found and it is restored, the queue pointer is fetched in block 428. This is the same queue pointer that was used as a mask in block 420 and whether an off load has been found or not it must be updated by the operations defined generally by dotted line 430.

If an off load is not found, the next controllable load must be determined for the SHED routine. This is accomplished in the loop defined generally by dotted line 430. The next controllable load is located by getting the original queue pointer in block 428, rotating it in block 432 and masking it with the priority byte in block 434. In diamond 436 a test of the bit which resulted from this masking will determine whether the load pointed to is controllable. If so then the pointer is pointing at the next controllable load and it is saved in block 440. This loop continues until a controllable load is found in diamond 436 or until the pointer is rotated through the seven remaining loads as determined by diamond 438.

Synchronization

Figure 9:
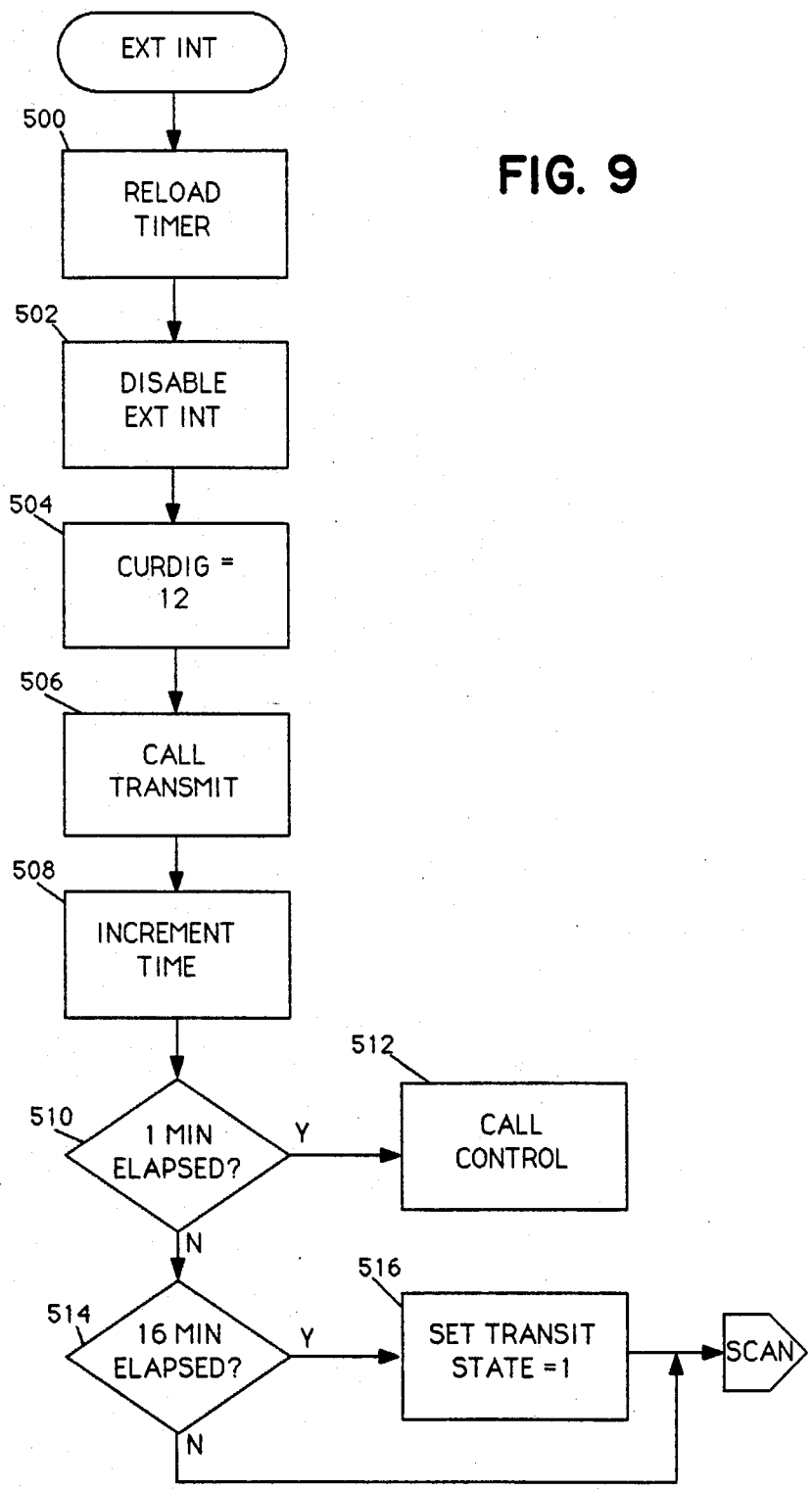
FIG. 9 shows the external interrupt service routine.
Figure 10:
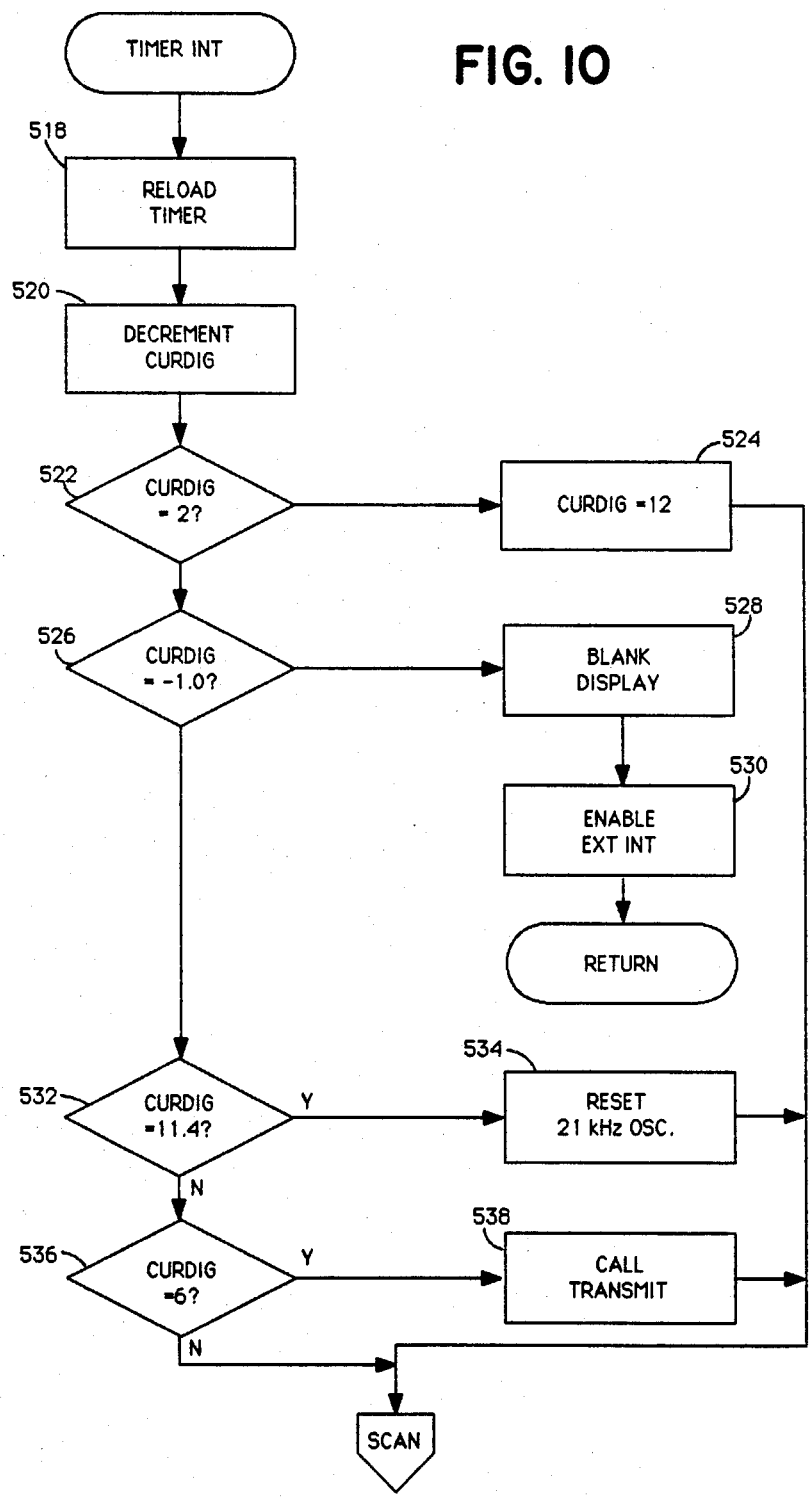
FIG. 10 shows the timer interrupt service routine.
Figure 11:
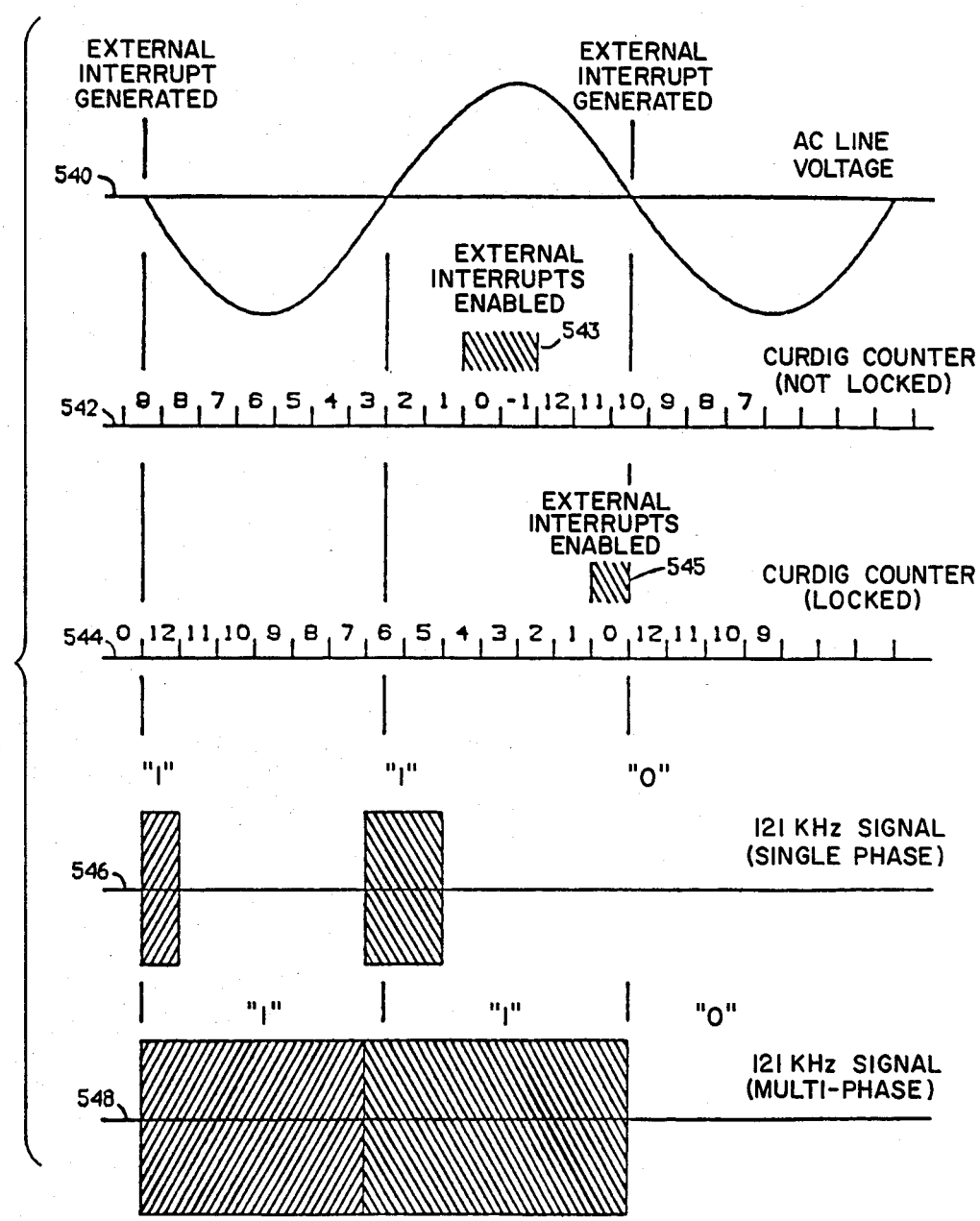
FIG. 11 shows the relationship between the AC line, the CURDIG counter, and the bits of control information.

Synchronization with AC line 33 is very critical since the receivers use the zero crossings as a strobe to sample line 33 for the presence of the carrier. This synchronization is accomplished by utilizing a software phase lock loop or SPLL. The SPLL external interrupt flow chart is shown in FIG. 9 and the SPLL timer interrupt flow chart is shown in FIG. 10. FIG. 11 shows a graph 540 of one cycle of AC line 33 with which controller 10 is to be synchronized. FIG. 11 also shows the contents of the SPLL loop counter, CURDIG, in RAM 14b both before and after synchronization on graphs 542 and 544 respectively.

When the system is first powered up, the CURDIG counter and AC line 33 are not synchronized. (Compare graphs 540 and 542.) Internal timer interrupts every 1.28 milliseconds cause the CURDIG counter to count down from 12 to 1. This is accomplished by decrementing CURDIG in block 520 after the internal timer has been reloaded in block 518. A total of 15.36 milliseconds has ellapsed when the counter reaches 0 and during this countdown interval the external interrupts by AC line 33 have been disabled by block 502. Counts 0 and $-1$ are detected by diamond 526 causing the external interrupt to be enabled in block 530. The relationship of the external interrupt to the CURDIG counter can be seen at window 543, FIG. 11.

These external interrupts are caused by the negative going zero crossing of the AC line as detected by AC conditioning circuit 22, FIG. 1. The time period when the external interrupts are enabled is called the external interrupt window or the EXTINT window. If the negative going zero crossing does not occur during this window, the external interrupts are not re-enabled after being disabled in block 502. This technique yields a free running (i.e. no interrupts) frequency at 55.8 Hertz (17.91 milliseconds), which results in a nominal beat frequency of 4.2 Hertz with the 60 Hertz line.

Since the two frequencies are not identical, the phase relationship between the two waveforms changes with time until the negative going zero crossing occurs during the EXTINT window. When the external interrupt is sensed during this window, the timer is reloaded in block 500 and the CURDIG counter is loaded to 12 again by block 504. By reloading the timer in block 500 the unit has guaranteed that the next negative zero crossing will occur during the EXTINT window (shown at 545 of FIG. 11), and the unit is therefore synchronized with the AC line. The window has been chosen large enough to allow for normal variations in both the AC line frequency and the microprocessor clock frequency.

For single phase control, diamond 532 detects when the CURDIG counter reaches 11 or 4. Comparison of graph 546 with graph 544 shows that the beginning of count 11 marks the end of the bit transmission initiated at the negative going zero crossing and that the beginning of count 4 marks the end of the bit transmission initiated at the positive going zero crossing. Thus, whenever counts 11 or 4 are detected, execution is sent to block 534 where 121 KHz oscillator 32 is reset. Oscillator 32, FIG. 1 provides the carrier signal which is injected onto AC line 33 to transmit control words to loads 40a–h. For multiple phase control, diamond 532 and block 534 are eliminated, resulting in transmission for a full half cycle as shown in graph 548 of FIG. 11.

The transmission for multiple phase control shown in graph 548 of FIG. 11 should be compared with the standard transmission procedure shown in FIGS. 19A and 19B. Bit 624 of FIG. 19B begins at approximately the positive going zero crossing of phase 1 of FIG. 19A (±100 microseconds) and continues for 1 millisecond. Bit 626 begins approximately 2.778 msec. after the beginning of bit 624. This is timed to coincide with the zero crossing of phase 2 of FIG. 19A. The timing of bit 628 is such that it coincides with the zero crossing of phase 2. Likewise the timing of bit 628 is such that it coincides with the zero crossing of phase 3. These bits are timed with respect to phase 1 to coincide with the zero crossings of phases 2 and 3 because the receivers on each phase look for transmissions only at their own zero crossings. Thus if phases 2 and 3 had different phase angles with respect to phase 1, bits 626 and 628 would not be received.

One solution would be to place a transceiver between the transmitter and the receiver for phases 2 and 3. The transceiver receives the transmitted bit, re-synchronizes it with the zero crossing, and transmits it to the receiver. This is inefficient because a transceiver would be required for every load not on phase 1.

The problem is solved by load controller 10 by transmitting the bit for a complete half cycle as shown in FIG. 11, graph 548. Regardless of the phase angles of phases 2 and 3, they must have a zero crossing somewhere within the time in which the bit shown is transmitted. Whenever the receivers on phases 1 and 2 encounter zero crossings and look for transmissions the bit is present. Thus the need for transceivers is removed for all possible phase relationships in a multiple phase control system.

Diamond 536 detects when the CURDIG counter reaches 6. Recall that once the SPLL locks onto the AC line frequency, CURDIG counts down from 12 to 1 between one negative going zero crossing and the next. A count of 6 is halfway through CURDIG's range and is used to estimate the time of the positive going zero crossing. When the 6 is detected, execution is sent to block 538 which calls the TRANSMIT subroutine, initiating the transmission of a bit as seen in graph 546 of FIG. 11.

The initiation of the bit transmitted at the negative going zero crossing is done in block 506. This also can be seen in graph 546 of FIG. 11. After transmission has been initiated, time registers are incremented in block 508. When the seconds register overflows, as determined by diamond 510, the control routine of FIGS. 2–4 is called. When diamond 514 detects the passage of sixteen minutes, it is time for the automatic periodic writing to all eight loads. Therefore execution is sent to block 516.

Figure 12:
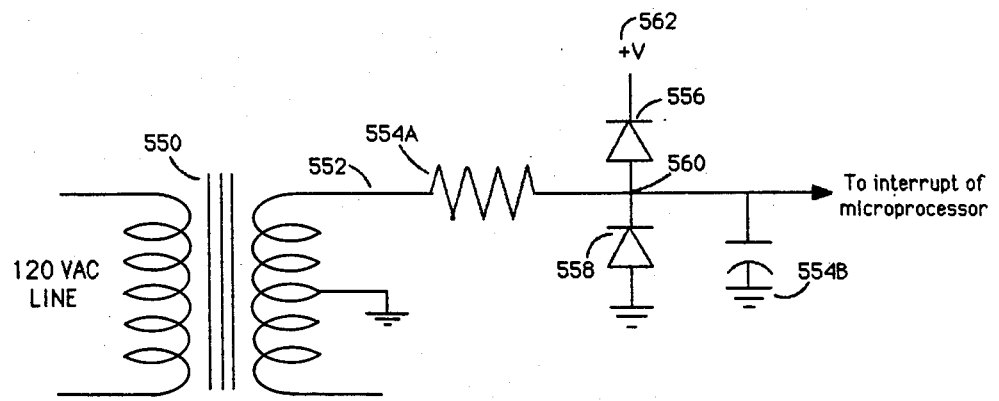
FIG. 12 shows the meter conditioning circuit.

The detailed circuitry of negative zero crossing detection or conditioning circuit 22, FIG. 1 is shown in FIG. 12. Isolation from the line is accomplished via a transformer 550. The voltage of the 24 volt winding 552 is applied through a single stage low pass RC filter formed by resistor 554a and capacitor 554b and then to the interrupt pin of processor 14. High frequency noise which would cause false triggering is eliminated by the filter. However the pole of this filter cannot be too low in frequency or the resultant phase shift would cause errors in the zero crossing detection. Some compensation for this phase shift has been designed into the system by virtue of the finite threshold of the interrupt pin of microprocessor 14.

Since transformer winding 552 is referenced to ground an ideal zero crossing detector would detect the transition of the signal through the ground level. Interrupts are generated by a negative transition and the threshold of the interrupt pin is a minimum of 0.8 volts. Diode 556 clips the voltage at junction 560 preventing a rise above 5 volts due to the 5 volt supply 562. Diode 558 clamps the point 560 at the 0.8 volt level during time the line voltage makes a negative going zero crossing allowing the processor to keep track of the time and to synchronize with AC line 33.

Figure 13:
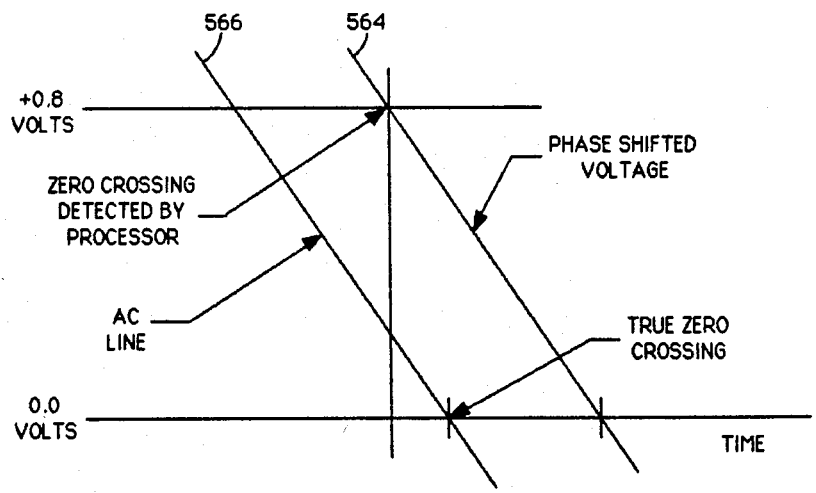
FIG. 13 shows the phase relationship of the zero crossing detector.

An interrupt is therefore generated early creating a negative phase shift as shown by line 564 in FIG. 13. Examination of the BSR format specification indicates an extremely tight specification (+100 micro seconds) on the delay between the actual zero crossing and the start of a bit. Starting a bit early is acceptable since each receiver 38a–h uses the zero crossing as a strobe to sample the line for the carrier. By starting the bit early, less accurate zero crossing detection is required for proper operation. This early start technique is exploited to a minor degree on the negative going zero crossing due to the positive threshold of the interrupt pin. More importantly it is utilized on timer interrupt 6 (graphs 544 and 546, FIG. 11) which is used to predict a positive going zero crossing and occurs 0.653 milli seconds or 14 electrical degrees prior to the actual positive going zero crossing. By relying on the internal timer and using the early start technique the need to detect the actual positive going zero crossing is eliminated.

Where an external interrupt FIG. 9 or timer interrupt FIG. 10 occurs, the TRANSMIT subroutine is called to determine if a bit should be sent and if so whether it is a 1 or a 0. This routine generates the control word transmitted to loads 40a–h in FIG. 1. The calls of the TRANSMIT subroutine can be seen in blocks 506 and 538 of the interrupt service routines of FIGS. 9 and 10 respectively.

Figure 14:
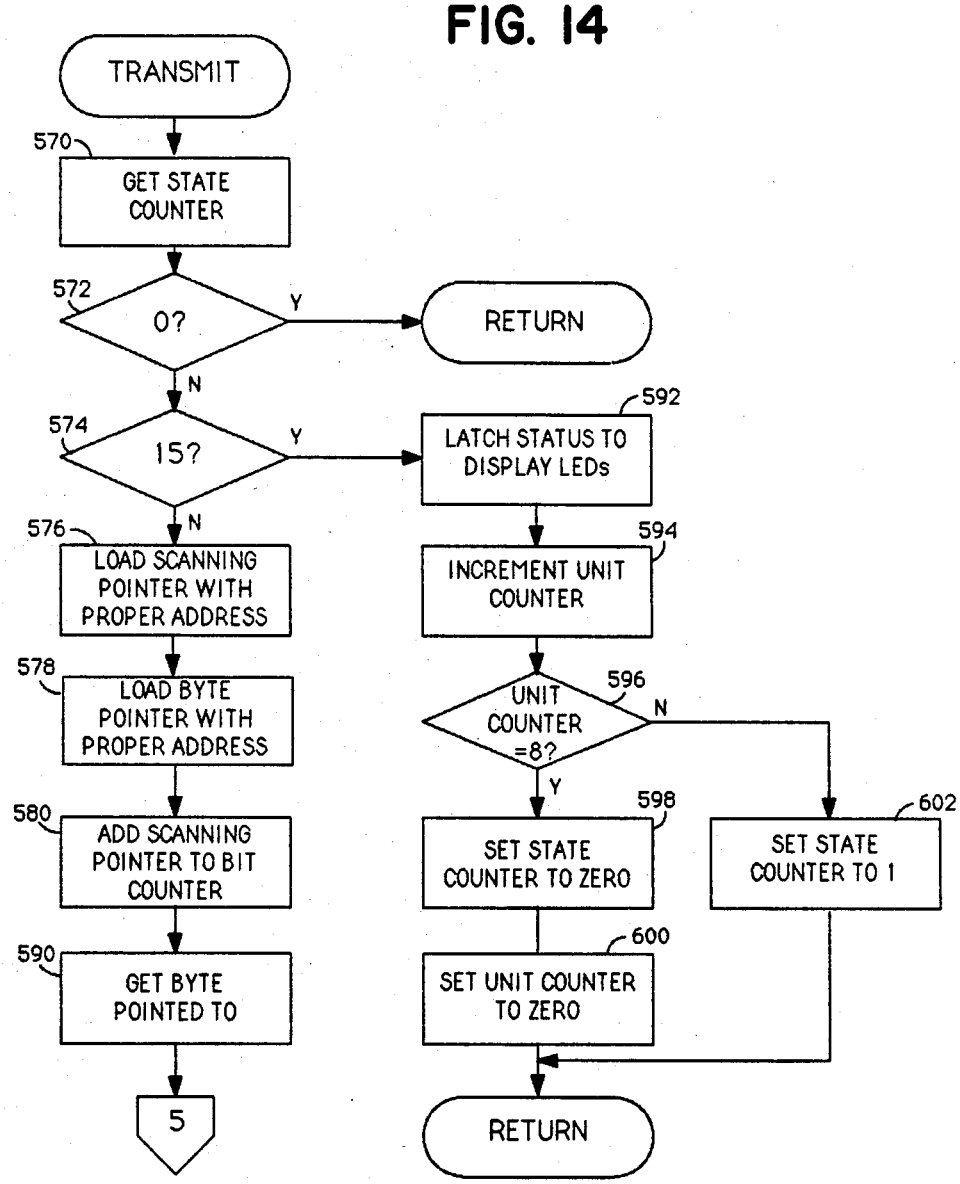

FIG. 14 and FIG. 15 show the flow chart of the TRANSMIT subroutine. The TRANSMIT subroutine checks the state counter in RAM 14b to see if transmission is required. If transmission is requested (state counter equal to 1) or underway (state counter greater than 1) the TRANSMIT subroutine determines the proper bit. The bit is determined in real time and this is another approach that is made possible by the early start strategy.

A high frequency amplitude modulated signal is injected onto line 33 which is connected to receivers 38a–h. The basic format comprises a 22 bit word transmitted serially with each bit being synchronized with a zero crossing of AC line 33. Table 1 shows the serial data format comprising 11 cycles of AC line 33. A 22 bit word can be broken into three sections, the start code, the security code and the key code. Tables 1-5 are attached as an Appendix.

The start or framing code is four bits long and is used to synchronize the receivers with the word being transmitted.

The second section is the security or house code as shown in Table 2. These bits identify 16 possible security codes as shown, absent the intervening compliment bits. All receivers in one residence are typically given the same security code. By assigning different security codes to each transmitter, several transmitters can operate on the same lines without interference. This is particularly useful when two residences each have a transmitter or more importantly when two apartments in the same building wish to utilize transmitters.

The third section, which is shown in Table 3, is the key code or operation code which is ten bits long. This section is either the unit number and half of the address or function command. Sixteen of the 22 defined codes are the unit numbers. A unit number is a second half of a receiver's address. There are four key codes which specify an operation. The remaining two codes are the ALL which is used to address all the units on a particular security code and the CLEAR code which resets receivers 38a-h.

Figure 16A:
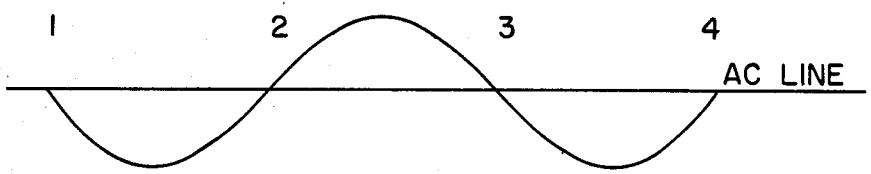
FIGS. 16A and 16B show the relationship between the AC line voltage and bits of information.
Figure 16B:
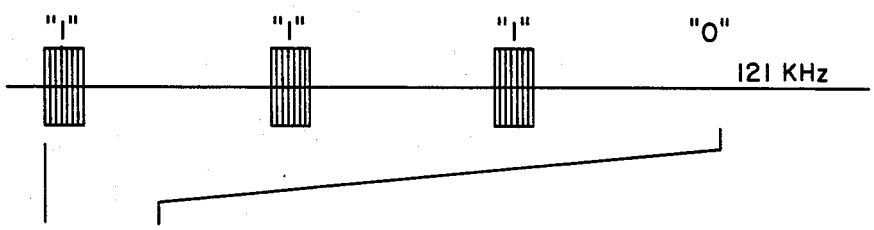
Figure 17A:
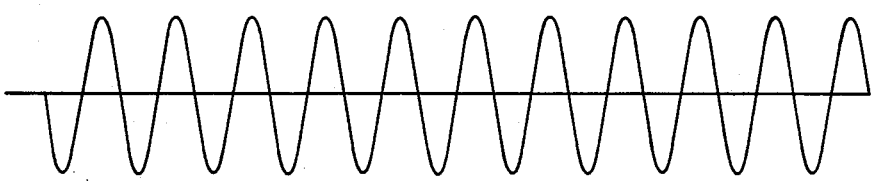
FIGS. 17A, 17B, 18A and 18B show detailed descriptions of the bits of information.
Figure 17B:
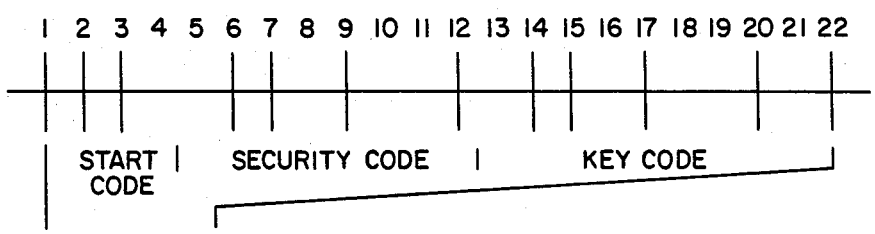
Figure 18A:
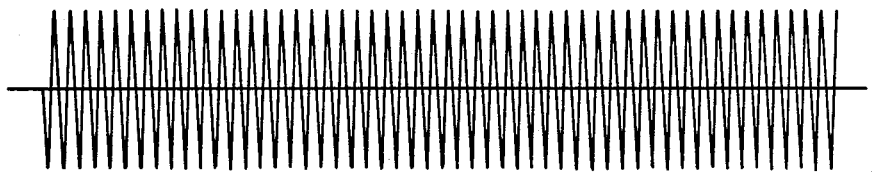
Figure 18B:
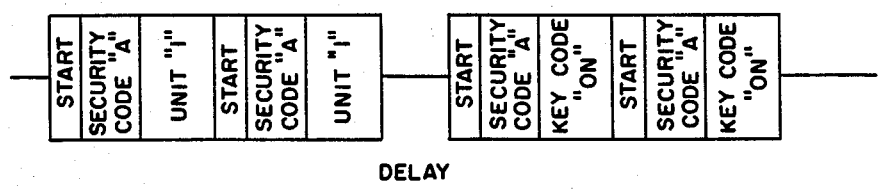

In order to have a receiver 38a-h perform an operation it must first be addressed by sending a word having the proper security code and the proper unit code. This word is transmitted twice to assure correct reception followed by 6 cycles of no transmission. After the 6 cycle delay a second word, again having the proper security code but containing the appropriate operation command, is transmitted. This word is also transmitted twice. In total, 50 cycles or 0.833 seconds are required to transmit a complete message to a single receiver. FIGS. 17A-17B, 18A-18B show a complete message transmission. In the technique employed by present systems, a 1 bit comprises three separate bursts of carrier as shown in FIG. 16B. These three bursts are spaced at 60 electrical degrees so as to allow 3 phase communication as seen in FIGS. 19A-19B. This is required due to the fact that receivers 38a-h use a zero crossing as a strobe. The first burst begins within 100 micro seconds of the actual zero crossing. Each burst is 1 millisecond in duration and the leading edges of the three bursts are spaced at exactly 60 electrical degrees (2.778 milliseconds).

The 22 bit word is synthesized in three segments. In the TRANSMIT subroutine checks are made of the state counter in diamonds 572, 574 and 606, FIGS. 14, 15 to determine what section of the word is being transmitted. There are fifteen states as shown in Table 4. Bit patterns for each section are stored in table form in the EPROM 16 and these tables are scanned by the TRANSMIT routine to determine the proper bit. This scanning is two dimensional in nature with one pointer incrementing each time a bit is transmitted and the other pointer being set at the start of a particular section of the word. In order to be efficient in EPROM usage both vertical and horizontal scanning are utilized. Table 5 shows the EPROM table for the unit section.

After the present bit has been determined, the next byte is fetched from EPROM 16 and compared to the end of the section flag. If this next byte is the end of the section flag the state counter is advanced and the bit counter is zeroed in preparation for the next section. If the state counter is greater than 14 it is reset to 1 and the unit counter is advanced. This action causes a complete message with the appropriate unit code and operation code to be transmitted for each of the eight loads. Thus all loads will receive a control word containing their status each time the routine is executed. This process is performed periodically regardless of whether there is a status update or not.

After all eight loads 40a-h have been signalled, the state counter in RAM 14b is returned to 0 to again idle the TRANSMIT routine. Transmission to the eight loads 40a-h requires seven seconds and is executed every time a load status is changed and additionally every sixteen minutes. The extra transmission every sixteen minutes is to insure that the loads are in the proper state since CPU 14 cannot observe the state directly. This is also the reason for transmitting to the entire eight loads 38a-h rather than just transmitting the load that was just changed.

For single phase control it is necessary to inject the carrier only during a short time (1 millisecond) following the zero crossing. This is implemented by resetting oscillator 32 on timer interrupt counts eleven and four in blocks 532 and 534 of FIG. 10, the result of which is seen in graph 546 in FIG. 11. For multiple phase control the transmitter would only change states at the external interrupt or timer count six as seen in graph 548. This would result in the carrier being transmitted for the entire half cycle. In this manner any phase can be controlled. This technique is more effective than the techniques used by current systems shown in FIG. 19B.

Figure 20:
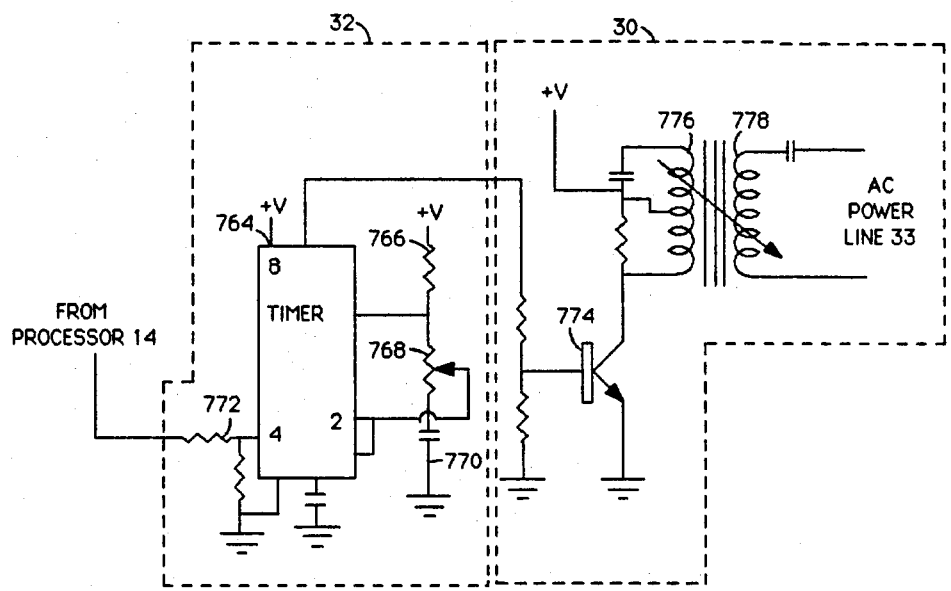
FIG. 20 shows the oscillator, driver, and coupling used by the programmable load controller to transmit bits of information to the loads.

The circuit for transmitter 31, FIG. 1 is shown in FIG. 20 and comprises an oscillator 32 and a driver and coupling 30. Oscillator 32 is gated on and off by a signal to processor 14 through resistor 772 to the enable pin of timer 764. A high level on this pin starts oscillator 32. The output of oscillator 32 is amplified and shaped by transistor 774 and tuned isolation transformer stage 776. This signal is coupled to AC line 33 by transformer secondary 778.

In programmable load controller 10 the following components have been used for the operation and function as described and shown.

| Reference Number | Component |
|---|---|
| 14 | 8039 |
| 16 | 8755 |
| 28 | 74LS363 |
| 32 | LM555 |

TABLE 1

| 1 | | 2 | | 3 | | 4 | | 5 | | 6 | | 7 | | 8 | | 9 | | 10 | | 11 | | CYCLE |
|---|---|---|---|---|---|---|---|---|---|---|---|---|---|---|---|---|---|---|---|---|---|---|
| S | S | S | S | H | H̄ | H | H̄ | H | H̄ | H | H̄ | D | D̄ | D | D̄ | D | D̄ | D | D̄ | D | D̄ | BIT |
| 1 | 2 | 3 | 4 | 8 | 8 | 4 | 4 | 2 | 2 | 1 | 1 | 8 | 8 | 4 | 4 | 2 | 2 | 1 | 1 | 16 | 16 | |
| START CODE | | | | SECURITY CODE | | | | | | | | KEY CODE | | | | | | | | | | |

TABLE 2

| SECURITY CODE | H8 | H4 | H2 | H1 |
|---|---|---|---|---|
| A | 0 | 1 | 1 | 0 |
| B | 1 | 1 | 1 | 0 |
| C | 0 | 0 | 1 | 0 |
| D | 1 | 0 | 1 | 0 |
| E | 0 | 0 | 0 | 1 |
| F | 1 | 0 | 0 | 1 |
| G | 0 | 1 | 0 | 1 |
| H | 1 | 1 | 0 | 1 |
| I | 0 | 1 | 1 | 1 |
| J | 1 | 1 | 1 | 1 |
| K | 0 | 0 | 1 | 1 |
| L | 1 | 0 | 1 | 1 |
| M | 0 | 0 | 0 | 0 |
| N | 1 | 0 | 0 | 0 |
| O | 0 | 1 | 0 | 0 |
| P | 1 | 1 | 0 | 0 |

TABLE 3

| KEY | D8 | D4 | D2 | D1 | D16 |
|---|---|---|---|---|---|
| 1 | 0 | 1 | 1 | 0 | 0 |
| 2 | 1 | 1 | 1 | 0 | 0 |
| 3 | 0 | 0 | 1 | 0 | 0 |
| 4 | 1 | 0 | 1 | 0 | 0 |
| 5 | 0 | 0 | 0 | 1 | 0 |
| 6 | 1 | 0 | 0 | 1 | 0 |
| 7 | 0 | 1 | 0 | 1 | 0 |
| 8 | 1 | 1 | 0 | 1 | 0 |
| 9 | 0 | 1 | 1 | 1 | 0 |
| 10 | 1 | 1 | 1 | 1 | 0 |
| 11 | 0 | 0 | 1 | 1 | 0 |
| 12 | 1 | 0 | 1 | 1 | 0 |
| 13 | 0 | 0 | 0 | 0 | 0 |
| 14 | 1 | 0 | 0 | 0 | 0 |
| 15 | 0 | 1 | 0 | 0 | 0 |
| 16 | 1 | 1 | 0 | 0 | 0 |
| CLEAR | 0 | 0 | 0 | 0 | 1 |
| ALL | 0 | 0 | 0 | 1 | 1 |
| ON | 0 | 0 | 1 | 0 | 1 |
| OFF | 0 | 0 | 1 | 1 | 1 |
| DIM | 0 | 1 | 0 | 0 | 1 |
| BRIGHT | 0 | 1 | 0 | 1 | 1 |

TABLE 4

| STATE | SECTION | STATE | SECTION |
|---|---|---|---|
| 0 | IDLE (NOP) | | |
| 1 | START | 8 | START |
| 2 | SECURITY | 9 | SECURITY |
| 3 | UNIT | 10 | OPERATION |
| 4 | START | 11 | START |
| 5 | SECURITY | 12 | SECURITY |
| 6 | UNIT | 13 | OPERATION |
| 7 | DELAY | 14 | DELAY |

TABLE 5

| | 87654321 | UNIT NUMBER |
|---|---|---|
| DB | 10101010B | ;D8 |
| DB | 01010101B | ;-D8 |
| DB | 11000011B | ;D4 |
| DB | 00111100B | ;-D4 |
| DB | 00001111B | ;D2 |
| DB | 11110000B | ;-D2 |
| DB | 11110000B | ;D1 |
| DB | 00001111B | ;-D1 |
| DB | 00000000B | ;D16 |
| DB | 11111111B | ;-D16 |
| DB | 11000000B | ;FLAG |

```
LOC  OBJ      LINE     SOURCE STATEMENT

1 ;      FUNCC 2K VERSION FOR USE WITH 8039 AND 8755, CONFIGURED FOR PC LAYOUT
0068          2        VERSION EQU 68H  ;01/11/1983
              3 ;      FOR CENTRAL LOAD CONTROL
              4 ;
              5 ;*****************************************************************
              6 ;
              7 ;      INITIAL EQUATES TO DEFINE SYSTEM CONFIGURATION
              8 ;
              9 ;*****************************************************************
             10 ;
0005         11 ORG    005H
0005 68      12        DB       VERSION ;STORE FUNCC VERSION LEVEL IN LOCATION 5
             13 ;
             14 ;
0001         15 PDIGIT EQU      01      ;USED TO ENABLE CHARACTERS AND STROBE ROWS OF KEYBOARD
             16                         ;PORT B ON 8755
0000         17 PSGMNT EQU      00      ;USED TO TURN ON SEGMENTS OF CURRENTLY ENABLED DIGIT
             18                         ;PORT A ON 8755
0009         19 PINPUT EQU      P2      ;PORT USED TO SCAN FOR KEY CLOSURES
             20                         ;(NOTE THAT THIS PORT ALLOCATION USES THE HIGHER
             21                         ;CURRENT SOURCING ABILITY OF THE BUS TO SWITCH ON THE
```

```
                22                    ;DIGIT DRIVERS AND LEAVES P23-P20 FREE FOR USING
                23                    ;AN 8243 PORT EXPANDER IN THE SYSTEM.)
0008            24 BTOUT   EQU   P1   ;PORT USED TO OUTPUT CONTROL BITS
                25 ;
0000            26 POSLOG  EQU   00H
00FF            27 NEGLOG  EQU   0FFH
                28 ;
00FF            29 CHRPOL  EQU   NEGLOG ;DEFINES WHETHER OUTPUT LINES ARE ACTIVE HI OR LOW
00FF            30 SEGPOL  EQU   NEGLOG ;FOR DRIVING CHARACTERS AND SEGMENT PATTERNS
00F2            31 INPMSK  EQU   0F2H  ;DEFINES BITS USED AS INPUT, BUT SETS P21 HIGH
                32                    ;SINCE THIS LINE ENABLES THE Z ANODE OF THE DISPLAY
                33 ;
                34 ;
0006            35 CHARNO  EQU   6     ;NUMBER OF DIGITS IN DISPLAY
000C            36 CHAR2   EQU   12    ;CHARNO X2
0004            37 NROWS   EQU   4     ;ROWS OF KEYS (LESS THAN OR EQUAL TO CHARNO)
0004            38 NCOLS   EQU   4     ;
                39 ;
FFF0            40 TICK    EQU   -10H  ;DETERMINES INTERRUPT INTERVAL, SCAN FREQUENCY 781HZ
0002            41 DEBNCE  EQU   2     ;NUMBER OF SUCESSIVE SCANS BEFORE KEY CLOSURE ACCEPTED
                42                    ;I.E. DEBOUNCE TIME, 31MSEC (DIVIDED BY 2)
0000            43 BLANK   EQU   00H   ;
                44                    ;
                45                    ;
                46 ;
000F            47 ENCMSK  EQU   0FH   ;
                48 ;
00F7            49 BSRBR   EQU   0F7H  ;BSR RESET MASK, BIT 3
0008            50 BSRBS   EQU   08H   ;BSR SET MASK, BIT 3
                51 ;
00FD            52 ZBR     EQU   0FDH  ;Z ANODE RESET MASK, BIT 1
0002            53 ZBS     EQU   02H   ;Z ANODE SET MASK, BIT 1
                54 ;
00FB            55 RMTRR   EQU   0FBH  ;METER READ MASK, BIT 2
0004            56 RMTRS   EQU   04H   ;METER READ SET MASK, BIT 2
                57 ;
00FE            58 STBR    EQU   0FEH  ;LATCH STROBE RESET MASK, BIT 0
0001            59 STBS    EQU   01H   ;LATCH STROBE SET MASK, BIT 0
                60 ;
00EF            61 ONPR    EQU   0EFH  ;ON PEAK RESET MASK, BIT 4
0010            62 ONPS    EQU   10H   ;ON PEAK SET MASK, BIT 4
                63 ;
00DF            64 OFPR    EQU   0DFH  ;OFF PEAK RESET MASK, BIT 5
0020            65 OFPS    EQU   20H   ;OFF PEAK SET MASK, BIT 5
                66 ;
00BF            67 HDR     EQU   0BFH  ;HIGH DEMAND RESET MASK, BIT 6
0040            68 HDS     EQU   40H   ;HIGH DEMAND SET MASK, BIT 6
                69 ;
007F            70 MBR     EQU   7FH   ;METER FLAG RESET MASK, BIT 7
0080            71 MBS     EQU   80H   ;METER FLAG SET MASK, BIT 7
                72 ;
                73 ;
0000            74 SCALE   EQU   00    ;NUMBER OF WH PER PULSE XXX.X, BCD, HIGH BYTE
0072            75 SCALEL  EQU   72H   ;LOW BYTE (WH AND TENTHS OF WH)
                76 ;
                77 ;
00A5            78 KEY1    EQU   0A5H
005A            79 KEY2    EQU   05AH
                80 ;
                81 ;
```

```
        82 ;####################################################
        83 ;
        84 ;         BANK 0 REGISTERS USED
        85 ;
        86 ;
        87 ;POINTERS USED FOR INDIRECT RAM ACCESSING:
0000    88 PNTR0   EQU   R0
0001    89 PNTR1   EQU   R1
0002    90 DISP    EQU   R2         ;POINTER TO TOP ADDRESS OF BYTES TO BE DSPLAYED
0003    91 NUMB    EQU   R3         ;TOP 4 BITS ARE DIGIT NUMBER TO BE FOLLOWED BY
        92                          ;DECIMAL POINT, LOW 4 BITS ARE NUMBER OF DIGITS
        93                          ;TO BE DISPLAYED
0004    94 TEMP1   EQU   R4
0005    95 TEMP2   EQU   R5
0006    96 TEMP3   EQU   R6
0007    97 NEXTPL  EQU   R7         ;USED TO KEEP TRACK OF CHARACTER POSITION BEING
        98                          ;WRITTEN INTO
        99 ;
        100 ;####################################################
        101 ;
        102 ;         BANK 1 REGISTER ALLOCATION
        103 ;
        104 ;PNTR0   EQU   R0       (ALREADY DEFINED)
        105 ;PNTR1   EQU   R1
0002    106 ASAVE   EQU   R2        ;
0003    107 HSCDE   EQU   R3        ;HIGH 4 BITS OF HSCDE ARE THE SECURITY CODE
        108                         ;LOW 4 BITS ARE A COUNTER FOR THE BSR ROUTINE
0004    109 ROTPAT  EQU   R4        ;
        110 ;TEMP1   EQU   R4       (ALREADY DEFINED) CAN BE USED AS LONG AS NOT IN SCAN
0005    111 ROTCNT  EQU   R5        ;
        112 ;TEMP2   EQU   R5       (ALREADY DEFINED) SAME AS TEMP1 ABOVE
0006    113 LASTKY  EQU   R6        ;
0007    114 CURDIG  EQU   R7        ;
        115 ;
        116 ;####################################################
        117 ;
        118 ;         DATA RAM ALLOCATION
        119 ;
0020    120 NREPTS  EQU   32        ;
0021    121 KEYLOC  EQU   33        ;
0022    122 KBDBUF  EQU   34        ;
        123                         ;
0023    124 RDELAY  EQU   35        ;
        125 ;
0024    126 P0SVE   EQU   36        ;PNTR0 SAVE
0025    127 P1SVE   EQU   37        ;PNTR1 SAVE
        128 ;
        129 ;
        130 ;     THE LAST<CHARNO> REGISTERS HOLD THE DISPLAY SEGMENT PATTERNS
        131 ;
0039    132 SEGMAP  EQU   57        ;
        133                         ;
        134 ;     NEXT REGISTER BELOW DISPLAY REGISTER IS BAR (Z ANODE) SEGMENT MAP
        135 ;
0039    136 BAR     EQU   57        ;
        137 ;
        138 ;     SECOND REGISTER BELOW DISPLAY REGISTER IS LOAD CONTROL MAP
        139 ;
0038    140 LOADM   EQU   56        ;
        141 ;
        142 ;
```

```
0037        143 DAY    EQU    55         ;DAY OF THE WEEK,1 IS MON,7 IS SUNDAY
            144 ;
0036        145 HOUR   EQU    54         ;HOURS IN BCD AND MILITARY TIME
0035        146 MIN    EQU    53         ;MINUTES IN BCD
            147 ;
0034        148 MINB   EQU    52         ;MINUTES IN BINARY
            149 ;
0033        150 SSH    EQU    51         ;60HZ COUNTER HIGH ORDER
0032        151 SSL    EQU    50         ;60HZ COUNTER LOW ORDER
            152 ;
0031        153 STATE  EQU    49         ;BSRX STATE COUNTER
            154                          ;HIGH 4 BITS OF CODE ARE THE UNIT NUMBER
            155                          ;AND THE LOW4 BITS ARE THE STATE
            156 ;
            157 ;
0030        158 BUFF   EQU    48         ;BUFF IS THE DISPLAY BUFFER THAT IS ENCODED.
            159                          ;IN DECIMAL, WITH EACH NIBBLE A DIGIT.  THE
            160                          ;LEFTMOST DIGIT IS IN LOCATION 48.
            161 ;
            162 ;
002D        163 TIME4  EQU    45         ;END OF PEAK PERIOD 2, ALL TIMES ARE IN
            164                          ;BCD AND MILITARY TIME. 2 BYTES, 45 & 44
            165 ;
002B        166 TIME3  EQU    43         ;BEGINNING OF PEAK PERIOD 2. BYTES 43 & 42
            167 ;
0029        168 TIME2  EQU    41         ;END OF PEAK PERIOD 1. BYTES 41 & 40
            169 ;
0027        170 TIME1  EQU    39         ;BEGINNING OF PEAK PERIOD 1. BYTES 39 & 38
            171 ;
            172 ;
            173 ;
0044        174 KWHH   EQU    68         ;TOTAL KILOWATT HOURS. BCD, 3 BYTES
0042        175 KWHHL  EQU    66         ;LOW BYTE
            176 ;
0041        177 KWCNT  EQU    65         ;TOTAL WATT HOURS. BCD, 2 BYTES, HI BYTE
0040        178 KWCNTL EQU    64         ;LOW BYTE, X.X
            179 ;
0046        180 DKWH   EQU    70         ;TODAY'S KWH, BCD, 2BYTES, HIGH BYTE
0045        181 DKWHL  EQU    69         ;LOW BYTE
            182 ;
0049        183 MKWH   EQU    73         ;THIS MONTH'S KWH, BCD, 3 BYTES, HIGH BYTE
0047        184 MKWHL  EQU    71         ;LOW BYTE
            185 ;
004E        186 PMKWH  EQU    78         ;LAST MONTH'S KWH,BCD,3 BYTES,HIGH BYTE
004C        187 PMKWHL EQU    76         ;LOW BYTE
            188 ;
004B        189 PDKWH  EQU    75         ;YESTERDAY'S KWH,BCD, 2 BYTES, HIGH BYTE
004A        190 PDKWHL EQU    74         ;LOW BYTE
            191 ;
            192 ;
            193 ;THE FOLLOWING LOCATIONS ARE DEMANDS IN KW.  THEY ARE TWO BCD BYTES OF
            194 ;THE FORM XX.XX KW.
            195 ;
0050        196 TH     EQU    80         ;TARGET, KW, BCD 2BYTES, HIGH BYTE
004F        197 TL     EQU    79         ;LOW BYTE
            198 ;
0054        199 SPH    EQU    84         ;CONTROL POINT, KW, BCD 2 BYTES, HIGH BYTE
0053        200 SPL    EQU    83         ;LOW BYTE
            201 ;
0052        202 HKWH   EQU    82         ;HIGHEST  KW SINCE LAST METER READING, HI BYTE
0051        203 HKWL   EQU    81         :LOW BYTE
```

```
            204 ;
0056        205 PHKWH   EQU     86              ;PREVIOUS MONTH'S HIGH KW. HIGH BYTE
0055        206 PHKWL   EQU     85              ;LOW BYTE
            207 ;
0058        208 KWH     EQU     88              ;AVERAGE DEMAND OVER LAST 15 MIN. HIGH BYTE
0057        209 KWL     EQU     87              ;LOW BYTE
            210 ;
            211 ;
005A        212 PRIRTY  EQU     90
0059        213 POINTER EQU     89
            214 ;
            215 ;
005B        216 MKEY1   EQU     91              ;MEMORY KEY TO DETERMINE IF MEMORY IS VALID
005C        217 MKEY2   EQU     92              ;  "        "
            218 ;
            219 ;
            220 ;LAST 31 MEMORY LOCATIONS CONTAIN THE KWH READINGS FOR THE LAST 15 MINUTES
            221 ;THESE READINGS ARE IN BCD, AND OF THE FORM XX.XX KWH.  THE FIRST READING IN
            222 ;THE TABLE IS 3 BYTES AND OF THE FORM XX.XXXX KWH.
            223 ;
0061        224 TABLLO  EQU     97              ;LOWEST BYTE OF LAST MINUTE'S KWH READING
0062        225 TABLL   EQU     98              ;MIDDLE BYTE OF LATEST ENTRY IN KWH TABLE
0063        226 TABLH   EQU     99              ;HIGH BYTE OF LATEST ENTRY IN KWH TABLE
            227 ;
007E        228 TABHL   EQU     126             ;LOW BYTE OF EARLIEST ENTRY OF KWH TABLE
007F        229 TABHH   EQU     127             ;HIGH BYTE OF EARLIEST ENTRY OF KWH TABLE
            230 ;
            231 ;
            232 ;
0500        233 BSRX    EQU     0500H           ;ORIGIN OF BSRX
            234 ;
0600        235 CUP     EQU     0600H
            236 ;
            237 $EJECT
            238 ;
0200        239     ORG     0200H
            240 ;
            241 ;
            242 ;
            243 ;KBDIN KEYBOARD INPUT SEQUENCE
0200 540C   244 KBDIN:  CALL    KEY             ;GET KEY
0202 031C   245 KBDIN1: ADD     A,#LEGNDS       ;ADD BASE ADDRESS OF LEGENDS TABLE
0204 A3     246         MOVP    A,@A            ;GET LEGEND
0205 83     247         RET
            248 ;
0206 540C   249 KBDIN2: CALL    KEY             ;GET KEY
0208 032C   250         ADD     A,#LGNDS2       ;ADD BASE ADDRESS OF LEGENDS TABLE (UPPER)
020A A3     251         MOVP    A,@A            ;GET LEGEND
020B 83     252         RET
            253 ;
020C B922   254 KEY:    MOV     PNTR1,#KBDBUF   ;LOAD POINTER 1 WITH ADDRESS OF KEY BUFFER
020E 2380   255         MOV     A,#80H          ;LOAD ACC WITH FLAG
0210 21     256         XCH     A,@PNTR1        ;EXCHANGE BUFFER CONTENTS AND FLAG
0211 F20C   257         JB7     KEY             ;LOOP UNTIL A KEY IS DEPRESSED
0213 C616   258         JZ      UCLR            ;IF ZERO, THEN CLEAR
0215 83     259         RET
            260 ;
            261 ;
0216 C7     262 UCLR:   MOV     A,PSW           ;GET STATUS WORD
0217 53F8   263         ANL     A,#0F8H         ;Zero out bits 0,1,2 (Reste stack pointer)
0219 D7     264         MOV     PSW,A           ;RETURN STATUS WORD
```

```
021A 44EF      265           JMP     FUNCT1          ;JUMP TO FUNCTION 1 (CLEAR)
               266 ;
               267 ;
               268 ;
               269 ;LEGNDS IS THE BASE FOR TABLE KEY MATRIX
001C           270 LEGNDS EQU        ($ AND 0FFH)
021C A0        271           DB      0A0H            ;CLEAR
021D 22        272           DB      22H             ;SET
021E 24        273           DB      24H             ;DISPLAY
021F 60        274           DB      60H             ;ENTER
0220 13        275           DB      13H             ;3
0221 16        276           DB      16H             ;6
0222 19        277           DB      19H             ;9
0223 0C        278           DB      0CH             ;SLOW SET
0224 12        279           DB      12H             ;2
0225 15        280           DB      15H             ;5
0226 18        281           DB      18H             ;8
0227 10        282           DB      10H             ;0
0228 11        283           DB      11H             ;1
0229 14        284           DB      14H             ;4
022A 17        285           DB      17H             ;7
022B 0A        286           DB      0AH             ;FAST SET
               287 ;
               288 ;LGNDS2 IS THE BASE FOR TABLE KEY MATRIX (UPPER CODES)
002C           289 LGNDS2 EQU        ($ AND 0FFH)
022C 80        290           DB      80H             ;CLEAR
022D 00        291           DB      00H             ;SET
022E 00        292           DB      00H             ;DISPLAY
022F 00        293           DB      00H             ;ENTER
0230 48        294           DB      48H             ;KW
0231 20        295           DB      20H             ;PRIORITY
0232 03        296           DB      03H             ;DAY
0233 00        297           DB      00H             ;
0234 04        298           DB      04H             ;KWH
0235 42        299           DB      42H             ;HI KW
0236 08        300           DB      08H             ;PREVIOUS
0237 01        301           DB      01H             ;HOUSE CODE
0238 40        302           DB      40H             ;TARGET
0239 10        303           DB      10H             ;MTD
023A 02        304           DB      02H             ;TIME
023B 11        305           DB      11H             ;DAILY
               306 ;
               307 ;
               308 ;CLEAR WRITES BLANK CHARACTERS INTO ALL DISPLAY REGISTERS
023C BA00      309 CLEAR:    MOV     DISP,#00        ;CLEAR DISPLAY POINTER
023E B939      310           MOV     PNTR1,#39H      ;LOAD ADDRESS OF BAR MAP
0240 B100      311           MOV     @PNTR1,#00H     ;CLEAR BAR MAP
0242 23FF      312 BLKDS:    MOV     A,#BLANK XOR SEGPOL
0244 B93A      313 FILL:     MOV     PNTR1,#SEGMAP+1
0246 BF06      314           MOV     NEXTPL,#CHARNO
0248 A1        315 CLR1:     MOV     @PNTR1,A
0249 19        316           INC     PNTR1
024A EF48      317           DJNZ    NEXTPL,CLR1
024C BF06      318           MOV     NEXTPL,#CHARNO
024E 83        319           RET
               320 ;
024F B930      321 CLRBUF:   MOV     PNTR1,#BUFF     ;CLEAR DISPLAY BUFFER
0251 B100      322           MOV     @PNTR1,#00H
0253 C9        323           DEC     PNTR1
0254 B100      324           MOV     @PNTR1,#00H
0256 C9        325           DEC     PNTR1
```

```
0257 B100       326         MOV     @PNTR1,#00H
0259 83         327         RET
                328 ;
                329 ;
                330 ;PRINT SUBROUTINE TO COPY A STRING OF BIT PATTERNS FROM ROM
025A F8         331 PRINT:  MOV     A,PNTR0         ;ENTER WITH PATTERN ADDRESS IN ACC
025B A3         332         MOVP    A,@A            ;GET FIRST BIT PATTERN
025C C663       333         JZ      PRNT1           ;IF PATTERN IS 00, EXIT
025E 5484       334         CALL    WDISP           ;WRITE BIT PATTERN TO DISPLAY
0260 18         335         INC     PNTR0           ;INCREMENT TO NEXT BIT PATTERN
0261 445A       336         JMP     PRINT           ;LOOP
0263 83         337 PRNT1:  RET
                338 ;
                339 ;
                340 ;ENTPAT IS THE SEGMENT PATTERN FOR THE ENT MESSAGE
0064            341 ENTPAT  EQU     $ AND 0FFH
                342 ;
0264 B0         343         DB      01001111B XOR SEGPOL    ;E
0265 EA         344         DB      00010101B XOR SEGPOL    ;n
0266 F0         345         DB      00001111B XOR SEGPOL    ;t
0267 00         346         DB      00H
                347 ;
                348 ;ERRPAT IS THE SEGMENT PATTERN FOR THE ERROR MESSAGE
0068            349 ERRPAT  EQU     $ AND 0FFH
                350 ;
0268 B0         351         DB      01001111B XOR SEGPOL    ;E
0269 FA         352         DB      00000101B XOR SEGPOL    ;r
026A FA         353         DB      00000101B XOR SEGPOL    ;r
026B E2         354         DB      00011101B XOR SEGPOL    ;o
026C FA         355         DB      00000101B XOR SEGPOL    ;r
026D 00         356         DB      00H
                357 ;
                358 ;
                359 ;ENCACC ENCODES LSNIBBLE OF ACC INTO HEX BIT PATTERN INTO ACC
026E 530F       360 ENCACC: ANL     A,#ENCMSK
0270 0374       361         ADD     A,#DGPATS
0272 A3         362         MOVP    A,@A
0273 83         363         RET
                364 ;
                365 ;
                366 ;DGPATS IS THE BASE FOR THE TABLE OF SEGMENTS PATTERN FOR THE BASIC
0074            367 DGPATS  EQU     $ AND 0FFH
                368 ;
0274 81         369         DB      01111110B XOR SEGPOL    ;0
0275 CF         370         DB      00110000B XOR SEGPOL    ;1
0276 92         371         DB      01101101B XOR SEGPOL    ;2
0277 86         372         DB      01111001B XOR SEGPOL    ;3              6
0278 CC         373         DB      00110011B XOR SEGPOL    ;4           *******
0279 A4         374         DB      01011011B XOR SEGPOL    ;5           1*     *5
027A A0         375         DB      01011111B XOR SEGPOL    ;6           * 0 *
027B 8F         376         DB      01110000B XOR SEGPOL    ;7           *******
027C 80         377         DB      01111111B XOR SEGPOL    ;8           *     *
027D 8C         378         DB      01110011B XOR SEGPOL    ;9           2* 3 *4   7
027E 88         379         DB      01110111B XOR SEGPOL    ;A           *******  *
027F E0         380         DB      00011111B XOR SEGPOL    ;B              7
0280 B1         381         DB      01001110B XOR SEGPOL    ;C           *****
0281 C2         382         DB      00111101B XOR SEGPOL    ;D
0282 B0         383         DB      01001111B XOR SEGPOL    ;E
0283 B8         384         DB      01000111B XOR SEGPOL    ;F
                385 ;
                386 ;
```

```
         387 ;WDISP WRITES BIT PATTERN NOW IN ACC INTO NEXT CHARACTER POSITION
0284 A9  388 WDISP:  MOV   PNTR1,A           ;MOVE PATTERN INTO PNTR1
0285 FF  389         MOV   A,NEXTPL          ;MOVE NEXT CHAR NUMBER INTO ACC
0286 0339 390        ADD   A,#SEGMAP         ;ADD BASE ADDRESS OF SEG MAP
0288 29  391         XCH   A,PNTR1           ;EXCHANGE PATTERN AND ADDRESS OF LOCATION
0289 A1  392         MOV   @PNTR1,A          ;STORE PATTERN
028A EF8E 393        DJNZ  NEXTPL,WDISP1     ;DECREMENT NEXT CHAR NUMBER
028C BF06 394        MOV   NEXTPL,#CHARNO    ;IF CHAR #0, RESET TO LEFT CHAR
028E 83  395 WDISP1: RET
         396 ;
         397 ;
         398 ;RENTRY SUBROUTINE TO ENTER ACC CONTENTS INTO THE RIGHTMOST DIGIT
028F B93A 399 RENTRY: MOV  PNTR1,#SEGMAP+1
0291 BF06 400        MOV   NEXTPL,#CHARNO
0293 21  401 RENTR1: XCH   A,@PNTR1
0294 19  402         INC   PNTR1
0295 EF93 403        DJNZ  NEXTPL,RENTR1
0297 BF06 404        MOV   NEXTPL,#CHARNO
0299 83  405         RET
         406 ;
         407 ;
         408 ;DELAY SUBROUTINE HANGES UP FOR THE NO. OF COMPLETE DISPLAY SCANS
029A B923 409 DELAY:  MOV  PNTR1,#RDELAY     ;LOAD POINTER WITH ADDRESS OF DELAY COUNTER
029C A1  410         MOV   @PNTR1,A          ;ACC CONTAINS DELAY COUNT, MOVE TO REG
029D F1  411 DELAY1: MOV   A,@PNTR1          ;GET DELAY REG CONTENTS
029E 969D 412        JNZ   DELAY1            ;LOOP UNTIL ZERO
02A0 83  413         RET
         414 ;
         415 ;
02A1 C5  416 DISPLY: SEL   RB0
02A2 2324 417        MOV   A,#POSVE          ;SAVE BANK 0 POINTERS
02A4 28  418         XCH   A,PNTR0
02A5 A0  419         MOV   @PNTR0,A
02A6 18  420         INC   PNTR0
02A7 F9  421         MOV   A,PNTR1
02A8 A0  422         MOV   @PNTR0,A
02A9 FA  423         MOV   A,DISP            ;GET DISPLAY POINTER
02AA A8  424         MOV   PNTR0,A           ;SAVE ADDRESS
02AB F2D6 425        JB7   DPN1              ;IF BIT7, THEN A MESSAGE IS IN PROGRESS,
         426                                 ;SO DO NOT BLANK DISPLAY
02AD 5442 427        CALL  BLKDS             ;OTHERWISE BLANK THE DISPLAY
02AF F8  428         MOV   A,PNTR0           ;GET POINTER BACK
02B0 C6D6 429        JZ    DPN1              ;IF ZERO, THEN NOTHING TO DISPLAY
02B2 FB  430         MOV   A,NUMB            ;GET NUM
02B3 530F 431        ANL   A,#0FH            ;MASK NUMBER OF DIGITS
02B5 AF  432         MOV   NEXTPL,A          ;SET NEXTPL TO NUMBER OF DIGITS TO BE DISPLAYED
02B6 12C5 433 DS3:   JB0   DS1               ;IF ODD DIGIT, IT IS IN LOW NIBBLE
02B8 F0  434         MOV   A,@PNTR0          ;GET BYTE TO BE DISPLAYED
02B9 47  435         SWAP  A                 ;EVEN DIGIT, SO IT IS IN UPPER NIBBLE
02BA 546E 436 DS2:   CALL  ENCACC            ;ENCODE ACC
02BC 5484 437        CALL  WDISP             ;WRITE DIGIT TO DISPLAY
02BE FF  438         MOV   A,NEXTPL          ;GET NEXTPL
02BF 03FA 439        ADD   A,#-CHARNO        ;CHECK IF LAST DIGIT
02C1 96B6 440        JNZ   DS3               ;IF NOT CONTINUE
02C3 44C9 441        JMP   DPNT              ;JUMP TO DECIMAL POINT
02C5 F0  442 DS1:    MOV   A,@PNTR0          ;GET BYTE TO BE DISPLAYED
02C6 C8  443         DEC   PNTR0             ;MOVE POINTER TO NEXT BYTE
02C7 44BA 444        JMP   DS2
         445 ;
         446 ;
02C9 FB  447 DPNT:   MOV   A,NUMB            ;GET NUM
```

```
02CA 47          448         SWAP    A
02CB 530F        449         ANL     A,#0FH          ;MASK DP POSITION
02CD C6D6        450         JZ      DPN1            ;IF NO DECIMAL POINT, RETURN
02CF 0339        451         ADD     A,#SEGMAP       ;GET ADDRESS OF DIGIT
02D1 A8          452         MOV     PNTR0,A
02D2 F0          453         MOV     A,@PNTR0        ;GET SEGMENT PATTERN
02D3 537F        454         ANL     A,#7FH          ;ADD DP
02D5 A0          455         MOV     @PNTR0,A        ;RETURN SEGMENT PATTERN
02D6 BB25        456 DPN1:   MOV     PNTR0,#P1SVE    ;RESTORE POINTERS
02D8 F0          457         MOV     A,@PNTR0
02D9 A9          458         MOV     PNTR1,A
02DA C8          459         DEC     PNTR0
02DB F0          460         MOV     A,@PNTR0
02DC A8          461         MOV     PNTR0,A
02DD D5          462         SEL     RB1
02DE 83          463         RET
                 464 ;
                 465 ;
02DF C7          466 ERR:    MOV     A,PSW           ;Get PSW and reset stack pointer
02E0 53F8        467         ANL     A,#0F8H         ;Zero bits 0,1,2 (Stack Pointer)
02E2 D7          468         MOV     PSW,A           ;Replace PSW
02E3 543C        469         CALL    CLEAR           ;CLEAR
02E5 BAFF        470         MOV     DISP,#0FFH      ;Indicate that a message is in progress
02E7 BB68        471         MOV     PNTR0,#ERRPAT   ;LOAD ADDRESS OF ERRPAT
02E9 545A        472 PMSG:   CALL    PRINT           ;PRINT MESSAGE
02EB 233C        473         MOV     A,#60           ;LOAD ACC FOR 1.0 SEC DELAY
02ED 549A        474         CALL    DELAY
02EF 543C        475 FUNCT1: CALL    CLEAR
02F1 6400        476         JMP     INPUT           ;Since an error was made, start over
                 477                                 ;(this is why we reset the stack)
                 478 ;
                 479 ;
02F3 543C        480 ENTER:  CALL    CLEAR           ;CLEAR
02F5 BAFF        481         MOV     DISP,#0FFH      ;Indicate that a message is in progress
02F7 BB64        482         MOV     PNTR0,#ENTPAT   ;LOAD ADDRESS OF ENTPAT
02F9 44E9        483         JMP     PMSG
                 484 ;
                 485 ;
                 486 $EJECT
                 487 ;
                 488 ;
0300             489         ORG     0300H
                 490 ;
                 491 ;
                 492 ;
                 493 ;INPUT ROUTINE WAITS FOR A COMMAND KEY INPUT
0300 5400        494 INPUT:  CALL    KBDIN           ;GET A KEY
0302 B839        495         MOV     PNTR0,#39H      ;LOAD ADDRESS OF BAR MAP
0304 B208        496         JB5     FUNCTN          ;IF A COMMAND KEY, JUMP TO FUNCTN
0306 6400        497         JMP     INPUT           ;OTHERWISE, GET ANOTHER KEY
                 498 ;
                 499 ;
0308 520E        500 FUNCTN: JB2     FUNCT3          ;DISPLAY
030A D222        501         JB6     FUNCT4          ;ENTER
030C 842B        502         JMP     FUNCT2          ;SET
                 503 ;
                 504 ;
030E 543C        505 FUNCT3: CALL    CLEAR
0310 5406        506         CALL    KBDIN2          ;GET NEXT KEY
0312 D2A0        507         JB6     TD              ;DISPLAY TARGET, HI KW, OR KW
0314 3270        508         JB1     TMD             ;DISPLAY TIME, DAY, OR PEAK TIMES
```

```
0316 5286      509            JB2     KWD        ;DISPLAY KILOWATTS
0318 7224      510            JB3     PRD        ;PREVIOUS
031A 924A      511            JB4     MTD        ;MONTH TO DATE OR DAILY
031C B2B5      512            JB5     PD         ;PRIORITY
031E 1292      513            JB0     HCD        ;DISPLAY HOUSE CODE
0320 44DF      514            JMP     ERR
               515 ;
               516 ;
0322 44F3      517 FUNCT4:    JMP     ENTER      ;ENTER
               518 ;
               519 ;
               520 *EJECT
               521 ;
0324 5406      522 PRD:       CALL    KBDIN2
0326 D2AD      523            JB6     PMW
0328 922C      524            JB4     PTD
032A 44DF      525            JMP     ERR
               526 ;
032C 1234      527 PTD:       JB0     PDTD
032E 5406      528 PMTD:      CALL    KBDIN2
0330 5240      529            JB2     PMWH
0332 44DF      530            JMP     ERR
               531 ;
0334 5406      532 PDTD:      CALL    KBDIN2
0336 523A      533            JB2     PDWH
0338 44DF      534            JMP     ERR
               535 ;
033A BA4B      536 PDWH:      MOV     DISP,#PDKWH
033C BB14      537 PDWH1:     MOV     NUMB,#14H
033E 6444      538            JMP     WHB
               539 ;
0340 BA4E      540 PMWH:      MOV     DISP,#PMKWH
0342 BB15      541 PMWH1:     MOV     NUMB,#15H
0344 B839      542 WHB:       MOV     PNTR0,#39H ;LOAD ADDRESS OF BAR MAP
0346 B020      543            MOV     @PNTR0,#20H ;SET KWH BAR
0348 6400      544            JMP     INPUT
               545 ;
               546 ;
034A 1256      547 MTD:       JB0     DLY
034C 5406      548            CALL    KBDIN2
034E 5252      549            JB2     MWH
0350 44DF      550            JMP     ERR
               551 ;
0352 BA49      552 MWH:       MOV     DISP,#MKWH
0354 6442      553            JMP     PMWH1
               554 ;
               555 ;
0356 5406      556 DLY:       CALL    KBDIN2
0358 525C      557            JB2     DWH
               558 ;          JB6     DW
035A 44DF      559            JMP     ERR
               560 ;
035C BA46      561 DWH:       MOV     DISP,#DKWH
035E 643C      562            JMP     PDWH1
               563 ;
               564 ;
0370           565            ORG     0370H
               566 ;
0370 1280      567 TMD:       JB0     DD         ;DISPLAY DAY
0372 B080      568 TMDD:      MOV     @PNTR0,#80H ;SET TIME BAR
0374 BA36      569            MOV     DISP,#HOUR
```

```
0376 BB34        570          MOV    NUMB,#34H
037B 5400        571          CALL   KBDIN
037A B208        572          JB5    FUNCTN
037C 928E        573          JB4    TMPD1
037E 6400        574          JMP    INPUT
                 575 ;
                 576 ;
0380 BA37        577 DD:      MOV    DISP,#DAY
0382 BB01        578          MOV    NUMB,#01H
0384 6400        579          JMP    INPUT
                 580 ;
0386 B020        581 KWD:     MOV    @PNTR0,#20H    ;SET KWH BAR
0388 BA44        582          MOV    DISP,#KWHM
038A BB16        583          MOV    NUMB,#16H
038C 6400        584          JMP    INPUT
                 585 ;
                 586 ;
038E 74C4        587 TMPD1:   CALL   TMPD
0390 6400        588          JMP    INPUT
                 589 ;
                 590 ;
0392 74E0        591 HCD:     CALL   HCDD
0394 6400        592          JMP    INPUT
                 593 ;
                 594 ;
0096             595 MASKP    EQU    ($ AND 0FFH)
0396 00          596          DB     00000000B
0397 01          597          DB     00000001B
0398 02          598          DB     00000010B
0399 04          599          DB     00000100B
039A 08          600          DB     00001000B
039B 10          601          DB     00010000B
039C 20          602          DB     00100000B
039D 40          603          DB     01000000B
039E 80          604          DB     10000000B
039F 00          605          DB     00000000B
                 606 ;
                 607 ;
03A0 530F        608 TD:      ANL    A,#0FH
03A2 0350        609          ADD    A,#TH
03A4 AA          610          MOV    DISP,A
03A5 BB34        611 TD1:     MOV    NUMB,#34H
03A7 BB39        612          MOV    PNTR0,#39H     ;LOAD ADDRESS OF BAR MAP
03A9 B040        613          MOV    @PNTR0,#40H    ;SET KW BAR
03AB 6400        614          JMP    INPUT
                 615 ;
03AD D342        616 PMW:     XRL    A,#42H
03AF 96BB        617          JNZ    PD2
03B1 BA56        618          MOV    DISP,#PHKWH
03B3 64A5        619          JMP    TD1
                 620 ;
                 621 ;
03B5 B801        622 PD:      MOV    PNTR0,#01H
03B7 74F3        623 PD1:     CALL   PSD2
03B9 B2BD        624          JB5    PDOK
03BB 44DF        625 PD2:     JMP    ERR
03BD 52C1        626 PDOK:    JB2    PDOK1
03BF 44DF        627          JMP    ERR
03C1 18          628 PDOK1:   INC    PNTR0
03C2 64B7        629          JMP    PD1
                 630 ;
```

```
                631 ;
                632 ;
03C4 030B       633 TMPD:   ADD     A,#0BH
03C6 92CA       634         JB4     PT1
03C8 44DF       635         JMP     ERR
03CA 52CE       636 PT1:    JB2     TMPOK
03CC 44DF       637         JMP     ERR
03CE 12D5       638 TMPOK:  JB0     PT42
03D0 32DD       639         JB1     PT3
03D2 BA27       640         MOV     DISP,#TIME1
03D4 83         641         RET
03D5 32DA       642 PT42:   JB1     PT4
03D7 BA29       643 PT2:    MOV     DISP,#TIME2
03D9 83         644         RET
03DA BA2D       645 PT4:    MOV     DISP,#TIME4
03DC 83         646         RET
03DD BA2B       647 PT3:    MOV     DISP,#TIME3
03DF 83         648         RET
                649 ;
                650 ;
                651 ;
03E0 D5         652 HCDD:   SEL     RB1
03E1 FB         653         MOV     A,HSCDE
03E2 C5         654         SEL     RB0
03E3 47         655         SWAP    A
03E4 530F       656         ANL     A,#0FH
03E6 0300       657         ADD     A,#00H
03E8 57         658         DA      A
03E9 BB30       659         MOV     PNTR0,#BUFF
03EB A0         660         MOV     @PNTR0,A
03EC BA30       661         MOV     DISP,#BUFF
03EE BB02       662         MOV     NUMB,#02
03F0 83         663         RET
                664 ;
                665 ;
                666 ;
03F1 B801       667 PSD1:   MOV     PNTR0,#01H
03F3 2396       668 PSD2:   MOV     A,#MASKP
03F5 68         669         ADD     A,PNTR0
03F6 E3         670         MOVP3   A,@A
03F7 C6F1       671         JZ      PSD1
03F9 BF01       672         MOV     NEXTPL,#01H
03FB B95A       673         MOV     PNTR1,#PRIRTY
03FD 51         674         ANL     A,@PNTR1
03FE 00         675         NOP
03FF 00         676         NOP
0400 C604       677         JZ      PSD3
0402 2301       678         MOV     A,#01H
0404 546E       679 PSD3:   CALL    ENCACC
0406 5484       680         CALL    WDISP
0408 23F1       681         MOV     A,#0F1H
040A 5484       682         CALL    WDISP
040C F8         683         MOV     A,PNTR0
040D 546E       684         CALL    ENCACC
040F 5494       685         CALL    WDISP
0411 23FF       686         MOV     A,#BLANK XOR SEGPOL
0413 5484       687         CALL    WDISP
0415 B922       688 PSD3A:  MOV     PNTR1,#KBDBUF   ;Local key input routine
0417 2380       689         MOV     A,#80H
0419 21         690         XCH     A,@PNTR1
041A F220       691         JB7     PSD4
```

```
041C C629      692           JZ      PSDC
041E 4402      693           JMP     KBDIN1
               694 ;
0420 B93C      695 PSD4:     MOV     PNTR1,#SEGMAP+3  ;Determine if the DEFER message is being
0422 F1        696           MOV     A,@PNTR1         ;displayed by looking at the third digit
0423 D3B0      697           XRL     A,#0B0H          ;and seeing if it is the letter E
0425 C615      698           JZ      PSD3A            ;If it's an E, keep waiting for a key
0427 64F3      699           JMP     PSD2             ;Otherwise, rewrite the display message
               700 ;
0429 4416      701 PSDC:     JMP     UCLR
               702 ;
               703 $EJECT
               704 ;
               705 ;
042B 543C      706 FUNCT2:   CALL    CLEAR            ;
042D 5406      707           CALL    KBDIN2           ;
042F 323B      708           JB1     TMS              ;
0431 B2D0      709           JB5     PS               ;
0433 D2F1      710           JB6     TGS              ;
0435 12A5      711           JB0     HCS              ;
0437 44DF      712 F2R:      JMP     ERR              ;
               713 ;
               714 ;
0439 6422      715 ENTR4:    JMP     FUNCT4
               716 ;
043B 12B2      717 TMS:      JB0     DAYS             ;
043D D237      718           JB6     F2R
043F B080      719           MOV     @PNTR0,#80H      ;SET TIME BAR
0441 BA30      720 TM1:      MOV     DISP,#BUFF       ;
0443 BB34      721           MOV     NUMB,#34H
0445 544F      722           CALL    CLRBUF
0447 BC2F      723           MOV     TEMP1,#BUFF-1    ;
0449 BD36      724           MOV     TEMP2,#HOUR
044B 5400      725 TR4A:     CALL    KBDIN            ;
044D 929D      726           JB4     TMPS1            ;
044F 7255      727 TR4:      JB3     TMS1             ;
0451 D2BD      728           JB6     TENT             ;
0453 44DF      729           JMP     ERR              ;ERROR
0455 325B      730 TMS1:     JB1     TS               ;FAST SET
0457 525B      731           JB2     TS               ;SLOW SET
0459 44DF      732           JMP     ERR
045B FC        733 TS:       MOV     A,TEMP1
045C A8        734           MOV     PNTR0,A
045D D400      735           CALL    CUP
045F C667      736           JZ      TR3A
0461 03A0      737           ADD     A,#0A0H
0463 E670      738           JNC     TR3C
0465 B000      739           MOV     @PNTR0,#00H
0467 18        740 TR3A:     INC     PNTR0
0468 D400      741           CALL    CUP
046A 03DC      742           ADD     A,#0DCH
046C E670      743           JNC     TR3C
046E B000      744           MOV     @PNTR0,#00H
0470 9476      745 TR3C:     CALL    TR3
0472 5400      746           CALL    KBDIN
0474 844F      747           JMP     TR4
               748 ;
               749 ;
               750 ;
0476 B81E      751 TR3:      MOV     PNTR0,#1EH       ;POINT TO LASTKY
0478 F0        752           MOV     A,@PNTR0
```

```
0479 727F    753        JB3    TR2           ;FAST SET
047B 231E    754        MOV    A,#30         ;SLOW SET,LOAD ACC FOR 0.5 SEC DELAY
047D 549A    755        CALL   DELAY
047F B0FF    756 TR2:   MOV    @PNTR0,#0FFH  ;RESET LASTKY
0481 83      757        RET
             758 ;
             759 ;
0482 544F    760 DAYS:  CALL   CLRBUF        ;SET DAY
0484 BA30    761        MOV    DISP,#BUFF
0486 BB01    762        MOV    NUMB,#01H
0488 5400    763 DAYS1: CALL   KBDIN
048A B930    764        MOV    PNTR1,#BUFF
048C D297    765        JB6    DENT
048E 9292    766        JB4    DSOK
0490 44DF    767        JMP    ERR
0492 530F    768 DSOK:  ANL    A,#0FH
0494 A1      769        MOV    @PNTR1,A
0495 8488    770        JMP    DAYS1
0497 F1      771 DENT:  MOV    A,@PNTR1
0498 B937    772        MOV    PNTR1,#DAY
049A A1      773        MOV    @PNTR1,A
049B 8439    774        JMP    ENTR4
             775 ;
             776 ;
049D 74C4    777 TMPS1: CALL   TMPD          ;FIGURE OUT WHICH TIME
049F 2330    778        MOV    A,#BUFF
04A1 2A      779        XCH    A,DISP        ;REMEMBER WHICH ONE WE ARE SETTING, AND DISPLAY
             780                              ;THE BUFFER CONTENTS
04A2 AD      781        MOV    TEMP2,A       ;SAVE ADDRESS FOR TENT ROUTINE
04A3 844B    782        JMP    TR4A
             783 ;
             784 ;
             785 ;
04A5 74E0    786 HCS:   CALL   HCDD
04A7 5400    787        CALL   KBDIN
04A9 72AF    788        JB3    HCS1
04AB D239    789        JB6    ENTR4
04AD 44DF    790        JMP    ERR
04AF 52B3    791 HCS1:  JB2    HCS2
04B1 44DF    792        JMP    ERR
04B3 D5      793 HCS2:  SEL    RB1
04B4 FB      794        MOV    A,HSCDE
04B5 0310    795        ADD    A,#10H
04B7 AB      796        MOV    HSCDE,A
04B8 C5      797        SEL    RB0
04B9 9476    798        CALL   TR3
04BB 84A5    799        JMP    HCS
             800 ;
             801 ;
             802 ;
04BD FB      803 TENT:  MOV    A,NUMB
04BE 530F    804        ANL    A,#0FH
04C0 AB      805        MOV    NUMB,A
04C1 FD      806        MOV    A,TEMP2
04C2 A8      807        MOV    PNTR0,A
04C3 B930    808        MOV    PNTR1,#BUFF
04C5 F1      809 LOOP3: MOV    A,@PNTR1
04C6 A0      810        MOV    @PNTR0,A
04C7 C8      811        DEC    PNTR0
04C8 C9      812        DEC    PNTR1
04C9 CB      813        DEC    NUMB
```

```
04CA CB        814        DEC      NUMB
04CB FB        815        MOV      A,NUMB
04CC 96C5      816        JNZ      LOOP3
04CE 6422      817        JMP      FUNCT4
               818 ;
               819 ;
               820 ;
04D0 B801      821 PS:    MOV      PNTR0,#01           ;SET PRIORITY
04D2 74F3      822 PS1:   CALL     PSD2
04D4 D2DA      823        JB6      PSOK1
04D6 92DD      824        JB4      PSOK2
04D8 44DF      825        JMP      ERR
04DA 18        826 PSOK1: INC      PNTR0
04DB 84D2      827        JMP      PS1
04DD B95A      828 PSOK2: MOV      PNTR1,#PRIRTY
04DF 12E9      829        JB0      PSS
04E1 2396      830        MOV      A,#MASKP
04E3 68        831        ADD      A,PNTR0
04E4 E3        832        MOVP3    A,@A
04E5 37        833        CPL      A
04E6 51        834        ANL      A,@PNTR1
04E7 84EE      835        JMP      PSR
04E9 2396      836 PSS:   MOV      A,#MASKP
04EB 68        837        ADD      A,PNTR0
04EC E3        838        MOVP3    A,@A
04ED 41        839        ORL      A,@PNTR1
04EE A1        840 PSR:   MOV      @PNTR1,A
04EF 84D2      841        JMP      PS1
               842 ;
               843 ;
04F1 D340      844 T6S:   XRL      A,#40H
04F3 9637      845        JNZ      F2R
04F5 B839      846        MOV      PNTR0,#39H          ;POINT TO BAR MAP
04F7 B040      847        MOV      @PNTR0,#40H         ;SET KW BAR
04F9 BB34      848        MOV      NUMB,#34H
04FB 544F      849        CALL     CLRBUF
04FD BA30      850 TMP1A: MOV      DISP,#BUFF
04FF 5400      851 TMP1:  CALL     KBDIN
0501 B830      852        MOV      PNTR0,#BUFF
0503 B92F      853        MOV      PNTR1,#BUFF-1
0505 00        854        NOP
0506 00        855        NOP
0507 00        856        NOP
0508 00        857        NOP
0509 920F      858        JB4      TMP2
050B D21B      859        JB6      T6ENT
050D 44DF      860        JMP      ERR
050F AD        861 TMP2:  MOV      TEMP2,A
0510 F0        862        MOV      A,@PNTR0
0511 47        863        SWAP     A
0512 A0        864        MOV      @PNTR0,A
0513 F1        865        MOV      A,@PNTR1
0514 47        866        SWAP     A
0515 30        867        XCHD     A,@PNTR0
0516 A1        868        MOV      @PNTR1,A
0517 FD        869        MOV      A,TEMP2
0518 31        870        XCHD     A,@PNTR1
0519 84FF      871        JMP      TMP1
               872 ;
               873 ;
```

```
051B BD50      874 TGENT: MOV    TEMP2,#TH
051D 84BD      875        JMP    TENT
               876 ;
               877 ;
               878 END
```

USER SYMBOLS

| | | | | | | | | | | | | | | |
|---|---|---|---|---|---|---|---|---|---|---|---|---|---|---|
|ASAVE|0002|BAR|0039|BLANK|0000|BLKDS|0242|BSRBR|00F7|BSRBS|0008|BSRX|0500|BTOUT|0008|
|BUFF|0030|CHAR2|000C|CHARNO|0006|CHRPOL|00FF|CLEAR|023C|CLR1|0248|CLRBUF|024F|CUP|0600|
|CURDIG|0007|DAY|0037|DAYS|0482|DAYS1|0488|DD|0380|DEBNCE|0002|DELAY|029A|DELAY1|029D|
|DENT|0497|D6PATS|0074|DISP|0002|DISPLY|02A1|DKWH|0046|DKWHL|0045|DLY|0356|DPN1|02D6|
|DPNT|02C9|DS1|02C5|DS2|02BA|DS3|02B6|DSOK|0492|DWH|035C|ENCACC|026E|ENCMSK|000F|
|ENTER|02F3|ENTPAT|0064|ENTR4|0439|ERR|02DF|ERRPAT|0068|F2R|0437|FILL|0244|FUNCT1|02EF|
|FUNCT2|042B|FUNCT3|030E|FUNCT4|0322|FUNCTN|0308|HCD|0392|HCDD|03E0|HCS|04A5|HCS1|04AF|
|HCS2|04B3|HDR|00BF|HDS|0040|HKWH|0052|HKWL|0051|HOUR|0036|HSCDE|0003|INPMSK|00F2|
|INPUT|0300|KBDBUF|0022|KBDIN|0200|KBDIN1|0202|KBDIN2|0206|KEY|020C|KEY1|00A5|KEY2|005A|
|KEYLOC|0021|KWCNT|0041|KWCNTL|0040|KWD|0386|KWH|0058|KWHM|0044|KWHML|0042|KWL|0057|
|LASTKY|0006|LEGNDS|001C|LGNDS2|002C|LOADM|0038|LOOP3|04C5|MASKP|0096|MBR|007F|MBS|0090|
|MIN|0035|MINB|0034|MKEY1|005B|MKEY2|005C|MKWH|0049|MKWHL|0047|MTD|034A|MWH|0352|
|NCOLS|0004|NEGLOG|00FF|NEXTPL|0007|NREPTS|0020|NROWS|0004|NUMB|0003|OFPR|00DF|OFPS|0020|
|ONPR|00EF|ONPS|0010|POSVE|0024|P1SVE|0025|PD|03B5|PD1|03B7|PD2|03BB|PDIGIT|0001|
|PDKWH|004B|PDKWHL|004A|PDOK|03BD|PDOK1|03C1|PDTD|0334|PDWH|033A|PDWH1|033C|PHKWH|0056|
|PHKWL|0055|PINPUT|0009|PMKWH|004E|PMKWHL|004C|PMSG|02E9|PMTD|032E|PMW|03AD|PMWH|0340|
|PMWH1|0342|PNTR0|0000|PNTR1|0001|POINTE|0059|POSLOG|0000|PRD|0324|PRINT|025A|PRIRTY|005A|
|PRNT1|0263|PS|04D0|PS1|04D2|PSD1|03F1|PSD2|03F3|PSD3|0404|PSD3A|0415|PSD4|0420|
|PSDC|0429|PSGMNT|0000|PSOK1|04DA|PSOK2|04DD|PSR|04EE|PSS|04E9|PT1|03CA|PT2|03D7|
|PT3|03DD|PT4|03DA|PT42|03D5|PTD|032C|RDELAY|0023|RENTR1|0293|RENTRY|029F|RMTRR|00FB|
|RMTRS|0004|ROTCNT|0005|ROTPAT|0004|SCALE|0000|SCALEL|0072|SEGMAP|0039|SEGPOL|00FF|SPH|0054|
|SPL|0053|SSH|0033|SSL|0032|STATE|0031|STBR|00FE|STBS|0001|TABHH|007F|TABHL|007E|
|TABLH|0063|TABLL|0062|TABLLO|0061|TD|03A0|TD1|03A5|TEMP1|0004|TEMP2|0005|TEMP3|0006|
|TENT|04BD|TGENT|051B|TGS|04F1|TH|0050|TICK|FFF0|TIME1|0027|TIME2|0029|TIME3|002B|
|TIME4|002D|TL|004F|TM1|0441|TMD|0370|TMDD|0372|TMP1|04FF|TMP1A|04FD|TMP2|050F|
|TMPD|03C4|TMPD1|038E|TMPOK|03CE|TMPS1|049D|TMS|043B|TMS1|0455|TR2|047F|TR3|0476|
|TR3A|0467|TR3C|0470|TR4|044F|TR4A|044B|TS|045B|UCLR|0216|VERSIO|0068|WDISP|02B4|
|WDISP1|02BE|WHB|0344|ZBR|00FD|ZBS|0002| | | | | | | | |

ASSEMBLY COMPLETE,    NO ERRORS

```
:010005006892
:10020000540C031CA383540C032CA3B3B4...38016
:10021000021F20CC61683C753F8D744EFA0222460FE
:100220001316190C121519101114170A800000006B
:10023000482003000442080140100211BA00B939F5
:10024000B10023FFB93ABF06A119EF48BF0683B931
:1002500030B100C9B100C9B10083F8A3C6635484AA
:100260001B445A83B0EAF000B0FAFAE2FA00530FE9
:100270000037A4383B1CF7286CCA4A08F808C8BE066
:1002B000B1C2B0B8A9FF033929A1EF8EBF0683B967
:100290003ABF062119EF93BF0683B923A1F1969DBA
:1002A00083C5232428A018F9A0FAABF2D65442F84E
:1002B000C6D6FB530FAF12C5F047546E5484FF03EC
:1002C000FA96B644C9F0C844BAFB47530FC6D603E2
:1002D00039A8F0537FA0BB25F0A9C8F0A8D583C7E6
:1002E00053F8D7543CBAFFBB68545A233C549A5434
:0B02F0003C6400543CBAFFBB86444E9D1
:100300005400B839208640052CED222B42B543CF7
:100310005406D2A0327052867224924AB2B512921A
:100320004DF44F35406D2AD922C44DF1234540619
:10033000524044DF5406523A44DFBA4BBB14644483
:10034000BA4EBB15B839B020640012565406525249A
:100350004DFBA4964425406525C44DFBA46643C06
:1003700012B0B0B0BA36BB345400B208928E64004A
:10038000BA37BB016400B020BA44BB16640074C421
:10039000064074E064000010204081020408000042
:1003A000530F0350AABB34B839B0406400D342960F
:1003B000BBBA5664A5BB0174F3B2BD44DF52C14460
:1003C000DF1864B7030B92CA44DF52CE44DF12D564
:1003D00032DDBA278332DABA29B3BA2D83BA2B8366
:1003E000D5FBC547530F030057B830A0BA30BB0246
:1003F00083B801239668E3C6F1BF01B95A510000E2
:10040000C6042301546E548423F15484F8546E546A
:100410008423FF5484B922238021F220C629440278
:10042000B93CF1D3B0C61564F34416543C540632BB
:100430003BB2D0D2F112A544DF642212B2D237B08F
:10044000B0BA30BB34544FBC2FBD365400929D72DD
:10045000055D2BD44DF325B525B44DFFCA8D400C6FA
:100460006703A0E670B00018D40003DCE670B000AB
:1004700094765400844FB81EF0727F231E549AB0B5
:10048000FF83544FBA30BB015400B930D2979292D7
:1004900044DF530FA184B8F1B937A1843974C42390
:1004A000302AAD844B74E0540072AFD23944DF522D
:1004B000B344DFD5FB0310ABC59476B4A5FB530F83
:1004C000ABFDA8B930F1A0C8C9CBCBFB96C564225F
:1004D000B80174F3D2DA92DD44DF18B4D2B95A122B
:1004E000E9239668E3375184EE239668E341A184BB
:1004F000D2D3409637B839B040BB34544FBA305499
:10050000000B830B92F00000000920FD21B44DFADBD
:0F051000F047A0F14730A1FD3184FFBD5084BDFD
:00000001FF
```

| LOC OBJ | LINE | SOURCE STATEMENT | | | |
|---|---|---|---|---|---|
| | 1 | ; INPUT/OUTPUT ROUTINE WITH TIME, LINK TO BSRX, AND LINK TO FUNC | | | |
| | 2 | ; CONFIGURED FOR CENTRAL LOAD CONTROL INPUT, AND INCLUDES SRE2.SRC | | | |
| | 3 | ; 2K VERSION FOR USE WITH 8039 AND 8755 | | | |
| 0030 | 4 | VERSION EQU 30H ; 1/11/1983 | | | |
| | 5 | ; | | | |
| | 6 | ; | | | |
| | 7 | ;########################################################################### | | | |
| | 8 | ; | | | |
| | 9 | ; INITIAL EQUATES TO DEFINE SYSTEM CONFIGURATION | | | |
| | 10 | ; | | | |
| | 11 | ;########################################################################### | | | |
| | 12 | ; | | | |
| 0002 | 13 | ORG | 002H | | |
| 0002 30 | 14 | | DB | VERSION | ;STORE IO2C VERSION LEVEL IN LOCATION 2 |
| | 15 | ; | | | |
| | 16 | ; | | | |
| 0001 | 17 | PDIGIT | EQU | 01 | ;USED TO ENABLE CHARACTERS AND STROBE ROWS OF KEYBOARD |
| | 18 | | | | ;PORT B ON 8755 |
| 0000 | 19 | PSGMNT | EQU | 00 | ;USED TO TURN ON SEGMENTS OF CURRENTLY ENABLED DIGIT |
| | 20 | | | | ;PORT A ON 8755 |
| 0009 | 21 | PINPUT | EQU | P2 | ;PORT USED TO SCAN FOR KEY CLOSURES |
| | 22 | | | | ;(NOTE THAT THIS PORT ALLOCATION USES THE HIGHER |
| | 23 | | | | ;CURRENT SOURCING ABILITY OF THE BUS TO SWITCH ON THE |
| | 24 | | | | ;DIGIT DRIVERS AND LEAVES P23-P20 FREE FOR USING |
| | 25 | | | | ;AN 8243 PORT EXPANDER IN THE SYSTEM.) |
| 0008 | 26 | BTOUT | EQU | P1 | ;PORT USED TO OUTPUT CONTROL BITS |
| | 27 | ; | | | |
| 0000 | 28 | POSLOG | EQU | 00H | |
| 00FF | 29 | NEGLOG | EQU | 0FFH | |
| | 30 | ; | | | |
| 00FF | 31 | CHRPOL | EQU | NEGLOG | ;DEFINES WHETHER OUTPUT LINES ARE ACTIVE HI OR LOW |
| 00FF | 32 | SEGPOL | EQU | NEGLOG | ;FOR DRIVING CHARACTERS AND SEGMENT PATTERNS |
| 00F2 | 33 | INPMSK | EQU | 0F2H | ;DEFINES BITS USED AS INPUT, BUT SETS P21 HIGH |
| | 34 | | | | ;SINCE THIS LINE ENABLES THE Z ANODE OF THE DISPLAY |
| | 35 | ; | | | |
| | 36 | ; | | | |
| 0006 | 37 | CHARNO | EQU | 6 | ;NUMBER OF DIGITS IN DISPLAY |
| 000C | 38 | CHAR2 | EQU | 12 | ;CHARNO X2 |
| 0004 | 39 | NROWS | EQU | 4 | ;ROWS OF KEYS (LESS THAN OR EQUAL TO CHARNO) |
| 0004 | 40 | NCOLS | EQU | 4 | ; |
| | 41 | ; | | | |
| FFF0 | 42 | TICK | EQU | -10H | ;DETERMINES INTERRUPT INTERVAL, SCAN FREQUENCY 781HZ |
| 0002 | 43 | DEBNCE | EQU | 2 | ;NUMBER OF SUCESSIVE SCANS BEFORE KEY CLOSURE ACCEPTED |
| | 44 | | | | ;I.E. DEBOUNCE TIME, 31MSEC (DIVIDED BY 2) |
| 0000 | 45 | BLANK | EQU | 00H | ; |
| | 46 | | | | ; |
| | 47 | | | | ; |
| | 48 | ; | | | |
| 000F | 49 | ENCMSK | EQU | 0FH | ; |
| | 50 | ; | | | |
| 00F7 | 51 | BSRBR | EQU | 0F7H | ;BSR RESET MASK, BIT 3 |
| 0008 | 52 | BSRBS | EQU | 08H | ;BSR SET MASK, BIT 3 |
| | 53 | ; | | | |
| 00FD | 54 | ZBR | EQU | 0FDH | ;Z ANODE RESET MASK, BIT 1 |
| 0002 | 55 | ZBS | EQU | 02H | ;Z ANODE SET MASK, BIT 1 |
| | 56 | ; | | | |
| 00FB | 57 | RMTRR | EQU | 0FBH | ;METER READ MASK, BIT 2 |
| 0004 | 58 | RMTRS | EQU | 04H | ;METER READ SET MASK, BIT 2 |
| | 59 | ; | | | |

```
00FE         60 STBR    EQU    0FEH      ;LATCH STROBE RESET MASK, BIT 0
0001         61 STBS    EQU    01H       ;LATCH STROBE SET MASK, BIT 0
             62 ;
00EF         63 ONPR    EQU    0EFH      ;ON PEAK RESET MASK, BIT 4
0010         64 ONPS    EQU    10H       ;ON PEAK SET MASK, BIT 4
             65 ;
00DF         66 OFPR    EQU    0DFH      ;OFF PEAK RESET MASK, BIT 5
0020         67 OFPS    EQU    20H       ;OFF PEAK SET MASK, BIT 5
             68 ;
00BF         69 HDR     EQU    0BFH      ;HIGH DEMAND RESET MASK, BIT 6
0040         70 HDS     EQU    40H       ;HIGH DEMAND SET MASK, BIT 6
             71 ;
007F         72 CLCR    EQU    7FH       ;CENTRAL LOAD CONTROL INPUT RESET MASK, BIT 7
0080         73 CLCS    EQU    80H       ;CENTRAL LOAD CONTROL INPUT SET MASK, BIT 7
             74 ;
             75 ;
0000         76 SCALE   EQU    00        ;NUMBER OF WH/PULSE DIVIDED BY 2, XXX.X, BCD, HIGH BYTE
0036         77 SCALEL  EQU    36H       ;LOW BYTE (WH AND TENTHS OF WH)
             78 ;
             79 ;
0000         80 OFSTH   EQU    00H       ;OFFSET FROM TARGET, XX.XX KW, HIGH BYTE
0050         81 OFSTL   EQU    50H       ;LOW BYTE (BCD)
             82 ;
             83 ;
00A5         84 KEY1    EQU    0A5H      ;MEMORY KEYS TO DETECT COLD START
005A         85 KEY2    EQU    05AH
             86 ;
             87 ;
             88 ;********************************************************************
             89 ;
             90 ;          CENTRAL LOAD CONTROL CONSTANTS
             91 ;
             92 ;********************************************************************
             93 ;
             94 ;
0002         95 DEFH    EQU    02H       ;KW TO BE SHED, BCD XX.XX kW HIGH BYTE
0050         96 DEFL    EQU    50H       ;LOW BYTE
             97 ;
             98 ;
0002         99 MINDH   EQU    02H       ;MINIMUM DEMAND DURING DEFFERED PERIOD, BCD XX.XX kW, HIGH BYTE
0000        100 MINDL   EQU    00H       ;LOW BYTE
            101 ;
            102 ;
            103 ;********************************************************************
            104 ;
            105 ;          BANK 0 REGISTERS USED
            106 ;
            107 ;
            108 ;POINTERS USED FOR INDIRECT RAM ACCESSING:
0000        109 PNTR0   EQU    R0
0001        110 PNTR1   EQU    R1
0002        111 DISP    EQU    R2        ;POINTER TO TOP ADDRESS OF BYTES TO BE DSPLAYED
0003        112 NUMB    EQU    R3        ;TOP 4 BITS ARE DIGIT NUMBER TO BE FOLLOWED BY
            113                          ;DECIMAL POINT, LOW 4 BITS ARE NUMBER OF DIGITS
            114                          ;TO BE DISPLAYED
0004        115 TEMP1   EQU    R4
0005        116 TEMP2   EQU    R5
0006        117 TEMP3   EQU    R6
0007        118 NEXTPL  EQU    R7        ;USED TO KEEP TRACK OF CHARACTER POSITION BEING
            119                          ;WRITTEN INTO
            120 ;
```

```
        121 ;###########################################################
        122 ;
        123 ;     BANK 1 REGISTER ALLOCATION
        124 ;
        125 ;PNTR0   EQU   R0      (ALREADY DEFINED)
        126 ;PNTR1   EQU   R1
0002    127 ASAVE    EQU   R2      ;
0003    128 HSCDE    EQU   R3            ;HIGH 4 BITS OF HSCDE ARE THE SECURITY CODE
        129                              ;LOW 4 BITS ARE A COUNTER FOR THE BSR ROUTINE
0004    130 ROTPAT   EQU   R4      ;
        131 ;TEMP1   EQU   R4      (ALREADY DEFINED) CAN BE USED AS LONG AS NOT IN SCAN
0005    132 ROTCNT   EQU   R5      ;
        133 ;TEMP2   EQU   R5      (ALREADY DEFINED) SAME AS TEMP1 ABOVE
0006    134 LASTKY   EQU   R6      ;
0007    135 CURDIG   EQU   R7      ;
        136 ;
        137 ;###########################################################
        138 ;
        139 ;     DATA RAM ALLOCATION
        140 ;
0020    141 NREPTS   EQU   32      ;
0021    142 KEYLOC   EQU   33      ;
0022    143 KBDBUF   EQU   34      ;
        144                        ;
0023    145 RDELAY   EQU   35      ;
        146 ;
0024    147 P0SVE    EQU   36      ;PNTR0 SAVE
0025    148 P1SVE    EQU   37      ;PNTR1 SAVE
        149 ;
        150 ;
        151 ;     THE LAST<CHARNO> REGISTERS HOLD THE DISPLAY SEGMENT PATTERNS
        152 ;
0039    153 SEGMAP   EQU   57      ;
        154                        ;
        155 ;     NEXT REGISTER BELOW DISPLAY REGISTER IS BAR (Z ANODE) SEGMENT MAP
        156 ;
0039    157 BAR      EQU   57      ;
        158 ;
        159 ;     SECOND REGISTER BELOW DISPLAY REGISTER IS LOAD CONTROL MAP
        160 ;
0038    161 LOADM    EQU   56      ;
        162 ;
        163 ;
0037    164 DAY      EQU   55            ;DAY OF THE WEEK,1 IS MON,7 IS SUNDAY
        165 ;
0036    166 HOUR     EQU   54            ;HOURS IN BCD AND MILITARY TIME
0035    167 MIN      EQU   53            ;MINUTES IN BCD
        168 ;
0034    169 MINB     EQU   52            ;MINUTES IN BINARY
        170 ;
0033    171 SSH      EQU   51            ;60HZ COUNTER HIGH ORDER
0032    172 SSL      EQU   50            ;60HZ COUNTER LOW ORDER
        173 ;
0031    174 STATE    EQU   49            ;BSRX STATE COUNTER
        175                              ;HIGH 4 BITS OF CODE ARE THE UNIT NUMBER
        176                              ;AND THE LOW4 BITS ARE THE STATE
        177 ;
        178 ;
0030    179 BUFF     EQU   48            ;BUFF IS THE DISPLAY BUFFER THAT IS ENCODED
        180                              ;IN DECIMAL, WITH EACH NIBBLE A DIGIT.  THE
```

```
                181                     ;LEFTMOST DIGIT IS IN LOCATION 48.
                182 ;
                183 ;
002D            184 TIME4   EQU   45    ;END OF PEAK PERIOD 2, ALL TIMES ARE IN
                185                     ;BCD AND MILITARY TIME. 2 BYTES, 45 & 44
                186 ;
002B            187 TIME3   EQU   43    ;BEGINNING OF PEAK PERIOD 2. BYTES 43 & 42
                188 ;
0029            189 TIME2   EQU   41    ;END OF PEAK PERIOD 1. BYTES 41 & 40
                190 ;
0027            191 TIME1   EQU   39    ;BEGINNING OF PEAK PERIOD 1. BYTES 39 & 38
                192 ;
                193 ;
                194 ;
0044            195 KWHM    EQU   68    ;TOTAL KILOWATT HOURS. BCD, 3 BYTES
0042            196 KWHML   EQU   66    ;LOW BYTE
                197 ;
0041            198 KWCNT   EQU   65    ;TOTAL WATT HOURS. BCD, 2 BYTES, HI BYTE
0040            199 KWCNTL  EQU   64    ;LOW BYTE, X.X
                200 ;
0046            201 DKWH    EQU   70    ;TODAY'S KWH, BCD, 2BYTES, HIGH BYTE
0045            202 DKWHL   EQU   69    ;LOW BYTE
                203 ;
0049            204 MKWH    EQU   73    ;THIS MONTH'S KWH, BCD, 3 BYTES, HIGH BYTE
0047            205 MKWHL   EQU   71    ;LOW BYTE
                206 ;
004E            207 PMKWH   EQU   78    ;LAST MONTH'S KWH,BCD,3 BYTES,HIGH BYTE
004C            208 PMKWHL  EQU   76    ;LOW BYTE
                209 ;
004B            210 PDKWH   EQU   75    ;YESTERDAY'S KWH,BCD, 2 BYTES, HIGH BYTE
004A            211 PDKWHL  EQU   74    ;LOW BYTE
                212 ;
                213 ;
                214 ;THE FOLLOWING LOCATIONS ARE DEMANDS IN KW. THEY ARE TWO BCD BYTES OF
                215 ;THE FORM XX.XX KW.
                216 ;
0050            217 TH      EQU   80    ;TARGET, KW, BCD 2BYTES, HIGH BYTE
004F            218 TL      EQU   79    ;LOW BYTE
                219 ;
0054            220 SPH     EQU   84    ;CONTROL POINT, KW, BCD 2 BYTES, HIGH BYTE
0053            221 SPL     EQU   83    ;LOW BYTE
                222 ;
0052            223 HKWH    EQU   82    ;HIGHEST KW SINCE LAST METER READING, HI BYTE
0051            224 HKWL    EQU   81    ;LOW BYTE
                225 ;
0056            226 PHKWH   EQU   86    ;PREVIOUS MONTH'S HIGH KW. HIGH BYTE
0055            227 PHKWL   EQU   85    ;LOW BYTE
                228 ;
0058            229 KWH     EQU   88    ;AVERAGE DEMAND OVER LAST 15 MIN. HIGH BYTE
0057            230 KWL     EQU   87    ;LOW BYTE
                231 ;
                232 ;
005A            233 PRIRTY  EQU   90    ;PRIORITY TABLE
0059            234 POINTER EQU   89    ;POINTER FOR QUEUE
                235 ;
                236 ;
005B            237 MKEY1   EQU   91    ;MEMORY KEY TO DETERMINE IF MEMORY IS VALID
005C            238 MKEY2   EQU   92    ;   "       "
                239 ;
                240 ;
005D            241 MTRFLG  EQU   93    ;COUNTER AND FLAG FOR METER KW INPUT FILTER
```

```
                242 ;
                243 ;
005F            244 E2STR1   EQU     95              ;INTERMEDIATE RESULT STORE FOR EXTPL2
0060            245 E2STR2   EQU     96              ;   "    "      "     "    "    "
                246 ;
                247 ;
                248 ;LAST 31 MEMORY LOCATIONS CONTAIN THE KWH READINGS FOR THE LAST 15 MINUTES
                249 ;THESE READINGS ARE IN BCD, AND OF THE FORM XX.XX KWH.  THE FIRST READING IN
                250 ;THE TABLE IS 3 BYTES AND OF THE FORM XX.XXXX KWH.
                251 ;
0061            252 TABLLO   EQU     97              ;LOWEST BYTE OF LAST MINUTE'S KWH READING
0062            253 TABLL    EQU     98              ;MIDDLE BYTE OF LATEST ENTRY IN KWH TABLE
0063            254 TABLH    EQU     99              ;HIGH BYTE OF LATEST ENTRY IN KWH TABLE
                255 ;
007E            256 TABHL    EQU     126             ;LOW BYTE OF EARLIEST ENTRY OF KWH TABLE
007F            257 TABHH    EQU     127             ;HIGH BYTE OF EARLIEST ENTRY OF KWH TABLE
                258 ;
                259 ;
                260 ;
0525            261 BSRX     EQU     0525H           ;ORIGIN OF BSRX
                262 ;
0300            263 INPUT    EQU     0300H
                264 ;
02A1            265 DISPLY   EQU     02A1H
                266 ;
023C            267 CLEAR    EQU     023CH
                268 ;
0372            269 TMDD     EQU     0372H
                270 ;
025A            271 PRINT    EQU     025AH
                272 ;
                273 ;################################################################
                274 ;
0000            275     ORG     00H
0000 E497       276         JMP     INIT
                277 ;
                278 ;################################################################
                279 ;
0003            280     ORG     03H
0003 0409       281         JMP     EXINT
                282 ;
                283 ;################################################################
                284 ;
0007            285     ORG     007H
0007 041D       286         JMP     TINIT
                287 ;
                288 ;################################################################
                289 ;
                290 ;EXINT  EXTERNAL INTERRUPT ROUTINE
                291 ;
0009 D5         292 EXINT:  SEL     RB1             ;Select register bank 1 for interrupt
000A AA         293         MOV     ASAVE,A         ;Save accumulator
000B 65         294         STOP    TCNT            ;Stop timer
000C 35         295         DIS     TCNTI           ;Disable timer interrupts
000D BF0C       296         MOV     CURDIG,#CHAR2   ;Load CURDIG counter with maximum count
000F B425       297         CALL    BSRX            ;OUTPUT CODE
0011 15         298         DIS     I               ;Disable external interrupts
0012 23F0       299         MOV     A,#TICK         ;Reload TIMER for DISPLAY ROUTINE
0014 62         300         MOV     T,A             ;
0015 55         301         STRT    T               ;Start timer
0016 25         302         EN      TCNTI           ;Enable timer interrupts
```

```
            303 ;
0017 3409   304 ND:    CALL   TIME              ;CALL TIME ROUTINE TO INCREMENT TIME
0019 BB06   305         MOV    PNTR0,#06H        ;LOAD PNTR0 WITH CURRENT DIGIT
001B 0448   306         JMP    REFRSH            ;JUMP TO REFRESH
            307 ;
            308 ;
            309 ;
            310 ;TINIT  TIMER INTERRUPT SUBROUTINE
            311 ;
            312 ;
            313 ;
            314 ;
001D D5     315 TINIT:  SEL    RB1               ;Select register bank 1
001E 2A     316         XCH    A,ASAVE           ;Save accumulator and get old F0 status
001F 85     317         CLR    F0                ;Reset F0
0020 9623   318         JNZ    RLDT              ;The Acc. contains the complement of F0
0022 95     319         CPL    F0                ;If the Acc. is 0, then set F0 to a 1
0023 23F0   320 RLDT:   MOV    A,#TICK           ;Reload timer
0025 62     321         MOV    T,A               ;
0026 FF     322         MOV    A,CURDIG          ;GET DIGIT COUNT
0027 C6FB   323         JZ     BOUT              ;IF ZERO JUMP TO BOUT
0029 F2F9   324         JB7    BOUT1             ;IF NEGATIVE, JUMP TO BOUT1
            325 ;
002B 722F   326         JB3    TI1            ;*
002D 0431   327         JMP    TI2            ;* REMOVE FOR 3 PHASE CONTROL
002F 99F7   328 TI1:    ANL    BTOUT,#BSRBR   ;*
            329 ;
0031 15     330 TI2:    DIS    I                 ;DISABLE EXT INT DURING DIGIT DISPLAY
0032 A8     331         MOV    PNTR0,A           ;LOAD PNTR0 WITH CURRENT DIGIT
            332 ;
            333 ;        ADD    A,#0FAH        ;* ADD FOR 3 PHASE CONTROL
            334 ;
0033 03FC   335         ADD    A,#0FCH        ;*
0035 C640   336         JZ     TI3            ;* REMOVE FOR 3 PHASE CONTROL
0037 07     337 TI4:    DEC    A              ;*
0038 07     338         DEC    A              ;*
            339 ;
0039 F248   340         JB7    REFRSH            ;IF COUNT IS LESS THAN 6, JUMP TO REFRESH
003B C644   341         JZ     B1                ;IF 6, OUTPUT CODE
003D A8     342         MOV    PNTR0,A           ;IF GREATER THAN 6, LOAD PNTR0 WITH CURDIG
            343                                  ;MINUS 6
003E 0448   344         JMP    REFRSH            ;JUMP TO REFRESH
            345 ;
0040 99F7   346 TI3:    ANL    BTOUT,#BSRBR ;* REMOVE FOR 3 PHASE CONTROL
0042 0437   347         JMP    TI4            ;*
            348 ;
0044 B425   349 B1:     CALL   BSRX              ;IF 6, OUTPUT CODE
0046 B806   350         MOV    PNTR0,#06H
            351 ;
            352 ;***********************************************************
            353 ;
            354 ;   REFRSH SUBROUTINE TO MULTIPLEX SEVEN-SEGMENT, DECIMAL POINT,
            355 ;   AND BAR (Z ANODE) DISPLAYS
            356 ;
            357 ;***********************************************************
            358 ;
0048 23FF   359 REFRSH: MOV    A,#0FFH
004A B901   360         MOV    PNTR1,#PDIGIT
004C 91     361         MOVX   @PNTR1,A          ;WRITE BLANK PATTERN TO DIGIT DRIVERS
004D B900   362         MOV    PNTR1,#PSGMNT
```

```
004F 91        363          MOVX    @PNTR1,A         ;WRITE BLANK PATTERN TO SEG DRIVERS
0050 B902      364          ORL     BTOUT,#ZBS       ;SET P21 HIGH TO TURN OFF Z ANODE
               365 ;
               366 ;
0052 2339      367 REFR1:   MOV     A,#SEGMAP        ;LOAD BASE OF REG ARRAY
0054 68        368          ADD     A,PNTR0          ;PNTR0 CONTAINS CURRENT DIGIT
0055 A9        369          MOV     PNTR1,A
0056 F1        370          MOV     A,@PNTR1         ;
0057 B900      371          MOV     PNTR1,#PSGMNT
0059 91        372          MOVX    @PNTR1,A
               373 ;
005A 23F2      374          MOV     A,#CHRSTB        ;PNTR0 CONTAINS CURRENT DIGIT
005C 68        375          ADD     A,PNTR0          ;
005D A3        376          MOVP    A,@A             ;
005E B901      377          MOV     PNTR1,#PDIGIT
0060 91        378          MOVX    @PNTR1,A
               379 ;
0061 B939      380          MOV     PNTR1,#BAR       ;LOAD ADDRESS OF BAR MAP
0063 37        381          CPL     A                ;COMPLIMENT DIGIT MASK TO FORM MASK FOR BAR MAP
0064 51        382          ANL     A,@PNTR1         ;MASK OUT ALL BITS EXCEPT FOR CURRENT DIGIT
0065 C669      383          JZ      SCAN             ;IF ZERO, DO NOT TURN ON BAR
0067 99FD      384          ANL     BTOUT,#ZBR       ;IF ONE, SET P21 LOW TO TURN ON BAR
               385 ;################################################
               386 ;
               387 ;    SCAN ROUTINE
               388 ;
               389 ;################################################
               390 ;
0069 B821      391 SCAN:    MOV     PNTR0,#KEYLOC    ;
006B 0A        392          IN      A,PINPUT         ;
               393 ;
006C BD04      394 SCAN1:   MOV     ROTCNT,#NCOLS    ;SET UP FOR <NCOLS> LOOPS THROUGH 'NXTLOC'
006E F7        395 NXTLOC:  RLC     A
006F AC        396          MOV     ROTPAT,A         ;SAVE SHIFTED BIT PATTERN
0070 F68A      397          JC      SCAN5            ;ONE BIT IN CY INDICATES KEY NOT DOWN
               398 ;
0072 85        399          CLR     F0               ;
0073 95        400          CPL     F0               ;
               401 ;
               402 ;
0074 F0        403          MOV     A,@PNTR0         ;
0075 2E        404          XCH     A,LASTKY         ;
0076 DE        405          XRL     A,LASTKY
0077 B820      406          MOV     PNTR0,#NREPTS    ;
0079 C67F      407          JZ      SCAN3
               408 ;
               409 ;
               410 ;
007B B002      411          MOV     @PNTR0,#DEBNCE
007D 048A      412          JMP     SCAN5
               413 ;
               414 ;
               415 ;
007F F0        416 SCAN3:   MOV     A,@PNTR0
0080 C68A      417          JZ      SCAN5            ;
0082 07        418          DEC     A                ;
0083 A0        419          MOV     @PNTR0,A
0084 968A      420          JNZ     SCAN5            ;
0086 FE        421          MOV     A,LASTKY
0087 B822      422          MOV     PNTR0,#KBDBUF
0089 A0        423          MOV     @PNTR0,A         ;
```

```
                424 ;
008A B821       425 SCAN5:  MOV     PNTR0,#KEYLOC
008C 10         426         INC     @PNTR0
008D FC         427         MOV     A,ROTPAT
008E ED6E       428         DJNZ    ROTCNT,NXTLOC
                429 ;
                430 ;
0090 CF         431 SCAN6:  DEC     CURDIG
0091 FF         432         MOV     A,CURDIG
0092 C698       433         JZ      CDISP           ;Go to CDISP at each half cycle
0094 D306       434         XRL     A,#06H
0096 96C7       435         JNZ     SCAN9
                436 ;
                437 ;The following code is executed every half cycle of the AC power line,
                438 ;resulting in a polling frequency of 120 Hz.
                439 ;
                440 ;
0098 D40C       441 CDISP:  CALL    KW              ;Poll meter input and update kW
009A 09         442         IN      A,BTOUT         ;Poll "METER READ" switch
009B 5304       443         ANL     A,#RMTRS        ;Bit 2 is "METER READ" signal
009D C6B3       444         JZ      CDISP2          ;If zero, the meter is not being read
009F B851       445 EOM:    MOV     PNTR0,#HKWL     ;If one, the meter is being read
00A1 B955       446         MOV     PNTR1,#PHKWL    ;So transfer the present HIGH kW to
00A3 14EC       447         CALL    XFER            ;the PREVIOUS HIGH kW, and at the same time
00A5 14EC       448         CALL    XFER            ;zero out the present HIGH kW
00A7 B847       449         MOV     PNTR0,#MKWHL    ;Move M-T-D kWh to previous M-T-D kWh
00A9 B94C       450         MOV     PNTR1,#PMKWHL
00AB 14EC       451 EOM1:   CALL    XFER
00AD 14EC       452         CALL    XFER
00AF 14EC       453         CALL    XFER
00B1 99FB       454         ANL     BTOUT,#RMTRR    ;Force a zero on the meter read line until
                455                                 ;Midnight, so the meter can only be read once
                456                                 ;a day
00B3 76D3       457 CDISP2: JF1     CCPRNT          ;Print DEFER message if Central Control
00B5 54A1       458 CDISP3: CALL    DISPLY          ;Otherwise, call DISPLY to update the display
                459 ;
                460 ;
00B7 B821       461 SCAN7:  MOV     PNTR0,#KEYLOC
00B9 B000       462         MOV     @PNTR0,#0       ;
00BB B6BF       463         JF0     SCAN8           ;
00BD BEFF       464         MOV     LASTKY,#0FFH    ;
00BF 85         465 SCAN8:  CLR     F0
                466 ;
                467 ;
00C0 B923       468         MOV     PNTR1,#RDELAY
00C2 F1         469         MOV     A,@PNTR1
00C3 C6C7       470         JZ      SCAN9
00C5 07         471         DEC     A
00C6 A1         472         MOV     @PNTR1,A
                473 ;
00C7 27         474 SCAN9:  CLR     A               ;Save the status of F0
00C8 B6CB       475         JF0     SCAN10          ;ASAVE will hold the complement of F0
00CA 37         476         CPL     A               ;If F0 is a 0, store 0FFH
00CB 2A         477 SCAN10: XCH     A,ASAVE         ;RESTORE ACC
                478 ;
                479 ;
00CC 36D2       480 VCCLOW: JT0     VCCOK           ;Wait here if low voltage is indicated, until a
                481                                 ;RESET or normal voltage returns
00CE 99F7       482         ANL     BTOUT,#BSRBR    ;Turn off transmitter while we are waiting
00D0 04CC       483         JMP     VCCLOW
00D2 93         484 VCCOK:  RETR                    ;RETURN
```

```
                485 ;
                486 ;
00D3 BB32       487 CCPRNT: MOV    PNTR0,#SSL       ;Get subseconds time to determine
00D5 F0         488         MOV    A,@PNTR0         ;flash time
00D6 D2B5       489         JB6    CDISP3           ;Bit6 for 1 sec rate
00D8 B8E5       490         MOV    PNTR0,#CCPAT     ;Load DEFER pattern address
00DA B93F       491         MOV    PNTR1,#SEGMAP+CHARN0   ;Load display buffer address
00DC F8         492 CCPR1:  MOV    A,PNTR0          ;Load pattern address into ACC.
00DD A3         493         MOVP   A,@A             ;Get pattern
00DE C6B7       494         JZ     SCAN7            ;Zero marks the end
00E0 A1         495         MOV    @PNTR1,A         ;Otherwise store pattern in buffer
00E1 18         496         INC    PNTR0            ;Next pattern
00E2 C9         497         DEC    PNTR1            ;Next buffer location
00E3 04DC       498         JMP    CCPR1
                499 ;
                500 ;
                501 ;CCPAT IS THE SEGMENT PATTERN FOR THE DEFER MESSAGE USED IN CENTRAL CONTROL
                502 ;
00E5            503 CCPAT   EQU    $ AND 0FFH
                504 ;
00E5 C2         505         DB     00111101B XOR SEGPOL   ;d
00E6 B0         506         DB     01001111B XOR SEGPOL   ;E
00E7 B8         507         DB     01000111B XOR SEGPOL   ;F
00E8 B0         508         DB     01001111B XOR SEGPOL   ;E
00E9 FA         509         DB     00000101B XOR SEGPOL   ;r
00EA FF         510         DB     BLANK XOR SEGPOL       ;
00EB 00         511         DB     00H
                512 ;
                513 $EJECT
                514 ;
00EC F0         515 XFER:   MOV    A,@PNTR0
00ED A1         516         MOV    @PNTR1,A
00EE B000       517         MOV    @PNTR0,#00
00F0 18         518         INC    PNTR0
00F1 19         519         INC    PNTR1
00F2 83         520         RET
                521 ;
                522 ;
                523 ;
                524 ;**************************************************
                525 ;
                526 ;CHRSTB IS THE BASE FOR THE PATTERNS TO ENABLE ONE-OF-CHARN0 CHARACTERS
                527 ;
00F2            528 CHRSTB  EQU    ($-1) AND 0FFH
00F3 FB         529         DB     (00000100B XOR CHRPOL)
00F4 F7         530         DB     (00001000B XOR CHRPOL)
00F5 EF         531         DB     (00010000B XOR CHRPOL)
00F6 DF         532         DB     (00100000B XOR CHRPOL)
00F7 BF         533         DB     (01000000B XOR CHRPOL)
00F8 7F         534         DB     (10000000B XOR CHRPOL)
                535 ;
                536 ;
00F9 BF0D       537 BOUT1:  MOV    CURDIG,#CHAR2+1  ;RELOAD DIGIT COUNTER
00FB CF         538 BOUT:   DEC    CURDIG
00FC 23FF       539         MOV    A,#0FFH          ;BLANK DISPLAY
00FE B901       540         MOV    PNTR1,#PDIGIT
0100 91         541         MOVX   @PNTR1,A
0101 B900       542         MOV    PNTR1,#PSGMNT
0103 91         543         MOVX   @PNTR1,A
0104 8902       544         ORL    BTOUT,#ZBS
```

```
0106 05      545       EN     I              ;ENABLE INTERRUPTS
0107 04C7    546       JMP    SCAN9
             547 ;
             548 ;
             549 ;
             550 ;
0109 BB32    551 TIME: MOV    PNTR0,#55L     ;LOAD POINTER WITH 60HZ COUNTER ADDRESS
010B D406    552       CALL   CDN            ;CALL COUNTDOWN TO DECREMENT LOCATION
010D F6C6    553       JC     TR1            ;IF BORROW, JUMP TO RETURN
010F 18      554       INC    PNTR0          ;IF NO BORROW, MOVE TO HIGH BYTE
0110 D406    555       CALL   CDN            ;CALL COUNTDOWN TO DECREMENT LOCATION
0112 F6C6    556       JC     TR1            ;IF BORROW, JUMP TO RETURN
             557 ;
             558 ;############ SET FOR 6 TIMES ACCELERATION ##########################
             559 ;
0114 B002    560       MOV    @PNTR0,#02H    ;IF NO BORROW, RELOAD COUNTER WITH 3599
0116 C8      561       DEC    PNTR0
0117 B058    562       MOV    @PNTR0,#58H    ;RELOAD LOW BYTE
0119 BB34    563       MOV    PNTR0,#MINB    ;INCREMENT BINARY MINUTE COUNT
011B 10      564       INC    @PNTR0
             565 ;
011C F0      566       MOV    A,@PNTR0
011D 530F    567       ANL    A,#0FH
011F 9625    568       JNZ    M1
             569 ;
0121 B931    570       MOV    PNTR1,#STATE   ;IF 16 MIN HAVE ELAPSED, OUTPUT LOAD MAP
0123 B101    571       MOV    @PNTR1,#01H    ;LOAD STATE COUNTER TO START TRANSMISSION
             572 ;
             573 ;
0125 18      574 M1:   INC    PNTR0          ;LOAD POINTER WITH BCD MINUTES ADDRESS
0126 F0      575       MOV    A,@PNTR0       ;IF MINUTES ARE FF:FF THEN START-UP MODE
0127 F28E    576       JB7    ONPK           ;CHECK FOR FF:FF
0129 D400    577       CALL   CUP            ;INCREMENT BCD MIONUTES
012B 03A0    578       ADD    A,#0A0H        ;CHECK FOR OVERFLOW
012D E653    579       JNC    PKTST          ;IF NO CARRY, JUMP TO PKTST
012F B000    580       MOV    @PNTR0,#00H    ;RESET MINUTES
0131 18      581       INC    PNTR0          ;LOAD POINTER WITH HOURS ADDRESS
0132 D400    582       CALL   CUP            ;INCREMENT BCD HOURS
0134 03DC    583       ADD    A,#0DCH        ;CHECK FOR OVERFLOW
0136 E653    584       JNC    PKTST          ;IF NO CARRY, JUMP TO PKTST
0138 B000    585       MOV    @PNTR0,#00H    ;RESET BCD HOURS
013A 18      586       INC    PNTR0          ;LOAD ADDRESS OF DAY
013B 10      587       INC    @PNTR0         ;INCREMENT DAY
013C F0      588       MOV    A,@PNTR0       ;GET DAY
013D 7241    589       JB3    D1             ;IF OVERFLOW, JUMP TO D1
013F 2443    590       JMP    EOD            ;JUMP TO EOD
0141 B001    591 D1:   MOV    @PNTR0,#01H    ;RESET DAY
             592 ;
0143 B945    593 EOD:  MOV    PNTR1,#DKWHL
0145 B84A    594       MOV    PNTR0,#PDKWHL
0147 2300    595       MOV    A,#00H
0149 21      596       XCH    A,@PNTR1
014A A0      597       MOV    @PNTR0,A
014B 18      598       INC    PNTR0
014C 19      599       INC    PNTR1
014D 2300    600       MOV    A,#00H
014F 21      601       XCH    A,@PNTR1
0150 A0      602       MOV    @PNTR0,A
0151 8904    603       ORL    BTOUT,#RMTRS
             604 ;
```

```
0153 B837    605 PKTST:  MOV   PNTR0,#DAY
0155 F0      606         MOV   A,@PNTR0
0156 0302    607         ADD   A,#02H
0158 72B8    608         JB3   OFPK
015A B926    609         MOV   PNTR1,#TIME1-1
015C B835    610         MOV   PNTR0,#MIN
015E D4B3    611         CALL  DPSUB
0160 E676    612         JNC   PKTST1
0162 C8      613         DEC   PNTR0
0163 19      614         INC   PNTR1
0164 D4B3    615         CALL  DPSUB
0166 E68E    616         JNC   ONPK
0168 C8      617         DEC   PNTR0
0169 19      618         INC   PNTR1
016A D4B3    619         CALL  DPSUB
016C E676    620         JNC   PKTST1
016E C8      621         DEC   PNTR0
016F 19      622         INC   PNTR1
0170 D4B3    623         CALL  DPSUB
0172 E68E    624         JNC   ONPK
0174 2488    625         JMP   OFPK
0176 FD      626 PKTST1: MOV   A,TEMP2
0177 D399    627         XRL   A,#99H
0179 9688    628         JNZ   OFPK
017B FC      629         MOV   A,TEMP1
017C 0389    630         ADD   A,#89H
017E F690    631         JC    ONPK1
0180 0317    632         ADD   A,#17H
0182 F688    633         JC    OFPK
0184 0329    634         ADD   A,#29H
0186 F690    635         JC    ONPK1
             636 ;
0188 99EF    637 OFPK:   ANL   BTOUT,#ONPR
018A 8920    638         ORL   BTOUT,#OFPS
018C 2492    639         JMP   SND
018E 99DF    640 ONPK:   ANL   BTOUT,#OFPR
0190 8910    641 ONPK1:  ORL   BTOUT,#ONPS
             642 ;
0192 D459    643 SND:    CALL  DEMAND         ;CALL DEMAND TO CALCULATE DEMAND
             644 ;
0194 769F    645 CONTRL: JF1   C01            ;If under Central Control, go directly to
             646                              ;control algorithm without checking priority
             647                              ;1 loads
0196 F486    648         CALL  PCHK           ;Check that all the priority 1 loads are on
0198 09      649         IN    A,BTOUT
0199 929F    650         JB4   C01
019B F446    651         CALL  RESTR
019D C446    652         JMP   STORE          ;Jump to STORE and return to calling program
019F 85      653 C01:    CLR   F0
01A0 95      654         CPL   F0
01A1 D4DB    655         CALL  EXTPL2         ;Get 14 minute extrapolated demand
01A3 34AB    656         CALL  CNTRL1         ;Check 14 minute extrapolated demand
01A5 D4FA    657         CALL  EXTPL          ;Get 1 minute extrapolated demand
01A7 34AB    658         CALL  CNTRL1         ;Check 1 minute extrapolated demand
01A9 C446    659         JMP   STORE          ;Store current meter reading, jump to sub-
             660                              ;routine causes RETURN to calling program
             661 ;
             662 ;
01AB B91C    663 CNTRL1: MOV   PNTR1,#28
01AD B853    664         MOV   PNTR0,#SPL
01AF D4B3    665         CALL  DPSUB
```

```
01B1 F6B5      666          JC     CNTRL2
01B3 E41D      667          JMP    SHED         ;Jump to Subroutine for auto return
01B5 B6C5      668 CNTRL2:  JF0    CRET         ;If FLAG0 is set, then it is pass on 14 min
               669                              ;demand, or SHED was called by 14 min demand
01B7 B80A      670          MOV    PNTR0,#10
01B9 D4CD      671          CALL   XN
01BB B91C      672          MOV    PNTR1,#28
01BD B853      673          MOV    PNTR0,#SPL
01BF D4B3      674          CALL   DPSUB
01C1 F6C5      675          JC     CRET
01C3 F446      676          CALL   RESTR
01C5 85        677 CRET:    CLR    F0           ;Reset FLAG0 so that RESTORE can be called
01C6 83        678 TR1:     RET                 ;by 1 min demand
               679 ;
               680 ;
               681 ;
               682 $EJECT
               683 ;
               684 ;
0600           685 ORG      0600H
               686 ;
               687 ;
               688 ;************************************************************
               689 ;
               690 ;        COUNTDOWN AND COUNTUP SUBROUTINES
               691 ;
               692 ;************************************************************
               693 ;
0600 F0        694 CUP:     MOV    A,@PNTR0     ;GET BYTE
0601 0301      695          ADD    A,#01H       ;INCREMENT BCD BYTE (ADD is used so carry is affected)
0603 57        696          DA     A            ;DECIMAL ADJUST BCD BYTE
0604 A0        697          MOV    @PNTR0,A     ;STORE BCD MINUTES
0605 83        698          RET
               699 ;
               700 ;
0606 97        701 CDN:     CLR    C            ;CLEAR CARRY
0607 F0        702          MOV    A,@PNTR0     ;GET BYTE
0608 03FF      703          ADD    A,#0FFH      ;ADD -1
060A A0        704          MOV    @PNTR0,A     ;REPLACE BYTE
060B 83        705          RET
               706 ;
               707 ;
060C B95D      708 KW:      MOV    PNTR1,#MTRFLG ;Get counter address
060E F1        709          MOV    A,@PNTR1     ;Get counter
060F F218      710          JB7    TST1         ;Bit 7 is a flag that indicates what input signal
               711                              ;we are looking for
0611 5617      712          JT1    KWND         ;If we are looking for a 0 on T1, but T1 is a
               713                              ;1, then we return
0613 17        714 TST2:    INC    A            ;Increment the counter if T1 is what we are looking for
0614 721B      715          JB3    KWINC        ;If bit 3 is set, then we have counted 8 inputs
               716                              ;of the proper state, and it's time to increment the kW counter
0616 A1        717          MOV    @PNTR1,A     ;If there is not 8, store the count for next time
0617 83        718 KWND:    RET                 ;and return
0618 5613      719 TST1:    JT1    TST2         ;We are looking for a 1 on T1, so jump to TST2
061A 83        720          RET                 ;if T1 is a 1, otherwise return
061B 5380      721 KWINC:   ANL    A,#80H       ;Zero counter for next count, but save state
061D D380      722          XRL    A,#80H       ;Set flag to opposite state
061F A1        723          MOV    @PNTR1,A     ;Store counter
0620 B840      724          MOV    PNTR0,#KWCNTL ;Get watthour counter low byte
0622 F0        725          MOV    A,@PNTR0
```

```
0623 0336     726       ADD     A,#SCALEL      ;Add in low byte of Kh for meter
0625 57       727       DA      A
0626 A0       728       MOV     @PNTR0,A       ;Store low byte
0627 18       729       INC     PNTR0          ;Increment to get high byte of counter
0628 F0       730       MOV     A,@PNTR0
0629 1300     731       ADDC    A,#SCALE       ;Add in high byte of Kh
062B 57       732       DA      A
062C A0       733       MOV     @PNTR0,A       ;Store high byte
062D E617     734       JNC     KWND           ;If there is no carry out of the watthour counter
              735                              ;then we do not have to ripple the carry any further
              736                              ;If there is a carry, ripple it to kWh counter
062F B903     737       MOV     PNTR1,#(KWHM-KWHML)+1   ;PNTR1 is the number of bytes to be rippled
0631 D43D     738       CALL    LOOP3          ;PNTR0 contains the low byte address
0633 B902     739       MOV     PNTR1,#(DKWH-DKWHL)+1   ;Also ripple to Daily kWh
0635 B844     740       MOV     PNTR0,#DKWHL-1
0637 D43D     741       CALL    LOOP3
0639 B903     742       MOV     PNTR1,#(MKWH-MKWHL)+1   ;Also M-T-D kWh
063B B846     743       MOV     PNTR0,#MKWHL-1
063D 18       744 LOOP3: INC    PNTR0          ;Get next byte to be rippled
063E D400     745       CALL    CUP            ;Increment byte
0640 E943     746       DJNZ    PNTR1,LOOP2    ;If this is not the last byte, propigate carry
0642 83       747       RET                    ;If it is the last byte, return
0643 F63D     748 LOOP2: JC     LOOP3          ;If a carry needs to be propigated, continue
0645 83       749       RET                    ;Otherwise return
              750 ;
              751 ;
              752 ;     STORE is a routine to bump the stack which contains all the
              753 ;     one minute kilowatt hour readings. It also transfers the
              754 ;     present reading into the first location.
              755 ;
              756 ;
0646 BC0E     757 STORE: MOV    TEMP1,#(TABHH-TABLH)/2  ;Load counter with number of table entries
0648 B87F     758       MOV     PNTR0,#TABHH   ;Load PNTR0 with destination
064A B97D     759       MOV     PNTR1,#TABHH-2 ;Load PNTR1 with source
064C D4C6     760 LOOP5: CALL   DPSET          ;Call DPSET to transfer two bytes
064E C9       761       DEC     PNTR1          ;Decrement both pointers for next transfer
064F C8       762       DEC     PNTR0
0650 EC4C     763       DJNZ    TEMP1,LOOP5    ;Loop until all entries have been bumped
0652 B942     764       MOV     PNTR1,#KWHML   ;Load source to add new first entry
0654 D4C6     765       CALL    DPSET          ;Do two transfers without decrement
0656 D4C6     766       CALL    DPSET          ; in order to transfer three bytes
0658 83       767       RET
              768 ;
              769 ;
0659 B841     770 DEMAND: MOV   PNTR0,#KWCNT   ;Subtract present kWh reading from the
065B B97E     771       MOV     PNTR1,#TABHL   ;the reading taken 15 minutes ago (last
065D D4B3     772       CALL    DPSUB          ;entry in the table)
065F B804     773       MOV     PNTR0,#04      ;Then multiply by 4 to get 15 minute average
0661 D4CD     774       CALL    XN             ;demand
0663 B858     775       MOV     PNTR0,#KWH     ;Store the new 15 min demand
0665 B91D     776       MOV     PNTR1,#29
0667 D4C6     777       CALL    DPSET
0669 8980     778       ORL     BTOUT,#CLCS    ;Turn on Central Control bit for input
066B 09       779       IN      A,BTOUT        ;Read status of input lines
066C 5380     780       ANL     A,#CLCS        ;Mask Central Control input line
066E 9695     781       JNZ     CENTC          ;If bit is 1, then central control is required
0670 A5       782       CLR     F1             ;If not, then clear Central Control flag
0671 09       783 DEM1A: IN     A,BTOUT        ;Get input lines again
0672 B27E     784       JB5     DEM1           ;If bit 5, then we are off peak
0674 B851     785       MOV     PNTR0,#HKWL    ;Otherwise we are on peak and must compare
0676 B957     786       MOV     PNTR1,#KWL     ;the present demand with the highest demand
```

```
0678 D4B3      787         CALL    DPSUB
067A F67E      788         JC      DEM1            ;If carry, then the present demand is lower
067C D4C6      789         CALL    DPSET           ;The present demand is higher,so update HKW
067E 7694      790 DEM1:   JF1     DRET            ;If under Central Control, return
0680 BB4F      791         MOV     PNTR0,#TL       ;Otherwise compare the TARGET with HKW to see
0682 B951      792         MOV     PNTR1,#HKWL     ;which is larger, for control point
0684 D4B3      793         CALL    DPSUB
0686 B854      794         MOV     PNTR0,#SPH      ;Destination is Set Point (Control Point)
0688 F68E      795         JC      DEM2            ;Carry indicates TARGET is greater than HKW
068A 8940      796         ORL     BTOUT,#HDS      ;Otherwise HKW is greater, so turn on TARGET
068C C492      797         JMP     DEM2A           ;EXCEEDED and transfer HKW to SP
068E B950      798 DEM2:   MOV     PNTR1,#TH       ;Transfer TARGET to SP
0690 99BF      799         ANL     BTOUT,#HDR      ;Turn off TARGET EXCEEDED
0692 D4C6      800 DEM2A:  CALL    DPSET           ;Make the appropriate transfer
0694 83       801 DRET:   RET
              802 ;
              803 ;################################################################
              804 ;
              805 ;
0695 7671     806 CENTC:  JF1     DEM1A            ;If the flag is set, then the control point has
              807                                  ;been adjusted, so do nothing
0697 B5       808         CPL     F1               ;If flag is not set, set it and adjust control
0698 BC50     809         MOV     TEMP1,#DEFL      ;point by subtracting the kW to be deferred
069A BD02     810         MOV     TEMP2,#DEFH      ;from the present demand
069C D4B3     811         CALL    DPSUB            ;
069E B854     812         MOV     PNTR0,#SPH       ;Point to control point storage location
06A0 E6AC     813         JNC     CENT1            ;If there is no carry, then the adjusted demand
              814                                  ;is negative, so set it to the minimum demand
06A2 D4C6     815         CALL    DPSET            ;Store the adjusted demand as the control point
06A4 BC00     816         MOV     TEMP1,#MINDL     ;Check adjusted demand to see if it is below
06A6 BD02     817         MOV     TEMP2,#MINDH     ;the minimum allowable demand
06A9 D4B3     818         CALL    DPSUB            ;
06AA F671     819         JC      DEM1A            ;If it is not, do nothing
06AC B002     820 CENT1:  MOV     @PNTR0,#MINDH    ;If it is below the minimum, then set the
06AE C8       821         DEC     PNTR0            ;control point to the minimum demand
06AF B000     822         MOV     @PNTR0,#MINDL    ;
06B1 C471     823         JMP     DEM1A            ;Return to calculate HKW if necessary
              824 ;
              825 ;################################################################
              826 ;
              827 ;
06B3 F1       828 DPSUB:  MOV     A,@PNTR1
06B4 37       829         CPL     A
06B5 039B     830         ADD     A,#9BH
06B7 AC       831         MOV     TEMP1,A
06B8 19       832         INC     PNTR1
06B9 F1       833         MOV     A,@PNTR1
06BA 37       834         CPL     A
06BB 1399     835         ADDC    A,#99H
06BD 2C       836         XCH     A,TEMP1
06BE 60       837         ADD     A,@PNTR0
06BF 57       838         DA      A
06C0 2C       839         XCH     A,TEMP1
06C1 18       840         INC     PNTR0
06C2 70       841         ADDC    A,@PNTR0
06C3 57       842         DA      A
06C4 AD       843         MOV     TEMP2,A
06C5 83       844         RET
              845 ;
              846 ;       DPSET is a routine to transfer a double precision number from
              847 ;       one location to another. PNTR0 contains the high byte address
```

```
                848 ;         of the destination, and PNTR1 contains the high byte of the
                849 ;         source.
                850 ;
                851 ;
06C6 F1         852 DPSET:  MOV    A,@PNTR1
06C7 A0         853         MOV    @PNTR0,A
06C8 C9         854         DEC    PNTR1
06C9 C8         855         DEC    PNTR0
06CA F1         856         MOV    A,@PNTR1
06CB A0         857         MOV    @PNTR0,A
06CC 83         858         RET
                859 ;
                860 ;
06CD 27         861 XN:     CLR    A
06CE A9         862         MOV    PNTR1,A
06CF 6C         863 XN1:    ADD    A,TEMP1
06D0 57         864         DA     A
06D1 29         865         XCH    A,PNTR1
06D2 7D         866         ADDC   A,TEMP2
06D3 57         867         DA     A
06D4 29         868         XCH    A,PNTR1
06D5 E8CF       869         DJNZ   PNTR0,XN1
06D7 AC         870         MOV    TEMP1,A
06D8 F9         871         MOV    A,PNTR1
06D9 AD         872         MOV    TEMP2,A
06DA 83         873         RET
                874 ;
06DB B841       875 EXTPL2: MOV    PNTR0,#KWCNT     ;Load pointer with address of meter reading
06DD B97C       876         MOV    PNTR1,#TABHL-2   ;
06DF D4B3       877         CALL   DPSUB            ;
06E1 C8         878         DEC    PNTR0            ;
06E2 B95F       879         MOV    PNTR1,#E2STR1    ;
06E4 FC         880         MOV    A,TEMP1          ;
06E5 60         881         ADD    A,@PNTR0         ;
06E6 57         882         DA     A                ;
06E7 A1         883         MOV    @PNTR1,A         ;
06E8 FD         884         MOV    A,TEMP2          ;
06E9 19         885         INC    PNTR1
06EA 18         886         INC    PNTR0
06EB 70         887         ADDC   A,@PNTR0         ;
06EC 57         888         DA     A                ;
06ED A1         889         MOV    @PNTR1,A         ;
06EE B85F       890         MOV    PNTR0,#E2STR1    ;
06F0 B962       891         MOV    PNTR1,#TABLL     ;
06F2 D4B3       892         CALL   DPSUB            ;
06F4 BB04       893         MOV    PNTR0,#04        ;
06F6 D4CD       894         CALL   XN               ;
06F8 E406       895         JMP    AOFST            ;
                896 ;
06FA BB40       897 EXTPL:  MOV    PNTR0,#KWCNTL
06FC B961       898         MOV    PNTR1,#TABLLO
06FE D4B3       899         CALL   DPSUB
0700 F411       900         CALL   X10
0702 BB06       901         MOV    PNTR0,#06
0704 D4CD       902         CALL   XN
                903 ;
0706 2350       904 AOFST:  MOV    A,#OFSTL         ;OFFSET FROM TARGET. TENTHS OF KW
0708 6C         905         ADD    A,TEMP1
0709 57         906         DA     A
070A AC         907         MOV    TEMP1,A
070B 2300       908         MOV    A,#OFSTH         ;OFFSET FROM TARGET. KW
```

```
0700 7D      909         ADDC    A,TEMP2
070E 57      910         DA      A
070F AD      911         MOV     TEMP2,A
0710 83      912         RET
             913 ;
0711 B81C    914 X10:    MOV     PNTR0,#2B
0713 FD      915         MOV     A,TEMP2
0714 30      916         XCHD    A,@PNTR0
0715 47      917         SWAP    A
0716 530F    918         ANL     A,#0FH
0718 AD      919         MOV     TEMP2,A
0719 FC      920         MOV     A,TEMP1
071A 47      921         SWAP    A
071B AC      922         MOV     TEMP1,A
071C 83      923         RET
             924 ;
             925 ;
             926 $EJECT
             927 ;
             928 ;
             929 ;$$$$$$$$$$$$$$$$$$$$$$$$$$$$$$$$$$$$$$$$$$$$$$$$$$$$$$$$$$$$$$$$
             930 ;
             931 ;       SHED:   Subroutine to SHED one load if possible.  Starts from
             932 ;               current pointer, and searches through the loads with
             933 ;               higher unit numbers, looping around to unit 1, until
             934 ;               a priority 0 load is found to be on.  This load is then
             935 ;               SHED, forming a QUEUE, i.e. first on first off.  If no
             936 ;               priority 0 loads can be found, no action is taken, except
             937 ;               as below.
             938 ;
             939 ;               During Central Control, a further action is taken if no
             940 ;               priority 0 loads can be found.  Starting with unit 8, a
             941 ;               search from highest to lowest unit number is conducted,
             942 ;               until a priority 1 load is found to be on.  This load is
             943 ;               then SHED.  This is a STACK, i.e. first off, last on, with
             944 ;               the highest load number having the "lowest priority"
             945 ;               within the priority 1 loads.
             946 ;
             947 ;$$$$$$$$$$$$$$$$$$$$$$$$$$$$$$$$$$$$$$$$$$$$$$$$$$$$$$$$$$$$$$$$
             948 ;
071D B838    949 SHED:   MOV     PNTR0,#LOADM   ;
071F F0      950         MOV     A,@PNTR0       ;Move STATUS to Accumulator
0720 B95A    951         MOV     PNTR1,#PRIRTY  ;Shed priority 0 loads first
0722 41      952         ORL     A,@PNTR1       ;Mask with PRIORITY so that all the priority
             953                                ;1 loads appear to be off
0723 37      954         CPL     A              ;Complement Acc. since we are looking for
             955                                ;loads that are on (0 is on)
0724 AD      956         MOV     TEMP2,A        ;TEMP2 contains the masked status
0725 B959    957         MOV     PNTR1,#POINTER ;Obtain the QUEUE pointer
0727 F1      958         MOV     A,@PNTR1
0728 AC      959         MOV     TEMP1,A        ;TEMP1 used to mask TEMP2 to determine
             960                                ;the next load to be turned off, Masking
             961                                ;starts with pointer BIT
0729 F475    962         CALL    SRCH           ;Call search to find next on load
072B 963F    963         JNZ     SH3            ;Non zero means an on load was found, so turn
             964                                ;it off.
             965 ;
072D BC80    966         MOV     TEMP1,#80H     ;Load pointer to begin search of priority 1 loads.
072F B908    967         MOV     PNTR1,#08      ;Set up to loop 8 times
0731 7634    968         JF1     SH2            ;But only continue if under Central Control
0733 83      969         RET                    ;Otherwise return
```

```
               970 ;
               971 ;
0734 F0        972 SH2:   MOV    A,@PNTR0       ;Get status
0735 37        973        CPL    A              ;Complement, since we are lookig for on loads
0736 5C        974        ANL    A,TEMP1        ;Mask with present pointer
0737 963F      975        JNZ    SH3            ;If not zero, then this load is on
0739 FC        976        MOV    A,TEMP1        ;Get pointer
073A 77        977        RR     A              ;Rotate pointer
073B AC        978        MOV    TEMP1,A        ;Save rotated pointer
073C E934      979        DJNZ   PNTR1,SH2      ;Loop 8 times to check all the loads
073E 83        980        RET                   ;Return if no loads were found
               981 ;
073F B931      982 SH3:   MOV    PNTR1,#STATE   ;Set state to 1 to start BSR transmission
0741 B101      983        MOV    @PNTR1,#01H
0743 40        984        ORL    A,@PNTR0       ;Acc. contains the pointer or with STATUS
0744 A0        985        MOV    @PNTR0,A       ;Store new STATUS
0745 83        986        RET
               987 ;
               988 ;
               989 $EJECT
               990 ;
               991 ;
               992 ;**************************************************************
               993 ;
               994 ;      RESTR:  Subroutine to restore one load if possible. Priority 1
               995 ;              loads are restored first, starting with unit #1 and
               996 ;              continuing through unit #8 (STACK). Then priority 0 loads
               997 ;              are restored, starting from the current pointer position.
               998 ;              After restoring a load ( priority 0 only ) the pointer is
               999 ;              advanced to the next shedable load, which is the next
              1000 ;              priority 0 load in the rotation (QUEUE).
              1001 ;
              1002 ;**************************************************************
              1003 ;
              1004 ;
0746 B838     1005 RESTR: MOV    PNTR0,#LOADM   ;Point to load status
0748 F0       1006        MOV    A,@PNTR0       ;Get load status
0749 C674     1007        JZ     RST5           ;If zero, then all loads are on, so don't
074B B931     1008        MOV    PNTR1,#STATE   ;waste time. Otherwise we will restore a load
074D B101     1009        MOV    @PNTR1,#01     ;so tell the BSR routine to transmit
074F B95A     1010        MOV    PNTR1,#PRIRTY  ;Point to priority table
0751 51       1011        ANL    A,@PNTR1       ;Mask status with priority so that all
              1012                              ;priority 0 loads appear to be on
0752 AD       1013        MOV    TEMP2,A        ;Save masked status in TEMP2
0753 BC01     1014        MOV    TEMP1,#01      ;TEMP1 contains the pointer (STACK)
0755 F475     1015        CALL   SRCH           ;Call search routine
0757 9682     1016        JNZ    RST3           ;If not zero, then a load was found, so
              1017                              ;jump to status update routine. The jump
              1018                              ;to routine will cause a return to calling
              1019                              ;program.
              1020 ;
0759 B959     1021        MOV    PNTR1,#POINTER ;Prepare to search priority 0 loads, since
075B F1       1022        MOV    A,@PNTR1       ;no priority 1 loads were found. Get QUEUE
075C AC       1023        MOV    TEMP1,A        ;pointer and store in TEMP1.
075D F0       1024        MOV    A,@PNTR0       ;Get load status
075E AD       1025        MOV    TEMP2,A        ;and save it in TEMP2
075F F475     1026        CALL   SRCH           ;Call search routine
0761 C674     1027        JZ     RST5           ;Zero indicates no load found, so return
0763 F482     1028        CALL   RST3           ;If a load is found, call update routine, then
              1029                              ;adjust the QUEUE pointer
              1030 ;
```

```
0765 B85A    1031 RST4:    MOV    PNTR0,#PRIRTY    ;A priority 0 load has been restored, so bump
0767 F0      1032          MOV    A,@PNTR0         ;the QUEUE pointer to the next priority 0 load.
0768 37      1033          CPL    A                ;Complement priority
0769 AD      1034          MOV    TEMP2,A          ;Save complemented priority in TEMP2
076A B859    1035          MOV    PNTR0,#POINTER   ;Get QUEUE pointer
076C F0      1036          MOV    A,@PNTR0
076D E7      1037          RL     A                ;Start search with next load
076E AC      1038          MOV    TEMP1,A          ;Save pointer
076F F475    1039          CALL   SRCH             ;Call search routine
0771 C674    1040          JZ     RST5             ;No other priority 0 load found, so leave
             1041                                  ;pointer where it was
0773 A0      1042          MOV    @PNTR0,A         ;If a load is found, replace the pointer
             1043 ;
0774 83      1044 RST5:    RET
             1045 ;
             1046 ;
0775 B908    1047 SRCH:    MOV    PNTR1,#08        ;Set up to loop 8 times
0777 FD      1048 RST1:    MOV    A,TEMP2          ;Get status
0778 5C      1049          ANL    A,TEMP1          ;Mask with present pointer
0779 9681    1050          JNZ    RST2             ;If this load is a 1, it is off and can be
             1051                                  ;restored. Return to the calling program and
             1052                                  ;the accumulator contains the present pointer.
077B FC      1053          MOV    A,TEMP1          ;Get present pointer
077C E7      1054          RL     A                ;Rotate to next higher unit
077D AC      1055          MOV    TEMP1,A          ;Save rotated pointer
077E 27      1056          CLR    A                ;Clear Acc. to indicate no success on return
077F E977    1057          DJNZ   PNTR1,RST1       ;Loop until all 8 loads have been tried
0781 83      1058 RST2:    RET
             1059 ;
0782 37      1060 RST3:    CPL    A                ;The Acc. is pointing to the load which is to
0783 50      1061          ANL    A,@PNTR0         ;be turned on (zero is on). Turn on load.
0784 A0      1062          MOV    @PNTR0,A         ;Store updated status
0785 83      1063          RET
             1064 ;
             1065 ;
             1066 ;*************************************************************
             1067 ;
             1068 ;   PCHK:  Subroutine to ensure that all loads with priority 1 are on.
             1069 ;          (NOT CALLED DURING CENTRAL LOAD CONTROL)
             1070 ;
             1071 ;*************************************************************
             1072 ;
0786 B95A    1073 PCHK:    MOV    PNTR1,#PRIRTY    ;Get priority table
0788 F1      1074          MOV    A,@PNTR1
0789 B838    1075          MOV    PNTR0,#LOADM     ;Get load map
078B 50      1076          ANL    A,@PNTR0         ;Compare
078C C696    1077          JZ     PRET             ;If zero, then all priority 1 loads are on
078E F1      1078          MOV    A,@PNTR1
078F 37      1079          CPL    A                ;Turn on loads that are not on
0790 50      1080          ANL    A,@PNTR0
0791 A0      1081          MOV    @PNTR0,A
0792 B931    1082          MOV    PNTR1,#STATE     ;Start BSR transmission
0794 B101    1083          MOV    @PNTR1,#01H
0796 83      1084 PRET:    RET
             1085 ;
             1086 $EJECT
             1087 ;
             1088 ;*************************************************************
             1089 ;                                                             *
             1090 ;          INIT    INITIALIZES PROCESSOR REGISTERS            *
             1091 ;                                                             *
             1092 ;*************************************************************
```

```
            1093 ;
            1094 ;
0797 C5     1095 INIT:   SEL     RB0
0798 B85B   1096         MOV     PNTR0,#MKEY1
079A 23A5   1097         MOV     A,#KEY1
079C D0     1098         XRL     A,@PNTR0
079D 96A5   1099         JNZ     CSTART
079F 18     1100         INC     PNTR0
07A0 235A   1101         MOV     A,#KEY2
07A2 D0     1102         XRL     A,@PNTR0
07A3 C6D2   1103         JZ      WSTART
07A5 D5     1104 CSTART: SEL     RB1
07A6 BF0C   1105         MOV     CURDIG,#CHAR2
07A8 B822   1106         MOV     PNTR0,#KBDBUF
07AA B0FF   1107         MOV     @PNTR0,#0FFH
07AC C8     1108         DEC     PNTR0           ;KEYLOC
07AD B000   1109         MOV     @PNTR0,#00H
07AF 23F2   1110         MOV     A,#INPMSK
07B1 3A     1111         OUTL    PINPUT,A        ;
07B2 BB26   1112         MOV     PNTR0,#26H      ;ZERO REGISTERS 38 TO 127
07B4 B966   1113         MOV     PNTR1,#66H
07B6 2300   1114         MOV     A,#00
07B8 39     1115         OUTL    BTOUT,A         ;RESET OUTPUT PORT
07B9 A0     1116 ZINT:   MOV     @PNTR0,A
07BA 18     1117         INC     PNTR0
07BB E9B9   1118         DJNZ    PNTR1,ZINT
07BD BB37   1119         MOV     PNTR0,#DAY      ;DAY
07BF B001   1120         MOV     @PNTR0,#01H
07C1 B859   1121         MOV     PNTR0,#POINTER
07C3 B001   1122         MOV     @PNTR0,#01H     ;SET POINTER
07C5 B85B   1123         MOV     PNTR0,#MKEY1
07C7 B0A5   1124         MOV     @PNTR0,#KEY1
07C9 18     1125         INC     PNTR0
07CA B05A   1126         MOV     @PNTR0,#KEY2
07CC AB     1127         MOV     HSCDE,A         ;SET HOUSECODE TO "A"
07CD C5     1128         SEL     RB0
07CE 543C   1129         CALL    CLEAR           ;
07D0 E497   1130         JMP     INIT            ;RESTART to check that RAM is powered up
            1131                                 ;keep trying until a WARM START is executed
            1132                                 ;(RAM powered up)
07D2 B835   1133 WSTART: MOV     PNTR0,#MIN      ;SET MIN AND HOUR TO FF
07D4 23FF   1134         MOV     A,#0FFH
07D6 A0     1135         MOV     @PNTR0,A
07D7 18     1136         INC     PNTR0
07D8 A0     1137         MOV     @PNTR0,A
            1138 ;
07D9 B838   1139         MOV     PNTR0,#LOADM    ;RESET LOAD MAP
07DB A0     1140         MOV     @PNTR0,A
07DC 37     1141         CPL     A               ;LOAD ACC WITH 00H
07DD 39     1142         OUTL    BTOUT,A         ;SET OUTPUT PORT LOW
07DE A8     1143         MOV     PNTR0,A         ;CONFIGURE 8755
07DF B904   1144         MOV     PNTR1,#04
07E1 37     1145         CPL     A               ;LOAD ACC WITH 0FFH
07E2 90     1146 CONF:   MOVX    @PNTR0,A        ;LOAD PORTS A&B WITH 0FFH
07E3 18     1147         INC     PNTR0           ;ALSO LOAD DDRs WITH 0FFH (INPUTS)
07E4 E9E2   1148         DJNZ    PNTR1,CONF      ;LOOP 4 TIMES
07E6 23F0   1149         MOV     A,#TICK         ;
07E8 62     1150         MOV     T,A
07E9 55     1151         STRT    T
07EA 25     1152         EN      TCNTI           ;
            1153 ;
```

```
              1154 ;
              1155 ;
07EB 6472     1156        JMP    TMDD              ;JUMP TO DISPLAY TIME
              1157 ;
              1158 ;
              1159 END
```

USER SYMBOLS

| | | | | | | | | | | | | | | |
|---|---|---|---|---|---|---|---|---|---|---|---|---|---|---|
| AOFST | 0706 | ASAVE | 0002 | B1 | 0044 | BAR | 0039 | BLANK | 0000 | BOUT | 00FB | BOUT1 | 00F9 | BSRBR | 00F7 |
| BSRBS | 0008 | BSRX | 0525 | BTOUT | 0008 | BUFF | 0030 | CCPAT | 00E5 | CCPR1 | 00DC | CCPRNT | 00D3 | CDISP | 0098 |
| CDISP2 | 00B3 | CDISP3 | 00B5 | CDN | 0606 | CENT1 | 06AC | CENTC | 0695 | CHAR2 | 000C | CHARNO | 0006 | CHRPOL | 00FF |
| CHRSTB | 00F2 | CLCR | 007F | CLCS | 0080 | CLEAR | 023C | CNTRL1 | 01AB | CNTRL2 | 01B5 | C01 | 019F | CONF | 07E2 |
| CONTRL | 0194 | CRET | 01C5 | CSTART | 07A5 | CUP | 0600 | CURDIG | 0007 | D1 | 0141 | DAY | 0037 | DEBNCE | 0002 |
| DEFH | 0002 | DEFL | 0050 | DEM1 | 067E | DEM1A | 0671 | DEM2 | 068E | DEM2A | 0692 | DEMAND | 0659 | DISP | 0002 |
| DISPLY | 02A1 | DKWH | 0046 | DKWHL | 0045 | DPSET | 06C6 | DPSUB | 06B3 | DRET | 0694 | E2STR1 | 005F | E2STR2 | 0060 |
| ENCMSK | 000F | EOD | 0143 | EOM | 009F | EOM1 | 00AB | EXINT | 0009 | EXTPL | 06FA | EXTPL2 | 06DB | HDR | 00BF |
| HDS | 0040 | HKWH | 0052 | HKWL | 0051 | HOUR | 0036 | HSCDE | 0003 | INIT | 0797 | INPMSK | 00F2 | INPUT | 0300 |
| KBDBUF | 0022 | KEY1 | 00A5 | KEY2 | 005A | KEYLOC | 0021 | KW | 060C | KWCNT | 0041 | KWCNTL | 0040 | KWH | 005B |
| KWHM | 0044 | KWHML | 0042 | KWINC | 061B | KWL | 0057 | KWND | 0617 | LASTKY | 0006 | LOADM | 0038 | LOOP2 | 0643 |
| LOOP3 | 063D | LOOP5 | 064C | M1 | 0125 | MIN | 0035 | MINB | 0034 | MINDH | 0002 | MINDL | 0000 | MKEY1 | 005B |
| MKEY2 | 005C | MKWH | 0049 | MKWHL | 0047 | MTRFLG | 005D | NCOLS | 0004 | ND | 0017 | NEGLOG | 00FF | NEXTPL | 0007 |
| NREPTS | 0020 | NROWS | 0004 | NUMB | 0003 | NXTLOC | 006E | OFPK | 018B | OFPR | 00DF | OFPS | 0020 | OFSTH | 0000 |
| OFSTL | 0050 | ONPK | 018E | ONPK1 | 0190 | ONPR | 00EF | ONPS | 0010 | POSVE | 0024 | P1SVE | 0025 | PCHK | 0786 |
| PDIGIT | 0001 | PDKWH | 004B | PDKWHL | 004A | PHKWH | 0056 | PHKWL | 0055 | PINPUT | 0009 | PKTST | 0153 | PKTST1 | 0176 |
| PMKWH | 004E | PMKWHL | 004C | PNTRO | 0000 | PNTR1 | 0001 | POINTE | 0059 | POSLOG | 0000 | PRET | 0796 | PRINT | 025A |
| PRIRTY | 005A | PSGMNT | 0000 | RDELAY | 0023 | REFR1 | 0052 | REFRSH | 0048 | RESTR | 0746 | RLDT | 0023 | RMTRR | 00FB |
| RMTRS | 0004 | ROTCNT | 0005 | ROTPAT | 0004 | RST1 | 0777 | RST2 | 0781 | RST3 | 0782 | RST4 | 0765 | RST5 | 0774 |
| SCALE | 0000 | SCALEL | 0036 | SCAN | 0069 | SCAN1 | 006C | SCAN10 | 00CB | SCAN3 | 007F | SCAN5 | 008A | SCAN6 | 0090 |
| SCAN7 | 00B7 | SCAN8 | 00BF | SCAN9 | 00C7 | SEGMAP | 0039 | SEGPOL | 00FF | SH2 | 0734 | SH3 | 073F | SHED | 071D |
| SND | 0192 | SPH | 0054 | SPL | 0053 | SRCH | 0775 | SSH | 0033 | SSL | 0032 | STATE | 0031 | STBR | 00FE |
| STBS | 0001 | STORE | 0646 | TABHH | 007F | TABHL | 007E | TABLH | 0063 | TABLL | 0062 | TABLO | 0061 | TEMP1 | 0004 |
| TEMP2 | 0005 | TEMP3 | 0006 | TH | 0050 | TI1 | 002F | TI2 | 0031 | TI3 | 0040 | TI4 | 0037 | TICK | FFF0 |
| TIME | 0109 | TIME1 | 0027 | TIME2 | 0029 | TIME3 | 002B | TIME4 | 002D | TINIT | 001D | TL | 004F | TMDD | 0372 |
| TR1 | 01C6 | TST1 | 0618 | TST2 | 0613 | VCCLOW | 00CC | VCCOK | 00D2 | VERSIO | 0030 | WSTART | 07D2 | X10 | 0711 |
| XFER | 00EC | XN | 06CD | XN1 | 06CF | ZBR | 00FD | ZBS | 0002 | ZINT | 07B9 | | | | |

ASSEMBLY COMPLETE,   NO ERRORS

```
:0100020030CD
:02000000E49783
:020003000409EE
:10000700041DD5AA6535BF0CB4251523F062552507
:1000170034098B060448D52A8596239523F062FF4C
:10002700C6FBF2F9722F043199F715AB03FCC640F5
:100037000707F248C644AB044899F70437B425B817
:100047000623FFB90191B900918902233968A9F103
:10005700B9009123F268A3B90191B9393751C6693B
:1000670099FDBB210ABD04F7ACF68AB595F02EDE16
:10007700B820C67FB002048AF0C68A07A0968AFE17
:10008700B822A0B82110FCED6ECFFFC698D3069614
:10009700C7D40C095304C6B3BB51B95514EC14ECC2
:1000A700B847B94C14EC14EC14EC79FB76D354A173
:1000B700B821B000B6BFBEFFB5B923F1C6C707A1F7
:1000C70027B6CB372A36D299F704CC93B832F0D279
:1000D700B5B8E5B93FF8A3C6B7A118C904DCC2B0E3
:1000E700B8B0FAFF00F0A1B000181983FBF7EFDFF3
:1000F7008F7FBF0DCF23FFB90191B9009189020509
:1001070004C7B832D406F6C618D406F6C6B002C875
:10011700B058B83410F0530F9625B931B10118F023
:10012700F28ED40003A0E653B00018D40003DCE637
:10013700053B0001810F072412443B001B9458B4AD2
```

```
:10014700230021A01819230021A08904B837F00340
:1001570002728BB926B835D4B3E676C819D4B3E69F
:100167008EC819D4B3E676C819D4B3E68E2488FDB1
:10017700D3999688FC0389F6900317F6880329F626
:100187009099EF8920249299DF8910D459769FF4AA
:10019700B609929FF446C4468595D4DB34ABD4FADE
:1001A70034ABC446B91CB853D4B3F6B5E41DB6C5D1
:1001B700B80AD4CDB91CB853D4B3F6C5F446858371
:10060000F0030157A08397F003FFA083B95DF1F2D7
:1006100018561717721BA1835613835380D380A1DA
:10062000B840F0033657A018F0130057A0E617B9EA
:100630003D43DB902B844D43DB903B84618D40038
:10064000E94383F63D83BC0EB87FB97DD4C6C9CBE3
:10065000EC4CB942D4C6D4C6B3B841B97ED4B3B841
:1006600004D4CDB85BB91DD4C68980095380969555
:10067000A509B27EB851B957D4B3F67ED4C67694E4
:10068000B84FB951D4B3B854F6BE8940C492B9501A
:1006900099BFD4C6837671B5BC50BD02D4B3B854EB
:1006A000E6ACD4C6BC00BD02D4B3F671B002C8B08B
:1006B000000C471F137039BAC19F13713992C6057C3
:1006C0002C187057AD83F1A0C9C8F1A08327A96C7D
:1006D00057297D5729E8CFACF9AD83B841B97CD40F
:1006E000B3C8B95FFC6057A1FD19187057A1B85F76
:1006F000B962D4B3BB04D4CDE406BB40B961D4B37B
:10070000F411B806D4CD23506C57AC23007D57ADFF
:1007100083B81CFD3047530FADFC47AC83B838F0AD
:10072000B95A4137ADB959F1ACF475963FBC80B9AF
:100730008763483F0375C963FFC77ACE93483B9B4
:1007400031B10140A083B838F0C674B931B101B9F4
:100750005A51ADBC01F4759682B959F1ACF0ADF4C3
:1007600075C674F482B85AF037ADB859F0E7ACF4F6
:1007700075C674A083B908FD5C9681FCE7AC27E9D7
:1007800077833750A083B95AF1B83850C696F137FD
:1007900050A0B931B10183C5B85B23A5D096A51887
:1007A000235AD0C6D2D5BF0CB822B0FFCBB00023A0
:1007B000F23AB826B966230039A018E9B9B837B0BB
:1007C00001B859B001B85BB0A51BB05AABC5543CDC
:1007D000E497B83523FFA018A0B838A03739ABB9D6
:0D07E00004379018E9E223F0625525647299
:00000001FF
```

```
LOC  OBJ        LINE     SOURCE STATEMENT

1 ;  BSR2:    TRANSPARENT BSR CONTROLLER (SIMPLIFIED CODE )
                 2 ;           FOR USE WITH 8755 AND 8039, CONFIGURED FOR PC LAYOUT
                 3 ;           VER 1.2 ,    7/09/1982
                 4 ;
                 5 ;
                 6 ;
                 7 ;***********************************************************
                 8 ;
                 9 ;           INITIAL EQUATES TO DEFINE SYSTEM CONFIGURATION
                10 ;
                11 ;***********************************************************
                12 ;
                13 ;
0008            14 BTOUT   EQU   P1      ;CONTROL BIT PORT IS P1
                15 ;
0000            16 PSGMNT  EQU   00      ;USED TO ENABLE CHARACTERS AND TO STROBE ROWS OF
                17                       ;KEYBOARD PORT B ON 8755
                18 ;
```

```
              19 ;
00F7          20 BSRBR   EQU    0F7H      ;BSR RESET BIT MASK, BIT 3
0008          21 BSRBS   EQU    08H       ;BSR SET BIT MASK, BIT 3
              22 ;
00FE          23 STBR    EQU    0FEH      ;LATCH STROBE RESET MASK, BIT 0
0001          24 STBS    EQU    01H       ;LATCH STROBE SET MASK, BIT 0
              25 ;
              26 ;
              27 ;
              28 ;********************************************************
              29 ;
              30 ;      BANK 1 REGISTERS USED
              31 ;
              32 ;********************************************************
              33 ;
0000          34 PNTR0   EQU    R0        ;POINTERS USED FOR INDIRECT RAM ACCESSING
0001          35 PNTR1   EQU    R1
              36 ;
0003          37 HSCDE   EQU    R3        ;HIGH 4 BITS ARE THE SECURITY CODE,
              38                          ;LOW 4 BITS ARE THE BIT COUNTER FOR THE BSR ROUTINE
              39 ;
              40 ;
              41 ;********************************************************
              42 ;
              43 ;      DATA RAM LOCATIONS
              44 ;
              45 ;********************************************************
              46 ;
              47 ;
0031          48 STATE   EQU    49        ;BSR STATE COUNTER
              49                          ;HIGH 4 BITS ARE THE UNIT COUNTER
              50                          ;AND THE LOW 4 BITS ARE THE STATE POINTER
0038          51 LOADM   EQU    56        ;STATUS OF 8 LOADS
              52 ;
              53 ;
              54 $EJECT
              55 ;
              56 ;********************************************************
              57 ;
              58 ;BSRX:  This routine generates the bit pattern for the standard
              59 ;       BSR control scheme. This bit pattern is used to gate the 121kh
              60 ;       oscillator. The routine is called every zero crossing to gener-
              61 ;       ate the next bit. All eight loads are addressed sequentially
              62 ;       starting with load 8, and the routine is completely transparent
              63 ;       to the main program. The bit patterns are generated by a two di-
              64 ;       mentional scaning algorithm, which during successive calls, scans
              65 ;       the appropriate bit patterns in ROM. Both vertical and horizontal
              66 ;       scaning are employed.
              67 ;
              68 ;********************************************************
              69 ;
              70 ;
              71 ;
0525          72 ORG    0525H
              73 ;
0525 B931     74 BSRX:   MOV    PNTR1,#STATE   ;Get state pointer
0527 F1       75         MOV    A,@PNTR1
0528 C655     76         JZ     B3             ;If zero, do not transmit
052A 530F     77         ANL    A,#0FH         ;Mask out unit number, leave state pointer
052C 03B2     78         ADD    A,#KEY         ;Add offset
```

```
052E A3          79            MOVP    A,@A              ;Get state
052F C63B        80            JZ      DONE              ;If zero, end of transmission for this unit
0531 126C        81            JB0     START             ;Otherwise, jump to appropriate state
0533 3272        82            JB1     HCODE
0535 527D        83            JB2     UNIT
0537 7284        84            JB3     DELAY
0539 A45A        85            JMP     OPC
                 86 ;
053B B838        87 DONE:      MOV     PNTR0,#LOADM      ;Load address of control word
053D F0          88            MOV     A,@PNTR0          ;Load accumulator with control word
053E B800        89            MOV     PNTR0,#PSGMNT
0540 90          90            MOVX    @PNTR0,A          ;Output control word onto PORT B
0541 8901        91            ORL     BTOUT,#STBS       ;Strobe control word into latch by setting
0543 99FE        92            ANL     BTOUT,#STBR       ;line high then low. Strobe is 5 uSEC.
0545 23FF        93            MOV     A,#0FFH
0547 90          94            MOVX    @PNTR0,A          ;Restore to blank condition
                 95 ;
0548 F1          96            MOV     A,@PNTR1          ;Get state pointer
0549 0310        97            ADD     A,#10H            ;Increment unit counter
054B F253        98            JB7     B2                ;If BIT7=1,then all 8 units have been adressed
054D 53F0        99            ANL     A,#0F0H           ;Zero state pointer
054F 4301        100           ORL     A,#01H            ;Set state pointer to 1 to start transmission
                 101                                     ;for next unit
0551 A1          102           MOV     @PNTR1,A          ;Restore state pointer
0552 83          103           RET
                 104 ;
                 105 ;
0553 B100        106 B2:       MOV     @PNTR1,#00H       ;Reset state pointer to end transmission
                 107 ;
0555 FB          108 B3:       MOV     A,HSCDE           ;Zero low 4 bits of HSCDE
0556 53F0        109           ANL     A,#0F0H
0558 AB          110           MOV     HSCDE,A
0559 83          111           RET
                 112 ;
                 113 ;
055A B48A        114 OPC:      CALL    UM                ;Get mask for unit addressed
055C A3          115           MOVP    A,@A
055D B838        116           MOV     PNTR0,#LOADM
055F 50          117           ANL     A,@PNTR0          ;Mask load map to obtain status of load
0560 9666        118           JNZ     OP1               ;If status is 1, output off command
0562 B8C2        119           MOV     PNTR0,#MASK       ;Otherwise, load byte pointer with MASK
0564 A468        120           JMP     OP2
0566 B8C3        121 OP1:      MOV     PNTR0,#MASK+1     ;Load byte byte pointer with MASK+1
0568 B9D7        122 OP2:      MOV     PNTR1,#OP         ;Load scanning pointer with OPCODE address
056A A491        123           JMP     OUTP              ;Output bit
                 124 ;
                 125 ;
056C B8CB        126 START:    MOV     PNTR0,#STARTT     ;Move address of start code to byte counter
056E B9C6        127           MOV     PNTR1,#MASK+4     ;Move address of MASK+4 to scanning pointer
0570 A491        128           JMP     OUTP              ;Output bit
                 129 ;
                 130 ;
0572 FB          131 HCODE:    MOV     A,HSCDE           ;Get HSCDE
0573 47          132           SWAP    A
0574 530F        133           ANL     A,#0FH            ;Obtain House Code
0576 03E3        134           ADD     A,#SEC            ;Add offset
0578 A8          135           MOV     PNTR0,A           ;Move address of Security Code to byte pointer
0579 B9C2        136           MOV     PNTR1,#MASK       ;Move address of MASK to scanning pointer
057B A491        137           JMP     OUTP              ;Output bit
                 138 ;
                 139 ;
057D B48A        140 UNIT:     CALL    UM                ;Get mask for unit addressed
```

```
057F A8        141         MOV   PNTR0,A           ;Move mask address to byte pointer
0580 B9CC      142         MOV   PNTR1,#UNITT      ;Move UNIT table address to scanning pointer
0582 A491      143         JMP   OUTP              ;Output bit
               144 ;
               145 ;
0584 B8E2      146 DELAY:  MOV   PNTR0,#DELAYT     ;Move address of DELAY code to byte pointer
0586 B9C2      147         MOV   PNTR1,#MASK       ;Move address of MASK to scanning pointer
0588 A491      148         JMP   OUTP              ;Output bit
               149 ;
               150 ;
058A F1        151 UM:     MOV   A,@PNTR1          ;Get state pointer
058B 47        152         SWAP  A
058C 530F      153         ANL   A,#0FH            ;Mask state pointer, leave unit number
058E 03C2      154         ADD   A,#MASK           ;Add offset
0590 83        155         RET
               156 ;
               157 ;
0591 FB        158 OUTP:   MOV   A,HSCDE           ;Get HSCDE
0592 530F      159         ANL   A,#0FH            ;Obtain bit count
0594 69        160         ADD   A,PNTR1           ;Add to scanning pointer
0595 A9        161         MOV   PNTR1,A           ;Store new scanning pointer
0596 A3        162         MOVP  A,@A              ;Get byte pointed to by scanning pointer
0597 29        163         XCH   A,PNTR1           ;
0598 28        164         XCH   A,PNTR0
0599 A3        165         MOVP  A,@A              ;Get byte pointed to by byte pointer
059A 59        166         ANL   A,PNTR1           ;And both bytes
059B 96A1      167         JNZ   OUT1              ;If bit is a 1, output a 1
059D 99F7      168 OUT0:   ANL   BTOUT,#BSRBR      ;Otherwise output a 0
059F A4A3      169         JMP   OTP1
05A1 8908      170 OUT1:   ORL   BTOUT,#BSRBS      ;Output a 1
05A3 1B        171 OTP1:   INC   HSCDE             ;Increment bit counter (for scanning pointer)
05A4 18        172         INC   PNTR0             ;Increment present scanning pointer
05A5 F8        173         MOV   A,PNTR0           ;Get next byte pointed to by scanning pointer
05A6 A3        174         MOVP  A,@A
05A7 D3C0      175         XRL   A,#11000000B      ;Check if next byte is flag byte
05A9 96B2      176         JNZ   ORET              ;If not, return
05AB B931      177         MOV   PNTR1,#STATE      ;If flag, get STATE POINTER
05AD 11        178         INC   @PNTR1            ;Advance STATE POINTER
05AE FB        179         MOV   A,HSCDE           ;Get HSCDE
05AF 53F0      180         ANL   A,#0F0H           ;Zero bit counter
05B1 AB        181         MOV   HSCDE,A           ;Restore HSCDE
05B2 83        182 ORET:   RET
               183 ;
               184 ;
00B2           185 KEY     EQU   ($-1 AND 0FFH)    ;STATE LOOK-UP TABLE
               186 ;
05B3 01        187         DB    00000001B         ;START
05B4 02        188         DB    00000010B         ;SEC CODE
05B5 04        189         DB    00000100B         ;UNIT
05B6 01        190         DB    00000001B         ;START
05B7 02        191         DB    00000010B         ;SEC
05B8 04        192         DB    00000100B         ;UNIT
05B9 08        193         DB    00001000B         ;DELAY
05BA 01        194         DB    00000001B         ;START
05BB 02        195         DB    00000010B         ;SEC
05BC 10        196         DB    00010000B         ;OP
05BD 01        197         DB    00000001B         ;START
05BE 02        198         DB    00000010B         ;SEC
05BF 10        199         DB    00010000B         ;OP
05C0 08        200         DB    00001000B         ;DELAY
05C1 00        201         DB    00000000B         ;END
```

```
                    202 ;
                    203 ;
  00C2              204 MASK   EQU   ($ AND 0FFH)   ;MASK TABLE FOR SCANNING BYTES
                    205 ;
  05C2 80           206        DB    10000000B
  05C3 40           207        DB    01000000B
  05C4 20           208        DB    00100000B
  05C5 10           209        DB    00010000B
  05C6 08           210        DB    00001000B
  05C7 04           211        DB    00000100B
  05C8 02           212        DB    00000010B
  05C9 01           213        DB    00000001B
  05CA C0           214        DB    11000000B      ;FLAG
                    215 ;
                    216 ;
  00CB              217 STARTT EQU   ($ AND 0FFH)   ;START CODE
                    218 ;
  05CB 0E           219        DB    00001110B
                    220 ;
                    221 ;
  00CC              222 UNITT  EQU   ($ AND 0FFH)   ;UNIT CODES
                    223 ;
                    224 ;           87654321       UNIT NUMBER
                    225 ;
  05CC AA           226        DB    10101010B      ;D8
  05CD 55           227        DB    01010101B      ;-D8
  05CE C3           228        DB    11000011B      ;D4
  05CF 3C           229        DB    00111100B      ;-D4
  05D0 0F           230        DB    00001111B      ;D2
  05D1 F0           231        DB    11110000B      ;-D2
  05D2 F0           232        DB    11110000B      ;D1
  05D3 0F           233        DB    00001111B      ;-D1
  05D4 00           234        DB    00000000B      ;D16
  05D5 FF           235        DB    11111111B      ;-D16
  05D6 C0           236        DB    11000000B      ;FLAG
                    237 ;
                    238 ;
  00D7              239 OP     EQU   ($ AND 0FFH)   ;OP (KEY) CODES
                    240 ;
                    241 ;           00XXXXXX       ;FUNCTION
                    242 ;           NF
                    243 ;           F
                    244 ;
  05D7 3F           245        DB    00111111B      ;D8
  05D8 FF           246        DB    11111111B      ;-D8
  05D9 3F           247        DB    00111111B      ;D4
  05DA FF           248        DB    11111111B      ;-D4
  05DB FF           249        DB    11111111B      ;D2
  05DC 3F           250        DB    00111111B      ;-D2
  05DD 7F           251        DB    01111111B      ;D1
  05DE BF           252        DB    10111111B      ;-D1
  05DF FF           253        DB    11111111B      ;D16
  05E0 3F           254        DB    00111111B      ;-D16
  05E1 C0           255        DB    11000000B      ;FLAG
                    256 ;
                    257 ;
  00E2              258 DELAYT EQU   ($ AND 0FFH)   ;DELAY CODE
                    259 ;
  05E2 00           260        DB    00000000B
                    261 ;
                    262 ;
```

```
00E3           263  SEC    EQU    ($ AND OFFH)    ;HOUSE (SECURITY) CODES
               264  ;                             ----
               265  ;             HHHHHHHH        ;BIT
               266  ;             88442211
               267                                ;HOUSE CODE
05E3  69       268         DB     01101001B       ;A
05E4  A9       269         DB     10101001B       ;B
05E5  59       270         DB     01011001B       ;C
05E6  99       271         DB     10011001B       ;D
05E7  56       272         DB     01010110B       ;E
05E8  96       273         DB     10010110B       ;F
05E9  66       274         DB     01100110B       ;G
05EA  A6       275         DB     10100110B       ;H
05EB  6A       276         DB     01101010B       ;I
05EC  AA       277         DB     10101010B       ;J
05ED  5A       278         DB     01011010B       ;K
05EE  9A       279         DB     10011010B       ;L
05EF  55       280         DB     01010101B       ;M
05F0  95       281         DB     10010101B       ;N
05F1  65       282         DB     01100101B       ;O
05F2  A5       283         DB     10100101B       ;P
               284  ;
               285  ;
               286  END
```

USER SYMBOLS
```
B2     0553   B3     0555   BSRBR  00F7   BSRBS  0008   BSRX   0525   BTOUT  0008   DELAY  0584   DELAYT 00E2
DONE   053B   HCODE  0572   HSCDE  0003   KEY    00B2   LOADM  0038   MASK   00C2   OP     00D7   OP1    0566
OP2    0568   OPC    055A   ORET   05B2   OTP1   05A3   OUTO   059D   OUT1   05A1   OUTP   0591   PNTRO  0000
PNTR1  0001   PSGMNT 0000   SEC    00E3   START  056C   STARTT 00CB   STATE  0031   STBR   00FE   STBS   0001
UM     058A   UNIT   057D   UNITT  00CC
```

ASSEMBLY COMPLETE,   NO ERRORS

```
:10052500B931F1C655530F03B2A3C63B12??3272F3
:10053500527D7284A45ABB38F0B800908.  .9FEAA
:1005450023FF90F10310F25353F04301A1B3B1004F
:10055500FB53F0AB83B48AA3B838509666B8C2A4EF
:1005650068B8C3B9D7A491B8CBB9C6A491FB475312
:100575000F03E3ABB9C2A491B48AABB9CCA491B8D1
:10058500E2B9C2A491F147530F03C2B3FB530F692C
:100595000A9A32928A35996A199F7A4A389081B18EB
:1005A500F8A3D3C096B2B93111FB53F0AB83010266
:1005B5000401020408010210010210080080402015
:1005C5001008040201C00EAA55C33C0FF0F00F003D
:1005D500FFC03FFF3FFFFF3F7FBFFF3FC00069A94F
:0E05E5005999569666A66AAA5A9A559565A522
:00000001FF
```

What is claimed is:

1. A control method for minimizing during a billing period the on-peak power demand of a residential electric utility customer having an AC line and a plurality of interruptible non-priority loads and non-interruptible priority loads comprising the steps of:
   (a) defining a control point of desired power demand;
   (b) shedding non-priority loads to attempt to decrease demand below the control point;
   (c) providing predetermined sliding time windows;
   (d) determining average energy demand of the loads over a predetermined sliding time window; and
   (e) dynamically increasing said control point to a new control point when all non-priority loads have been shed and when the average power demand within the time window increases beyond said control point whereby the value of the new control point is related to the last-named average power demand.

2. The control method of claim 1 in which step (b) includes the steps of transmitting bits of information to the loads for control thereof and shedding non-priority loads when the average energy demand over at least one predetermined sliding time window increases beyond said control point.

3. The control method of claim 2 which includes the steps of:
   (a) slow shedding of non-priority loads when the energy demand over a first predetermined sliding time window increases beyond said control point; and,
   (b) fast shedding of non-priority loads when the energy demand over a second predetermined sliding time window increases beyond said control point wherein the second window is of shorter duration than the first window.

4. The control method of claim 2 which includes synchronizing the transmitted bits of information to the negative-going zero crossing of the AC line.

5. The control method of claim 2 which includes counting down at a predetermined frequency asynchronously and free-running with respect to the AC line beginning at the negative going zero crossing for determining the occurrence of the positive going zero crossings and transmitting further bits of information synchronized to the positive going zero crossings.

6. The control method of claim 2 which includes transmitting the bits of information to all loads simultaneously.

7. The control method of claim 6 which includes transmitting the bits of information automatically and periodically.

8. The control method of claim 1 in which step (a) includes providing for customer selection of said control point at a target value selected to be lower than the maximum new control point for that billing period.

9. The method of claim 1 which further includes the steps of:
   (a) receiving a central control signal from the utility; and,
   (b) subtracting from the average energy demand a predetermined decrement in response to said central control signal to produce a new control point.

10. A control system for minimizing during a billing period the on-peak power demand of a residential electric utility customer having an AC line and a plurality of interruptible non-priority loads and non-interruptible priority loads comprising:
    means to define a control point of desired power demand;
    means coupled to said loads to shed non-priority loads to attempt to decrease demand below the control point;
    means to determine average energy demand of the loads over a predetermined sliding time window; and
    means to dynamically increase said control point to a new control point when all non-priority loads have been shed and when the average power demand within the time window increases beyond said control point whereby the value of the new control point is related to the last-named average power demand.

11. The control system of claim 10 in which there is provided means for shedding non-priority loads in response to bits of information transmitted to the loads when the average energy demand over a predetermined sliding time window increases beyond said control point.

12. The control system of claim 11 including:
    (a) means for slow shedding of non-priority loads when the energy demand over a first predetermined sliding time window increases beyond said control point; and,
    (b) means for fast shedding of non-priority loads when the energy demand over a second predetermined sliding time window increases beyond said control point wherein the second window is of shorter duration than the first window.

13. The control system of claim 11 in which there is provided means for synchronizing the transmitted bits of information to the negative going zero crossings of the AC line.

14. The control system of claim 13 in which there is provided means for counting down at a predetermined frequency asynchronously and free-running with respect to the AC line beginning at the negative going zero crossing to determine the occurrence of the positive going zero crossing and transmitting further bits of information synchronized to the positive going zero crossing.

15. The control system of claim 11 in which there is provided means for transmitting the bits of information to all loads simultaneously.

16. The control system of claim 15 in which there is provided means for transmitting the bits of information automatically and periodically.

17. The control system of claim 10 in which there is provided means for customer selection of said control point at a target value selected to be lower than the maximum new control point for that billing period whereby the maximum new control point during that billing period is the minimum possible control point consistent with all priority loads being energized.

18. The control system of claim 10 in which there is further provided:
    (a) central load control receiver means for receiving a central control signal from the utility, and;
    (b) means for subtracting from the average energy demand a predetermined decrement in response to said central control signal to produce a new control point.

19. A load controller system for transmitting bits of information through an AC line to control a plurality of loads in which the bits of information are synchronized with the zero crossing of the AC line comprising:
    (a) means for providing an external interrupt pulse at each negative going zero crossing of the AC line;
    (b) timer means for counting down at a predetermined frequency asynchronously and free running with respect to the AC line and having an external interrupt window during certain counts;
    (c) means for disabling the external interrupt pulse at times other than the external interrupt window; and
    (d) means for locking the timing means onto the AC line and for reloading the timing means when an interrupt arrives during an external interrupt window whereby the countdown period of the timer means coincides with the period AC line.

20. The load controller system of claim 19 in which there is provided means to determine when the timer means has counted down half of its range thereby to determine the occurrence of the positive going zero crossing.

21. The load controller system of claim 20 in which there is provided means to transmit the bits of information at predetermined counts of the timer means related to the zero crossings.

22. A method for controlling power demand of a residential electric utility customer having a control point of desired power demand above which power demand cannot rise comprising the steps of:
(a) receiving a central control signal from the utility;
(b) providing a predetermined sliding time window;
(c) determining the average energy demand over a predetermined sliding time window; and
(d) subtracting from the average energy demand a predetermined decrement in response to said central control signal to produce a new control point.

23. The method of claim 22 in which step (c) includes the further step of substituting for said new control point a predetermined minimum control point if said new control point is below the predetermined minimum control point.

24. The method of claim 22 in which step (c) includes the further step of preventing any adjustments of the new control point until the central control signal is discontinued by the utility.

25. The method of claim 22 which includes the further steps of receiving a central control signal which is cycled on and off by the utility and subtracting from the average energy demand a predetermined decrement in response to each cycle to produce a series of progressively lower control points.

26. A method for synchronizing a transmitter of a power demand control system for a multiple phase residential electric utility customer said control system having a receiver for gating a customer load in which said receiver samples its phase at zero crossings, the synchronization being independent of the angle between the phases comprising the steps of:
(a) transmitting from the control system a bit of control information for a half cycle of a first phase, said bit of information beginning substantially at a zero crossing of the first phase; and
(b) receiving the bit of control information substantially at the zero crossing of the phase of the receiver.

27. A load controller system coupled through an AC line to a plurality of loads having means for automatically and periodically transmitting bits of information to all the loads simultaneously comprising:
(a) means for providing an external interrupt pulse at each negative going zero crossing of the AC line;
(b) counting means initiated at the beginning of a transmission of a bit of information for determining the number of external interrupts which have occurred since the last transmission; and,
(c) means for determining when a predetermined number of external interrupts have been counted and simultaneously transmitting to all loads a further bit of information when the predetermined number of external interrupts has been counted.

* * * * *